(12) United States Patent
Grover et al.

(10) Patent No.: US 6,377,543 B1
(45) Date of Patent: *Apr. 23, 2002

(54) PATH RESTORATION OF NETWORKS

(75) Inventors: Wayne D. Grover, Edmonton; Rainer R. Iraschko, Thornhill; Lance Doherty, Edmonton, all of (CA)

(73) Assignee: Telecommunications Research Laboratories, Edmonton (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/954,247

(22) Filed: Oct. 20, 1997

(51) Int. Cl.[7] .............. H04J 3/16; H04L 12/56
(52) U.S. Cl. .......... 370/227; 370/228; 370/255; 370/400; 709/239
(58) Field of Search ............... 370/216, 217, 370/218, 221, 225, 227, 228, 238, 248, 254, 351, 357, 400, 255; 709/238, 239; 340/825.01, 825.02, 825.03, 827

(56) References Cited

U.S. PATENT DOCUMENTS

| | | |
|---|---|---|
| 4,956,835 A | 9/1990 | Grover |
| 4,993,015 A | 1/1991 | Fite, Jr. ............ 370/218 |
| 5,065,399 A | 11/1991 | Hasegawa et al. ...... 714/4 |
| 5,093,824 A | 3/1992 | Coan et al. |
| 5,146,452 A | 9/1992 | Pekarske ............ 370/228 |
| 5,173,689 A | 12/1992 | Kusano ............ 340/827 |
| 5,218,601 A | 6/1993 | Chujo et al. |
| 5,235,599 A | 8/1993 | Nishimura et al. |
| 5,239,537 A | 8/1993 | Sakauchi |
| 5,435,003 A | 7/1995 | Ghng et al. ............ 714/4 |
| 5,444,693 A | 9/1995 | Arslan et al. ......... 370/221 |
| 5,495,471 A | 2/1996 | Chow et al. ......... 370/221 |
| 5,513,345 A | 4/1996 | Sato et al. |
| 5,537,534 A | 7/1996 | Chng et al. .......... 714/4 |

(List continued on next page.)

FOREIGN PATENT DOCUMENTS

| | | |
|---|---|---|
| GB | 2 299 729 | 10/1996 |
| GB | 2 305 811 | 4/1997 |
| WO | WO 97/06643 | 2/1997 |
| WO | WO 97/06644 | 2/1997 |
| WO | WO 97/06645 | 2/1997 |
| WO | WO 97/08860 | 3/1997 |
| WO | WO 97/11543 | 3/1997 |

OTHER PUBLICATIONS

Ward, Mark, "There's An Ant in My Phone . . . ," *New Scientist*, pp. 32–35 (Jan. 24, 1998).

Iraschko, R.R., Path Restorable Networks, Ph.D. Dissertation, University of Alberta (Spring 1997).

(List continued on next page.)

*Primary Examiner*—Chau Nguyen
*Assistant Examiner*—Soon-Dong Hyun
(74) *Attorney, Agent, or Firm*—Christensen O'Connor Johnson Kindness PLLC

(57) ABSTRACT

A distributed method for creating telecommunications paths in a network, particularly after a span failure. The network includes plural distinct nodes interconnected by plural distinct spans, each span having working links and spare links. Each node has a digital cross-connect switch for making and breaking connections between adjacent spans forming span pairs at a node. At least one of the end nodes of a path to be created broadcasts statelets. Each intermediate node between the end nodes broadcasts incoming statelets in a manner that favours use of restoration paths that eliminate the fewest other paths. Statelets that have traversed spans with greater spare capacity, considering the number of statelets competing to be broadcast along the spans, are preferentially broadcast.

38 Claims, 29 Drawing Sheets

U.S. PATENT DOCUMENTS

| | | | |
|---|---|---|---|
| 5,548,639 | A | | 8/1996 | Ogura et al. |
| 5,590,119 | A | | 12/1996 | Moran et al. ............... 370/225 |
| 5,604,868 | A | | 2/1997 | Komine et al. |
| 5,812,524 | A | * | 9/1998 | Moran et al. ............... 370/228 |
| 5,835,482 | A | | 11/1998 | Allen .......................... 370/225 |
| 5,999,286 | A | | 12/1999 | Venkatesan ................. 359/117 |
| 6,044,064 | A | * | 3/2000 | Brimmage et al. ......... 370/248 |
| 6,047,331 | A | * | 4/2000 | Medard et al. ............. 709/239 |
| 6,049,529 | A | * | 4/2000 | Brimmage ................... 370/248 |
| 6,052,796 | A | * | 4/2000 | Croslin .......................... 714/4 |

OTHER PUBLICATIONS

Iraschko, R.R., MacGregor, M.H., Grover, W.D., "Optimal Capacity Placement for Path Restoration in Mesh Survivable Networks," *Proc. IEEE ICC'96* (Jun. 1996).

Grover, W.D., "Distributed Restoration of the Transport Network," Chapter 11, pp. 337–471 of Telecommunications Network Management into the 21st Century—Techniques, Standards, Technologies, and Applications, edited by S. Aidarous and T. Plevyak, New York, NY: *IEEE Press* (1994).

Chow, C.E., Bicknell, J.D., Mccaughey, S., "Performance analysis of fast distributed link restoration algorithms," *International Journal of Communication Systems*, vol. 8, pp. 325–345 (1995).

Fujii, H., Yoshikai, N., "Restoration message transfer mechanism and restoration characteristics of double–search self–healing ATM newtork," *IEEE J–SAC* Special Issue: Integrity of Public Telecommunication Networks, vol. 12, No. 1, pp. 149–158 (Jan. 1994).

Chao, C.W., Dollard, P.M., Weythman, J.E., Nguyen, L.T., Eslambolchi, H., "FASTAR–a robust system for fast DS3 restoration," *Proc. IEEE Globecom '91*, pp. 39.1.1–39.1.5 (Dec. 1991).

Chujo, T., Komine, H., Miyazaki, K., Ogura, T., Soejima, T., "Distributed self–healing network and its optimum spare capacity assignment algorithm," Electronics and Communcations in Japan, part 1, vol. 74, No. 7, pp. 1–8 (1991).

Kawmaura, R., Sato, K., Tokizawa, I., "Self–healing ATM networks based on virtual path concept," *IEEE J–SAC* Special Issue: Integrity of Public Telecommunication Networks, vol. 12, No. 1, pp. 120–127 (Jan. 1994).

Sakauchi, H., Nishimura, Y., Hasegawa, S., "A self–healing network with an economical spare–channel assignment," *Proc. IEEE Globecom '90*, pp. 438–443 (Dec. 1990).

Yang, C.H., Hasegawa, S., "FITNESS: Failure immunization technology for network service survivability," *Proc. IEEE Globecom '88*, pp. 47.3.1–47.3.5 (Dec. 1988).

Baker, J.E., "A distributed link restoration algorithm with robust preplanning," *Proc. IEEE Globecom '91*, pp. 306–311 (Dec. 1991).

Coan, B.A., et al., "Using distributed topology updates and preplanned configurations to achieve trunk network survivability," *IEEE Transaction on Reliability*, vol. 40, No. 4, pp. 404–416, 427 (1991).

Coan, B.A., Vecchi, M.P., Wu, L.T., "A distributed protocol to improve the survivability of trunk networks," Proceedings of the 13th International Switching Symposium, pp. 173–179 (May 1990).

Saniee, I., "Optimal routing designs in self–healing communications networks," Bellcore, MRE 2D–362, 445 South Street, Morristown, NJ 07960–6438, fourth draft (May 1994).

Komine, H., Chujo, T., Ogura, T., Miyazaki, K., Soejima, T., "A distributed restoration algorithm for multiple–link and node failures of transport networks," *Proc. IEEE Globecom '90*, pp. 459–463 (Dec. 1990).

U.S. Patent application Ser. No. 08/893,491 filed Jul. 11, 1997, entitled: Distributed Preconfiguration of Spare Capacity in Closed Paths for Network Restoration, copy not supplied.

Potential for spare capacity preconnection to reduce cross-connection workloads in mesh–restorable networks, W.D. Grover, M.H. MacGregor, Electronics Letters, vol. 30, No. 3, pp. 194–195 (Feb. 3, 1994).

An Optimal Spare–Capacity Assignment Model for Survivable Networks with Hop Limits, Meir Herzberg and Stephen J. Bye, Telecom Australia Research Laboratories, 6 pages, Proceedings of the IEEE Globecom '94, vol. 3, *IEEE*, pp. 1601–1606 (1994).

Fiber Network Service Survivability, Tsong–Ho Wu, Artech House, Boston, pp. 1–15, 123–211 (1992).

A photocopy of Canadian patent application No. 2,161,847, filed Oct. 31, 1995 (published May 1, 1997), including drawings and filing certificate, corresponding to U.S. Patent application No. 08/551,709, filed Nov. 1, 1995, 32 pages.

Information Sheet on Existing Telco Digital Cross–Connect Switch (DCS), prior to Oct. 20, 1997.

* cited by examiner

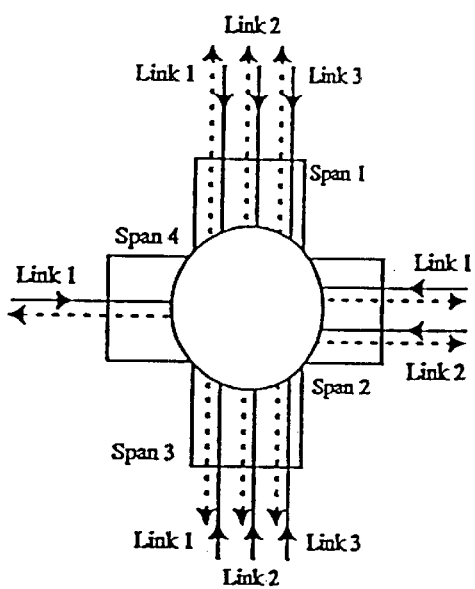
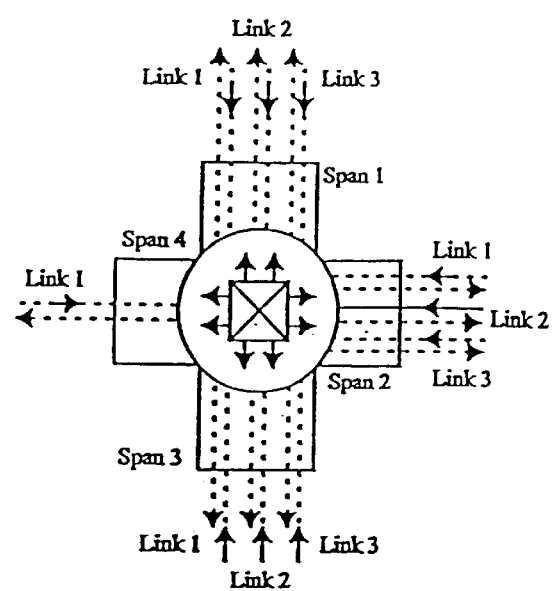
Figure 1A
Figure 1B

Figure 3A

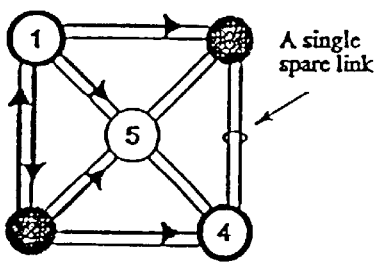

Network topology showing one spare link per span and the initiation of ordinary flooding.

Figure 3B

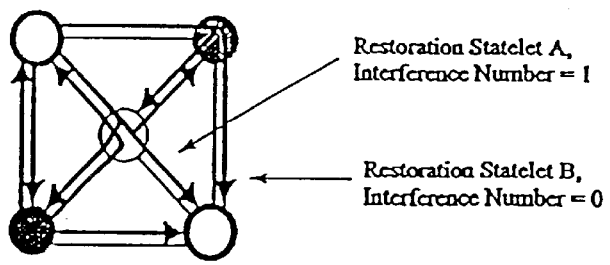

Restoration Statelet A, Interference Number = 1

Restoration Statelet B, Interference Number = 0

Steady state of the network until node 4 reverse links restoration statelet B.

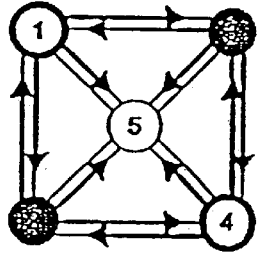

Network topology showing one spare link per span and the initiation of bidirectional flooding.

Figure 3C

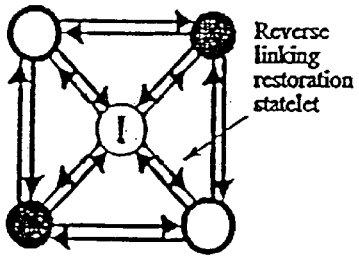

Reverse linking restoration statelet

Recognition of a match between black and grey restoration statelets at node 5 initiates reverse linking.

Figure 3D

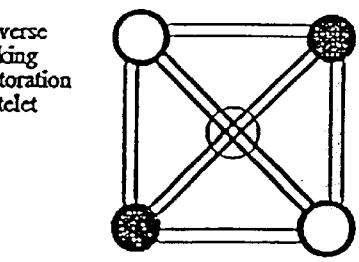

Final state of the network with two bidirectional restoration paths.

Figure 3E

Register Fields immediately after the failure of span 2

| Statelet Span/Link | Statelet In/Out | Source | Dest. | Index | Assoc. Span | Assoc. Port |
|---|---|---|---|---|---|---|
| 1 | In | Null | Null | Null | 2 | 2 |
|   | Out | A | B | C |   |   |
| 2 (Before failure) | In | A | B | C | 3 | 3 |
|   | Out | X | Y | Z |   |   |
| 2 (After failure) | In | Null | Null | Null | 3 | 3 |
|   | Out | X | Y | Z |   |   |
| 3 | In | X | Y | Z | 2 | 2 |
|   | Out | A | B | C |   |   |
| 4 | In | Null | Null | Null | 2 | 2 |
|   | Out | A | B | C |   |   |

Figure 19A (a) recognizing a match
Figure 19B (b) initiating reverse linking
Figure 19C (c) failed reverse linking Port Register Fields

| node | link | Tx/Rx | source | dest. | index | rli | activated |
|---|---|---|---|---|---|---|---|
| 1 | 1 | Tx | null | null | null | null | false |
|   |   | Rx | E | F | i | null |   |
|   | 4 | Tx | A | B | x | null | true |
|   |   | Rx | *B* | *A* | *y* | *x* |   |
|   | 3 | Tx | *B* | *A* | *y* | *x* | true |
|   |   | Rx | A | B | x | null |   |
| 2 | 2 | Tx | null | null | null | null | false |
|   |   | Rx | A | B | x | null |   |
|   | 5 | Tx | A | B | x | null | false |
|   |   | Rx | null | null | null | null |   |
|   | 3 | Tx | A | B | x | null | false |
|   |   | Rx | null | null | null | null |   |
| 3 | 4 | Tx | *B* | *A* | *y* | *x* | true |
|   |   | Rx | A | B | x | null |   |
|   | 6 | Tx | *B* | *A* | *y* | *x* | true |
|   |   | Rx | A | B | x | null |   | rli: reverse linking indicator
bold: forward flooding statelet
italic plain: reverse linking statelet

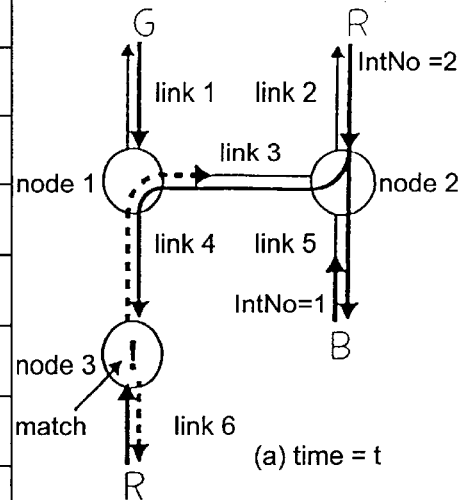

⟶ Forward flooding statelet
----▶ Reverse linking statelet (a) time = t

Port Register Fields

| node | link | Tx/Rx | source | dest. | index | rli | activated |
|---|---|---|---|---|---|---|---|
| 1 | 1 | Tx | null | null | null | null | false |
|   |   | Rx | E | F | i | null |   |
|   | 4 | Tx | A | B | x | null | true |
|   |   | Rx | *B* | *A* | *y* | *x* |   |
|   | 3 | Tx | *B* | *A* | *y* | *x* | true |
|   |   | Rx | A | B | x | null |   |
| 2 | 2 | Tx | C | D | u | null | false |
|   |   | Rx | A | B | x | null |   |
|   | 5 | Tx | A | B | x | null | false |
|   |   | Rx | C | D | u | null |   |
|   | 3 | Tx | C | D | u | null | false |
|   |   | Rx | *B* | *A* | *y* | *x* |   |
| 3 | 4 | Tx | *B* | *A* | *y* | *x* | true |
|   |   | Rx | A | B | x | null |   |
|   | 6 | Tx | *B* | *A* | *y* | *x* | true |
|   |   | Rx | A | B | x | null |   | rli: reverse linking indicator
bold: forward flooding statelet
italic plain: reverse linking statelet

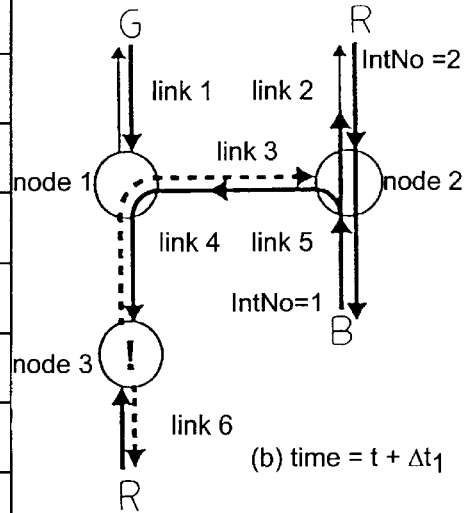

(b) time = t + Δt₁

Figure 23

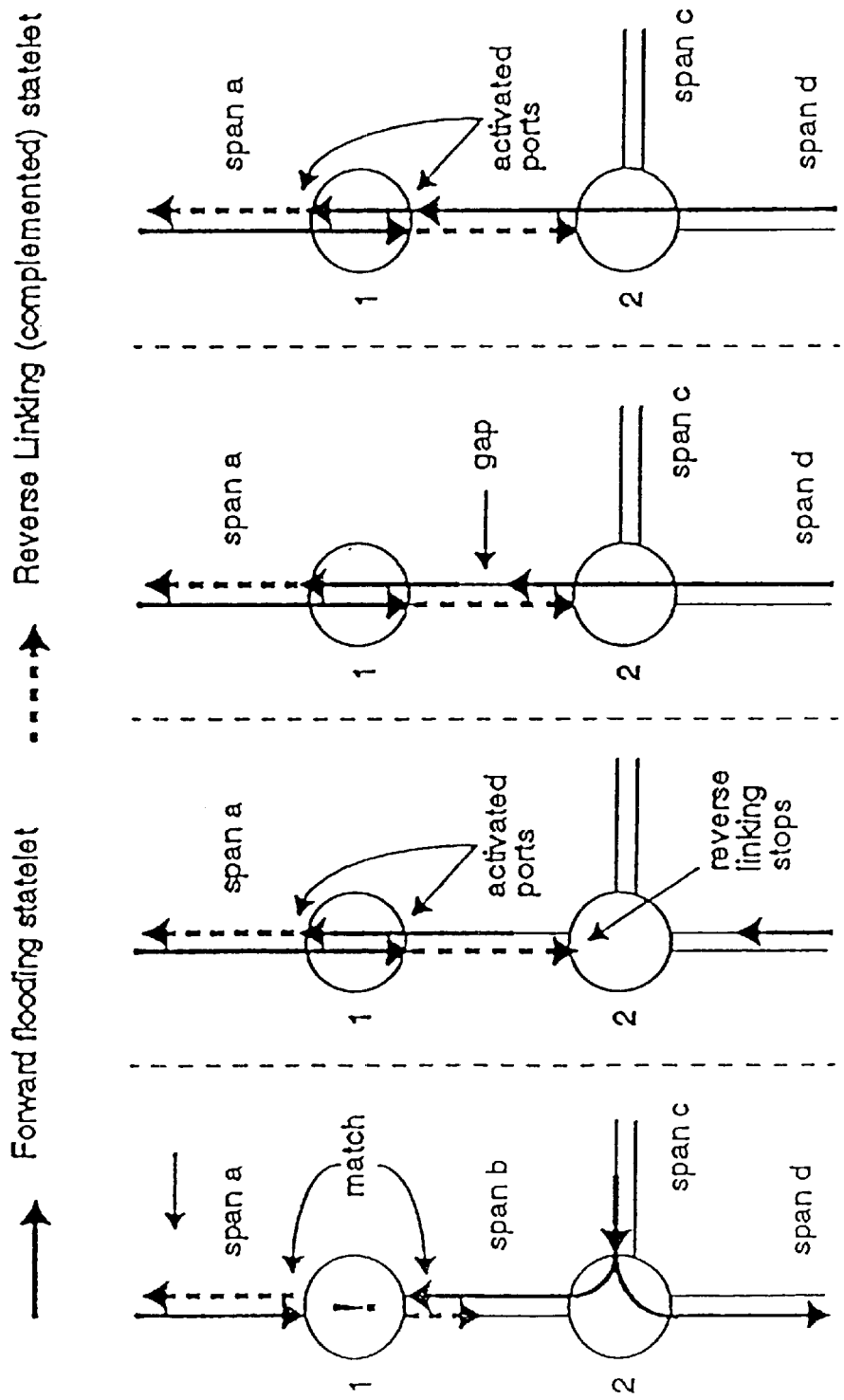

PATH RESTORATION OF NETWORKS

FIELD OF THE INVENTION

This invention relates to methods for establishing or restoring communications paths in networks, for example telecommunications networks, particularly upon the occurrence of a failure of one of the spans or nodes of the network.

BACKGROUND OF THE INVENTION

The development of Digital Crossconnect Systems (DCS), and networks with physically diverse routes, promotes the use of mesh restoration. DCS machines are in many respects similar to a computer, and a transport network consisting of Digital Crossconnects is similar in many respects to a distributed multiprocessor. Mesh-based survivable or restorable network architectures exploit the intelligence of a DCS-based transport network to minimize the amount of spare capacity required to protect working demands. See: Bates, B., Gregory, D., Voice and Data Communications Handbook, New York, NY: McGraw-Hill Inc., 1996, Barezzani, M., Pedrinelli, E., Gerla, M., "Protection planning in transmission networks", Proc. IEEE ICC'92, 1992, pp. 316.4.1–316.4.5. Chao, C. W., Fuoco, G., Kropfl, D., "FASTAR platform gives the network a competitive edge", AT & T Technical Journal, July/August 1994, pp. 69–81. Chng, R. S. K., Botham, C. P., Johnson, D., Brown, G. N., Sinclair, M. C., O'Mahony, M. J. Hawker, I., "A multi-layer restoration strategy for reconfigurable networks", Proc. IEEE Globecom '94, December 1994, pp. 1872–1878. Chujo, T., Komine, H., Miyazaki, K., Ogura, T., Soejima, T., "Distributed self-healing network and its optimum spare capacity assignment algorithm", Electronics and Communications in Japan, part 1, vol. 74, no. 7, 1991, pp. 1–8. Coan, B. A., Vecchi, M. P., Wu, L. T., "A distributed protocol to improve the survivability of trunk networks", Proceedings of the 13th International Switching Symposium, May 1990, pp. 173–179. Coan, B. A., et al., "Using distributed topology updates and preplanned configurations to achieve trunk network survivability", IEEE Transaction on Reliability, vol. 40, no. 4, 1991, pp. 404–416. Davis, L., Cox, A., Qiu, Y., "A Genetic Algorithm for Survivable Network Design", Proc. of the Fifth International Conference on Genetic Algorithms, July, 1993, pp. 408–415. These networks are called "mesh restorable" not to imply that the network is a full mesh, but to reflect the ability of the rerouting mechanism to exploit a mesh-like topology through highly diverse and efficient rerouting of failed signal units.

Ideally a restoration algorithm should restore a network failure quickly (within two seconds), require little administration overhead, handle numerous failure scenarios (not just single span cuts), be highly reliable, easily accommodate network growth, adapt itself to any network topology, and require a minimum amount of spare capacity. Of all restoration architectures, mesh restorable networks employing distributed dynamic path restoration have the greatest potential to satisfy these goals (as discussed in Fujii, H., Yoshikai, N., "Restoration message transfer mechanism and restoration characteristics of double-search self-healing ATM network", IEEE J-SAC Special Issue: Integrity of Public Telecommunication Networks, vol. 12, no. 1, Jan. '94, pp. 149–158).

To date several centralized and distributed dynamic span restoration algorithms have been reported: Barezzani, M., Pedrinelli, E., Gerla, M., "Protection planning in transmission networks", Proc. IEEE ICC'92, 1992, pp. 316.4.1–316.4.5. Chao, C. W., Fuoco, G., Kropfl, D., "FASTAR platform gives the network a competitive edge", AT & T Technical Journal, July/August 1994, pp. 69–81. Chng, R. S. K., Botham, C. P., Johnson, D., Brown, G. N., Sinclair, M. C., O'Mahony, M. J. Hawker, I., "A multi-layer restoration strategy for reconfigurable networks", Proc. IEEE Globecom '94, December 1994, pp. 1872–1878. Chujo, T., Komine, H., Miyazaki, K., Ogura, T., Soejima, T., "Distributed self-healing network and its optimum spare capacity assignment algorithm", Electronics and Communications in Japan, part 1, vol. 74, no. 7, 1991, pp. 1–8. Coan, B. A., Vecchi, M. P., Wu, L. T., "A distributed protocol to improve the survivability of trunk networks", Proceedings of the 13th International Switching Symposium, May 1990, pp. 173–179. Coan, B. A., et al., "Using distributed topology updates and preplanned configurations to achieve trunk network survivability", IEEE Transaction on Reliability, vol. 40, no. 4, 1991, pp. 404–416. Of these Chng et al and Chujo et al claim the ability to perform path restoration. In general, any span restoration algorithm can be turned into a rudimentary path restoration scheme by iteratively applying the span restoration algorithm to all affected source—destination demand pairs. Using a span restoration algorithm to perform path restoration in this way was previously called Capacity Scavenging [Grover, W. D., Selfhealing Networks—A Distributed Algorithm for k-shortest link-disjoint paths in a multi-graph with applications in realtime network restoration, Ph.D. Dissertation, University of Alberta, Fall, 1989, referred to herein as the Grover Thesis]. While Capacity Scavenging can be used in path (and hence node) restoration, the recovery patterns obtained from uncoordinated concurrent (or arbitrary sequential) execution of a span restoration algorithm for every demand pair affected by a node or span failure may not yield an even allocation of recovery levels amongst affected demand pairs, or synthesize the maximum number of restoration paths topologically feasible.

While a few distributed dynamic path restoration algorithms have been reported [Chow, C. E., Bicknell, J. D., Mccaughey, S., "Performance analysis of fast distributed link restoration algorithms", International Journal of Communication Systems, vol. 8, 1995, pp. 325–345, Doverspike, R. D., Morgan, J. A., Leland, W., "Network design sensitivity studies for use of digital cross-connect systems in survivable network architectures", IEEE J-SAC Special Issue: Integrity of Public Telecommunication Networks, vol. 12, no. 1, January '94, pp. 69–78], none attempt to find a pathset which restores the maximum amount of lost demand topologically feasible. Distributed dynamic path restoration algorithms developed to date have focused on achieving restoration within the two second call-dropping threshold, and have given capacity efficiency secondary consideration.

SUMMARY OF THE INVENTION

The research presented here is unique in that it is the first distributed dynamic path restoration algorithm which attempts to configure the surviving spare links of a path restorable network to restore failed working paths in a capacity efficient manner, and do so within the two second call-dropping threshold, while achieving the other goals for path restoration of a mesh restorable network.

There is therefore provided a method and apparatus for establishing a communications path in a telecommunications network, in which the network is formed by plural nodes interconnected by plural spans, each span containing working and spare links, each node having a cross-connect switch for connecting links in spans terminating at the node and a controller for controlling propagation and content of statelets arriving at or transmitted from the node. In a first aspect of the invention, the method comprising the steps of:

propagating statelets through the network, in which each statelet comprises fields designating a source node for the statelet, a statelet index, and a measure of the spare capacity of spans traversed by the statelet;

updating each statelet transmitted from a node on a span, except at a destination node for that statelet, to alter the measure of spare capacity according to the spare capacity of the span on which the statelet is to be transmitted; and creating a communications path through the nodes traversed by a statelet upon arrival of a statelet at the destination node of the statelet.

In a further aspect of the invention, the statelet comprises a field identifying the destination node of the statelet.

In a further aspect of the invention, the measure of spare capacity takes into account how many statelets are competing to be broadcast along the span and how many spare links in the span are available for broadcasting statelets.

In a further aspect of the invention, the measure of spare capacity is the difference between how many spare links in the span are available for broadcasting statelets and how many statelets are competing to be broadcast along the span.

In a further aspect of the invention, propagation of statelets is initiated upon receipt by a node in the network of a signal indicating that a working path in the network has failed.

In a further aspect of the invention, there is included the step of favouring use of spare links terminating at an end node of a failed working path by any statelet for which the destination node of the statelet is an end node of the failed working path.

In a further aspect of the invention, favouring use of spare links comprises:

defining a local protection area comprising nodes adjacent to an end node of a failed working path; and updating a field in statelets traversing the local protection area in a manner that decreases the likelihood that the statelets will be broadcast from subsequent nodes if the destination node of the statelets is not the end node of the failed working path.

In a further aspect of the invention, favouring use of spare links comprises:

broadcasting statelets from first and second end nodes of a failed working path along respective paths until a statelet initiated by the first end node meets, at a tandem node, a statelet initiated by the second end node; and propagating the statelet initiated by the first end node along the path followed by the statelet initiated by the second end node until the statelet reaches the second end node.

In a further aspect of the invention, there is provided the step of confirming the existence of a connected path between the first and second end nodes.

In a further aspect of the invention, each source node attempts to broadcast as many statelets, each corresponding to a different index family, as there are lost working paths.

In a further aspect of the invention, each statelet broadcast by a source node has an index field whose value is uniquely associated with the source and destination node of the statelet and the span on which the statelet is transmitted from the source node.

In a further aspect of the invention, each tandem node transmits on each span only one statelet having a specific combination of index field, source node and destination node.

In a further aspect of the invention, each tandem node attempts to broadcast each statelet arriving at the tandem node on as many spans as possible.

In a further aspect of the invention, each statelet contains a route field and the method further comprises the steps of:

each tandem node updating the route field of a statelet upon arrival of the statelet at the tandem node to include the identification of the tandem node, whereby the statelet contains a record of the nodes traversed by the statelet; and preventing broadcast of each statelet to any tandem node previously traversed by the respective statelet.

In a further aspect of the invention, there is included the steps of:

identifying any communications paths having a length of one span; and preventing any statelet from being broadcast along a communications path having a length of one span.

In a further aspect of the invention, creating a communications path comprises:

upon receipt of a statelet at a destination node, transmitting a reverse linking statelet from the destination node along the nodes traversed by the statelet.

In a further aspect of the invention, there is provided the step of cancelling transmission of a reverse linking statelet from a destination node if a reverse linking statelet having a given index field value arriving at a tandem node has traversed spans with lower spare capacity than another statelet with the given index field value competing to be broadcast from the tandem node.

In a further aspect of the invention, each statelet contains a repeat field and the method further comprises the steps of:

each tandem node incrementing the value of the repeat field of a statelet upon arrival of the statelet at the tandem node; and preventing broadcast of statelets having a repeat field value greater than a pre-determined value.

There is also provided apparatus for carrying out the various aspects of the method of the invention.

These and other aspects of the invention are described in the detailed description of the invention and claimed in the claims that follow.

BRIEF DESCRIPTION OF THE DRAWINGS

There will now be described preferred embodiments of the invention, with reference to the drawings, by way of illustration, in which like numerals denote like elements and in which:

FIGS. 1A and 1B are schematics showing calculation of span interference numbers according to an implementation of the invention;

FIGS. 3A–3E are schematics showing how end node bottle necking may occur in which FIG. 3A shows a network topology with one spare link per span and the initiation of ordinary flooding (broadcasting of a statelet throughout the network), FIG. 3B shows a steady state of the network until node 4 reverse links restoration statelet B, FIG. 3C shows network topology with one spare link per span and the initiation of bidirectional flooding, FIG. 3D shows how recognition of a match between black and grey restoration statelets at node 5 initiates reverse linking; and FIG. 3E shows final state of the network with two bidirectional restoration paths;

FIG. 23 is a schematic showing reverse linking according to an embodiment of the invention;

FIGS. 28A, 28B, 28C and 28D are schematics showing overwriting of a precursor from the same statelet family on an activated port according to an embodiment of the invention;

DETAILED DESCRIPTION OF PREFERRED EMBODIMENTS

Definitions

Figures 2A, 2B:
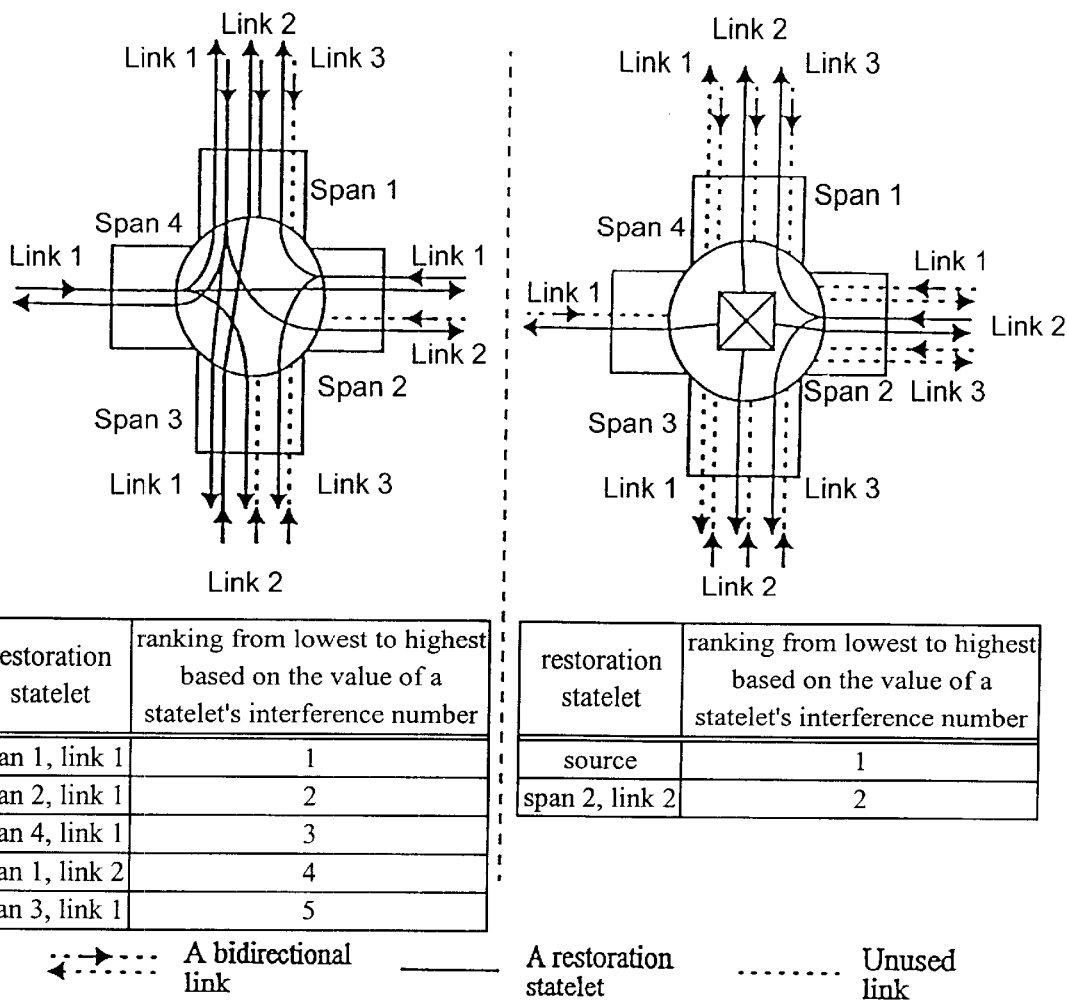
FIGS. 2A and 2B are schematics showing examples of target broadcast patterns for an implementation of the invention.

The term link denotes an individual bidirectional digital signal carrier between adjacent nodes at the DCS signal management level, for instance one DS-3, STS-1 or STS-N. A link between two nodes may be one of many links between the two nodes. A span is the set of all working and spare links in parallel between adjacent nodes. A statelet is an electronic message or information package that is formed of various information containing fields. A broadcast of a statelet occurs when a statelet received by a node is re-transmitted by that node on a spare link of each span terminating at that node pursuant to a set of rules defining which of several statelets competing for broadcast will be broadcast.

Network Design

Each node N in the networks shown in the figures incorporates a conventional digital cross-connect switch (DCS) for making and breaking connections, between links in adjacent spans meeting at the node. The links may connect to the nodes through fiber optic terminals, for example AT&T FT Series G, for electrical/optic conversion of the signals. Exemplary digital cross-connect switches are the AT&T DACS IV-2000, Alcatel RDX-33 and the Tellabs Titan Model 5533. Adjacent spans at a node form a span pair. A network operations center (not shown), for example an AT&T Transport and Maintenance System, controls the operation of the digital cross-connect switches at the nodes via a control overlay of for example X.25 communications links (not shown). The network operations center includes a computer that may instruct the digital cross-connect switches to make and break connections between links in adjacent spans. The computer may be, for example, a UNIX work station that may be connected directly to the digital cross-connect switches via the X.25 communications links and through an X.25 packet assembler-disassembler. Each node also incorporates the equipment shown in FIGS. 30–32C, including a controller for controlling propagation and content of statelets transmitted through the network. The controller may be implemented in a multi-purpose computer programmed according to the specification of the method according to the invention or may be specifically designed to implement the method of the invention.

Statelet Based Distributed Restoration of Networks

Interactions between nodes in transport networks can take place over a reserved data link using messages explicitly addressed to neighbouring nodes, or via state based signalling. State based signalling relies on a defined set of information attributes associated with a transmission link to communicate a change in an adjacent node's state vis-a-vis the connecting link. Unlike a messaging channel which transmits information through a single serial communication channel between nodes, exchanging information using state based signalling exploits the high degree of spatial parallelism inherent in a transport network by virtue of the links between nodes, and avoids protocol stacks.

This invention relies on state-based signalling as the framework for interaction because it has benefits in simplicity and robustness, and is potentially much faster than message-based communication. State-based signalling requires that every port at a DCS has a receive and transmit register (elements 54 and 80 in FIG. 31) which is capable of storing the quasi-static information fields repeatedly applied to individual transport links. The receive register must have read status and the transmit register must have write status as seen by the processor. In a SONET network, restoration statelets may be transmitted by one or both of the unused bytes in the line overhead of a STS-1.

The nodes of a network in which the invention is deployed may interact solely through the restoration statelets (statelets) on the links between them. Restoration occurs as a network-level by-product of the isolated actions of each node, and the processor at each node acts only as a specialized statelet-processing engine during execution of the task.

The algorithm deployed at each node sees the outside world through the statelets arriving on the links at its site. Nodes influence each other indirectly by reacting to the statelets received, and changing the number and content of the statelets transmitted. While restoring a failure each node (DCS) acts as an isolated processor of statelets, sitting in and reacting to a sea of changing statelets.

The Interference Heuristic—OPRA

In the implementation of the preferred embodiment of the invention, a heuristic principle is applied to coordinate pathset formation. This principle is known as the interference principle and the procedures implementing it are referred to by the acronym OPRA. OPRA may be applied with bidirectional flooding or with unidirectional flooding. Both are described in this patent document. An overview of OPRA is first presented. Next a detailed implementation of OPRA with bidirectional flooding is presented. Finally, a detailed implementation with unidirectional flooding is presented.

A distributed path restoration algorithm must restore the maximum amount of lost demand topologically feasible regardless of a network's connectivity, and spare and working capacity placement. Considering the number of permutations and combinations of restoration paths possible between all source and destination node pairs affected by a failure, the use of a heuristic to find that pathset which maximizes network restorability ($R_n$) is warranted. $R_n$ is defined as follows.

$$R_n = \left( \sum_{i=1}^{S} [\min(w_i, k_i)] \right) / \left( \sum_{i=1}^{S} [w_i] \right)$$

where S is the number of spans in the network, $w_i$ is the working capacity on span i, and $k_i$ is the number of restoration paths the restoration mechanism deployed in the network is able to synthesize after the failure of span i.

Most distributed algorithms use a 'first come, first served' approach which is effectively a shortest path heuristic. [See Chow, C. E., Bicknell, J. D., Mccaughey, S., "Performance analysis of fast distributed link restoration algorithms", International Journal of Communication Systems, vol. 8, 1995, pp. 325–345]. The proposed distributed path restoration algorithm uses a new heuristic, identified as the interference heuristic, to configure the surviving spare links of a network into a collectively near optimal multi-commodity max-flow pathset. A restoration pathset close to the multi-commodity max-flow maximizes $R_n$.

Network restorability ($R_n$) is maximized by deferring the use of restoration paths which traverse spans with low spare capacity. Paths which traverse spans with low sparing render a large number of other restoration paths infeasible. Consequently OPRA prefers to use restoration paths which eliminate the fewest other restoration paths. This principle is the principle referred to as the interference principle.

Distributed restoration algorithms (DRAs) like the SHN [as described in the Grover Thesis] and OPRA incorporate some form of controlled rebroadcasting. OPRA uses the interference heuristic to control the rebroadcasting process in a way that preferably derives a complete set of link-disjoint non-looping paths between two nodes in a single pass. This pathset is consistent with the exact quantities of spare links available on each span in the network, and maximizes $R_n$.

Implementing the interference heuristic requires that local information at a node be used to defer growing broadcast meshes which traverse spans with low spare capacity. With only node local information available, the interference heuristic may be implemented knowing only the spare capacity available on the spans terminated at a node and the restoration signals present at a node.

The restoration signals used to establish the framework for interaction between nodes during restoration may be messages, packets, or state based signals similar to "signatures" in the Grover thesis. State based signalling is used to communicate between nodes, as recommended in "The Role of Digital Crossconnect Systems in Transport Network Survivability", SR-NWT-002514, Issue 1, Bellcore Special Report, January 1993. These state based signals are referred to as "signatures" in the SHN in the Grover thesis and as statelets herein. Though OPRA is described as a statelet-processing engine here, it is in general a processing-engine for any signal used for interaction between nodes during restoration.

In OPRA, a broadcast mesh which avoids traversing spans with low sparing is established by fulfilling to the greatest extent possible a specific target broadcast pattern for each statelet initiated at a source node, and received at a tandem node. This basic target broadcast pattern at a tandem node aims to forward one restoration statelet on one link on all spans terminated at the node except the span on which the restoration statelet arrived. The basic target broadcast pattern at a source node aims to forward on each span a number of restoration statelets equal to the number of working paths lost by this node. Often the target broadcast pattern at a node cannot be satisfied fully for each restoration statelet because a span can only support a limited number of restoration statelets, equal to the number of spare links on that span. The interference heuristic is used to mediate the competition between restoration statelets for rebroadcast. The interference heuristic requires calculating a span's interference number. If spans with low sparing are assigned a high interference number, and spans with high sparing are assigned a low interference number, and restoration statelets traversing spans with low interference numbers are preferentially rebroadcast first at a node, a distributed implementation of the interference principle is achieved. This distributed implementation defines the interference heuristic.

The number of other restoration statelets that cannot obtain rebroadcast in a given span determine that span's interference number. The interference number of a span is calculated by counting the number of restoration statelets competing to be forwarded on a span and subtracting from this sum the number of statelets the span can support.

As shown in FIG. 1A, two restoration statelets on span 2, three restoration statelets on span 3, and one restoration statelet on span 4, want to access the three spare links available on span 1, resulting in a span interference number of three for span 1. Likewise, restoration statelets originating at a node must compete with incoming signals for available spares. As shown in FIG. 1B, the node wants to transmit two restoration statelets on each span it terminates and also satisfy the single restoration statelet received on span 2, resulting in an interference number of zero for span 1.

When there are fewer spares on a span than there are restoration statelets wanting to obtain rebroadcast through it, a span's interference number is a positive integer. When there are more spares on a span than there are restoration statelets wanting to access it, a span's interference number is zero. A span is never allowed to have a negative interference number, as shown in FIG. 1B.

The interference number of a span remains constant while the target broadcast pattern is fulfilled at a node because the number of restoration statelets which would like to be forwarded on a span and the number of spare links available on that span for rebroadcast decrease monotonically in unison.

During restoration the interference number of a span will change as restoration statelets appear and disappear at a node. Calculating the interference number of a span associates larger values with spans that are in high demand and have little spare capacity, and smaller values with spans that are in low demand and have a lot of spare capacity.

The interference number of each span a restoration statelet traverses is added to the value of that statelet's interference number field. Initially the value of a statelet's interference number field is zero at the source node for a given demand pair, and accumulates as a statelet is rebroadcast at tandem nodes. The interference number of a path can then be determined from the sum of the interference numbers of all the spans a statelet traverses. The interference principle implemented at the node level using the interference heuristic, which rebroadcasts those restoration statelets with the lowest interference number first, results in a restoration pathset that maximizes $R_n$ at the network scale because paths which traverse spans with low sparing are not used unless no other restoration paths remain.

An example of the basic broadcast pattern which results at the node level when the interference heuristic is followed and those restoration statelets with the lowest interference number are rebroadcast first at a tandem node is shown in FIG. 2A. FIG. 2B shows a similar situation when a node simultaneously rebroadcasts and sources restoration statelets. The broadcast patterns shown in FIG. 2 assume each statelet belongs to a different demand pair, and that each demand pair has lost one unit of demand. The broadcast patterns shown aim to forward one restoration statelet on one link on all spans the node terminates, except the span on which a restoration statelet arrived in the case of a tandem node. The broadcast pattern for each statelet is either fully satisfied in FIG. 2 (i.e. has one rebroadcast in every span) or is partially satisfied to the greatest extent possible, consistent with a statelet's overall rank in terms of its interference number and the relative spans in which it and other statelets lie.

The interference number of a span quantifies the competition between restoration statelets for spares at a node. Determining the interference number of a path based on span interference numbers lends itself to a distributed implementation. All nodes in a network can simultaneously and independently calculate a span's interference number as restoration statelets appear and disappear. Furthermore, the interference number of a span can be added to the interference number of a restoration statelet before it is transmitted on that span, so that the interference number of a path accumulates as a restoration statelet transits a network. When restoration statelets traversing spans with low interference numbers are preferentially rebroadcast first at a node, a distributed implementation of the interference principle is achieved. This distributed implementation of the interference principle is called the interference heuristic.

The End-node Bottleneck Effect

While the interference heuristic can be used by a DRA to defer using paths which traverse spans with relatively few spare links, the heuristic as discussed requires modification to defer using paths which tandem through the source or destination of lost demands. It is advantageous to defer using such restoration paths because spare links incident with the source and destination of a failed working path are most efficiently used to restore demand originating at that node. When the spare links incident at a node are used to restore that node's lost demand, instead of tandeming a restoration path from another node pair, two spare links can be used to restore two units of lost demand instead of one.

FIG. 3 illustrates the problem encountered when multiple node pairs search for replacement paths simultaneously. Assume that node pairs 1-4 and 2-3 have each lost one unit of demand. If only one of the nodes from a relation affected by a failure searches for replacement paths, referred to as ordinary flooding in FIG. 3A, it is possible that some replacement paths will traverse through the nodes of other affected relations. In FIG. 3A the black restoration path for relation 1-4 traverses node 3, which is the destination for relation 2-3. When 1-4 restores one unit of lost capacity along the path traced by the forward flooding black restoration statelet (reverse linking) with the lowest interference number, i.e. restoration statelet B in FIG. 3A, 2-3 is prevented from restoring any demand.

To avoid early traversal of the source or destination of relations to be restored, both nodes from a relation affected by a failure may search for replacement paths concurrently. When this is done, the spare links incident with the source and destination of a failed working path are seized so that they may be efficiently used to restore demand originating at that node. If ordinary flooding is replaced with bidirectional flooding as shown in FIG. 3B, restoration statelets are transmitted on each of the links terminated at nodes 1,2,3 and 4. This prevents any restoration path in FIG. 3B from traversing either the source or destination of a relation to be restored, and leads to the creation of two restoration paths, one for relation 1-4 and one for relation 2-3 as shown in FIG. 3, and explained in greater detail later.

In the implementation of the preferred emdodiment of the invention, therefore it is preferred to favour use of spare links terminating at an end node of a failed working path by any statelet for which the destination node is an end node of the failed working path. One manner of accomplishing this is to use a double-ended or bidirectional flooding scheme. While two distributed span restoration algorithms published to date have employed bidirectional flooding in principle [Chow, C. E., Bicknell, J. D., Mccaughey, S., "Performance analysis of fast distributed link restoration algorithms", International Journal of Communication Systems, vol. 8, 1995, pp. 325–345, Fujii, H., Yoshikai, N., "Restoration message transfer mechanism and restoration characteristics of double-search self-healing ATM network", IEEE J-SAC Special Issue: Integrity of Public Telecommunication Networks, vol. 12, no. 1, January '94, pp. 149–158], they used it to reduce the restoration time rather than synthesize a restoration pathset which maximizes $R_n$. Though bidirectional flooding may decrease the restoration time of the distributed path restoration algorithm presented here, it may be used as part of the strategy to optimize the restoration pathset because it is an effective way to avoid the end-node bottleneck traversal problem. The term optimize or optimal when used in conjunction with restoration pathset implies a pathset which maximizes $R_n$. Spans local to an end node of a demand pair will be quickly seized by bidirectional flooding into anchoring paths for that demand pair.

Another manner of preventing bottle-necks at end nodes of failed working paths is to define a local protection area comprising nodes adjacent to an end node of a failed working path. An interference field in a statelet traversing the local protection area is updated in a manner that decreases the likelihood that the statelet will be broadcast from subsequent nodes if the destination node of the statelet is not the end node of the failed working path. The local protection area may extend several spans away from the end node. Likelihood of statelet broadcast may be decreased by increasing the interference number of the statelet without reference to the interference number of a span that is calculated according to the spare capacity of the span. The local protection area is described in more detail below in relation to FIG. 32.

Content and Uses of Restoration Statelet Information Fields

Figures 4, 5:
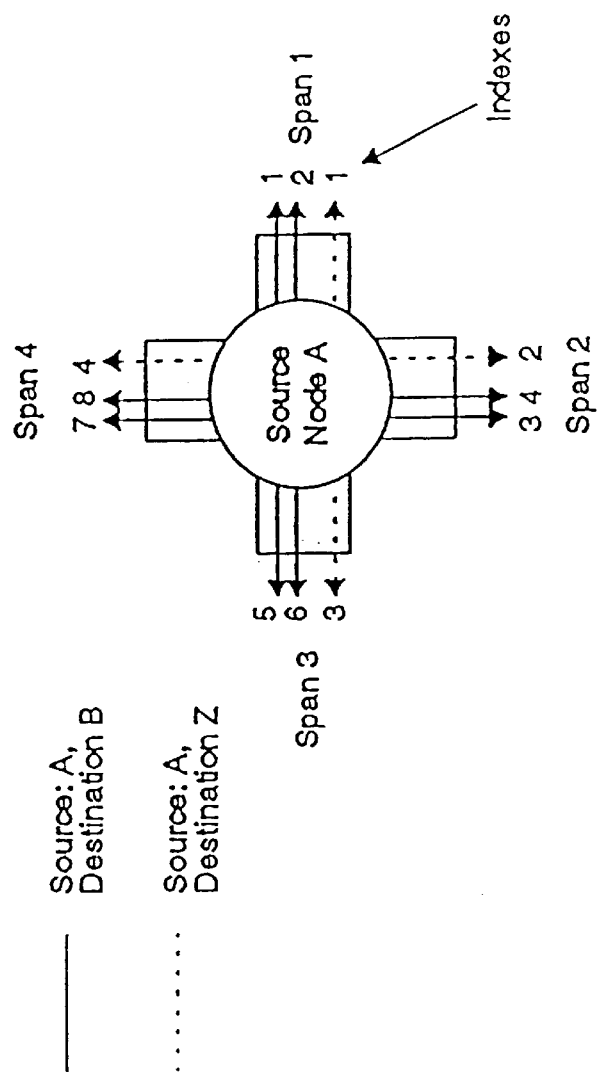
FIG. 4 is a schematic showing information fields in a statelet according to an embodiment of the invention.
FIG. 5 is a schematic showing indexing of statelets according to an embodiment of the invention.

The fields of a statelet are not normally intended for general purpose communication. A node originating a statelet does not necessarily know who will receive that statelet or who will be influenced by it. FIG. 4 shows the structure of a statelet, excluding the implementation specific fields for framing and data validation, which are always present. The subsequent discussion outlines each field of a statelet and the principle behind its use, deferring some details until later. The framing and checksum fields are omitted in this discussion. In SONET, explicit framing may not be needed in fact as this may be derived from the SONET frame timing, where the line overhead bytes are identified and demultiplexed to line-level applications and processing functions. The following is an explanation of the role of each restoration statelet's field.

Node ID (NID): This field is always asserted by a node when it applies a statelet to a link. The NID field is assigned the network-wide identifier of the node origination the statelet. The NID is not used for explicit routing purposes, rather it is used to deduce link-to-span logical associations. Each DCS groups links arriving at its site into logical spans based on the property that all incoming statelets with the same NID have come from the same adjacent node, and therefore form a logical span.

Span entities are an important logical construct in distributed restoration algorithms because the geographical diversity of a network's topology is resolvable at the span level. Using the NID eliminates the requirement for stored tables describing the composition of spans at each node because each node in which OPRA is deployed can deduce link-to-span associations from the NID for itself. Although the spans of a network are easily apparent from a centralized point of view, each node in which OPRA is deployed sees only an unstructured array of ports and must deduce span associations, and other logical implications of the topology, for itself. Using the NID also ensures that the network topology as seen by OPRA is up-to-date, even in the event of maintenance or service rearrangement.

Under normal operating conditions where there are no failures a null statelet is placed on every working and spare link in a network. In a null statelet all fields except the NID are set to null.

Source and Destination: Source and destination fields function as a label identifying the demand pair to be restored. In the event of a failure, these fields are assigned non null values by the nodes terminating a severed working path. Tandem (intermediate) nodes repeat these fields but never overwrite or change them.

The source and destination fields are also used to establish the logical direction of a statelet based on the order of the node names. For example, if node x is entered into the source field and node y is entered into the destination field of the statelet transmitted on link z. then the statelet on link z in tracing a restoration path from node x to node y.

The source and destination fields are similar to the source and target fields of a signature in U.S. Pat. No. 4,956,835 issued Sep. 11, 1990 (the method of which is referred to here as "SHN"). However, unlike the source and target fields of a signature, which identify the two nodes directly adjacent to a span failure, the source and destination fields identify the demand pair affected by a failure, and multiple demand pairs are usually affected by a single span failure. Furthermore, unlike the source and target fields of a signature, the source and destination fields of a restoration statelet do not serve as "labels" which keep the processing for one "fault instance" separate from all others. The present invention is a path restoration mechanism capable of restoring multiple span failures simultaneously without requiring that an instance of the DRA be initiated for each separate span failure. The source and destination fields simply allow a node receiving a statelet to determine whether or not it is the destination of that statelet, and if so, to which affected demand pair involving this node the received statelet belongs.

Index: The index field of a statelet is analogous to the index of a signature in SHN. It is used to uniquely identify a statelet family which may result in one link-disjoint path and to manage the contention which results from the several path construction efforts that occur concurrently.

The index field is assigned a unique number by the source of a statelet at the start of the forward flooding phase. Indexing is not repeated at a source node for a given demand pair, but runs sequentially over all spans and all statelets initiated by a node, as shown in FIG. 5. Only source nodes, i.e. the end-nodes of a failed working path, generated index numbers. Similar to the index field of a signature in the SHN, the index field of a statelet is generated once and never altered by any other node.

In FIG. 5, if demand pairs A-B, and A-Z lost 1 and 2 units of demand, respectively, the outgoing statelets shown would correspond to the target broadcast pattern for node A when functioning as a source. The target broadcast patterns for source and tandem nodes are presented in greater detail below.

Whereas only a single sender node in the SHN generates index numbers, all the demand pairs affected by a span failure generate index numbers in OPRA, and index numbers are only unique for a single demand pair. Therefore, the index field alone cannot represent a sub-family of signatures in the SHN. As shown in FIG. 5, index 1 is used twice; once by demand pair A-B, and once by demand pair A-Z. The source and destination in conjunction with the index field uniquely identify a statelet family in a network executing this preferred embodiment of the invention.

Each source, destination, and index field triplet originating at a source node becomes common to a larger set of statelets rebroadcast by tandem nodes, defining all statelets in one of the multiple concurrent flooding processes initiated by OPRA. The tandem node rules for contention amongst these flooding instances for access to available links treats statelets belonging to the same family in certain ways, and in different ways across families. The notion of competition between statelets families is central to implementation of the preferred embodiment of the invention because of its connection with the interference heuristic.

Return Alarm Bit (RA bit): Whenever a node observes an alarm on a working link it sets the return alarm bit in the reverse direction statelet. In the case of a unidirectional failure, such as a one-way single-regenerator, splice, fiber or connector failure the RA bit ensures that both the source and destination of a failed working path correctly activate an implementation of the invention. When a failure is bidirectional, the RA bit is redundant as other alarms activate an implementation of the invention in both the source and destination. All operations on the RA bit are delegated to the DCS port hardware. This attribute is inherited directly from the SHN signature and extended here to use on an end-to-end path basis.

Interference Number (IntNo): The interference number of every statelet transmitted by a node is increased by the current value of the interference number of the span used to transport the statelet. The interference number of a span is calculated by counting the number of statelets competing, not qualifying, to be forwarded on a span, and subtracting from this sum the number of paths the span can support, as shown in FIGS. 2A and 2B.

Statelets initiated by a source node compete with statelets from other demand pairs for which this node functions as a tandem node for outgoing spare links. The interference number of all statelets initiated by a source are assigned the same interference number. The initial value of a statelet's interference number is determined by the value of a node's Initial Interference Number (IIN).

While the initial interference numbers of all statelets initiated by a source node are usually set to zero, they may be increased after a lost working path is restored in order to facilitate restoring at least one working path from another demand pair affected by the same failure. The target broadcast pattern of the statelet with the lowest interference number is always satisfied first tot he greatest extent possible at tandem node, so increasing the interference number of all statelets emitted by a source gives statelets from other relations a better chance of being rebroadcast at tandem nodes.

Typically, the interference number of a statelet accumulates as it traverses the network. However, the interference number of a statelet is dynamic and may decrease as well as increase as statelets on other index, source, and destination families arrive and disappear at tandem nodes. While the interference number of a statelet may decrease, it is never less than zero because the interference number of a span in never allowed to be negative. Furthermore, any increase or decrease in a statelets interference number will cause a chain reaction in which the change is propagated down each branch of a statelet's family's logical tree, that spatially extends in all directions, and forms that family's broadcast mesh.

The interference number of a statelet is the primary factor influencing the logic of tandem nodes when statelets are in contention for rebroadcast. As mentioned previously, the statelets with the lowest interference number is always rebroadcast first at a tandem node.

Repeat Count: The repeat count field is a logical hop counter with the same basic role as it had in the SHN. It is part of a mechanism used to control the distance a statelet propagates in a restoration event. Associated with the use of the repeat field are two constants, the repeat-limit (also called maxRepeats) and the Initial Repeat Value (IRV), which are used in a preferred embodiment of the invention. When a source initiates a statelet, it assigns the IRV to the repeat field. maxRepeats is a network wide constant but the IRV is a node-specific constant so that, if desired, the range of a statelet can depend on which node acts as its source. This permits a region-specific range for restoration. The maximum number of hops that any statelet will be allowed to propagate away from the source is determined by subtracting the IRV from maxRepeats. The IRV can be made positive to reduce range, or negative to increase range.

While the range of a statelet is limited to maxRepeats, the maximum logical hop length of a restoration path found by OPRA is twice the value of maxRepeats because now both of the nodes from a demand pair to be restored behave as sources, analogous to senders in the SHN, following a failure. Each node traversed by the logical tree from a statelet family mesh increments the repeat field and rebroadcasts the statelets, except if the repeat limit would be exceeded. Any statelet that arrives at a node with a repeat value equal to or greater than the repeat-limit is ignored.

Figure 6:
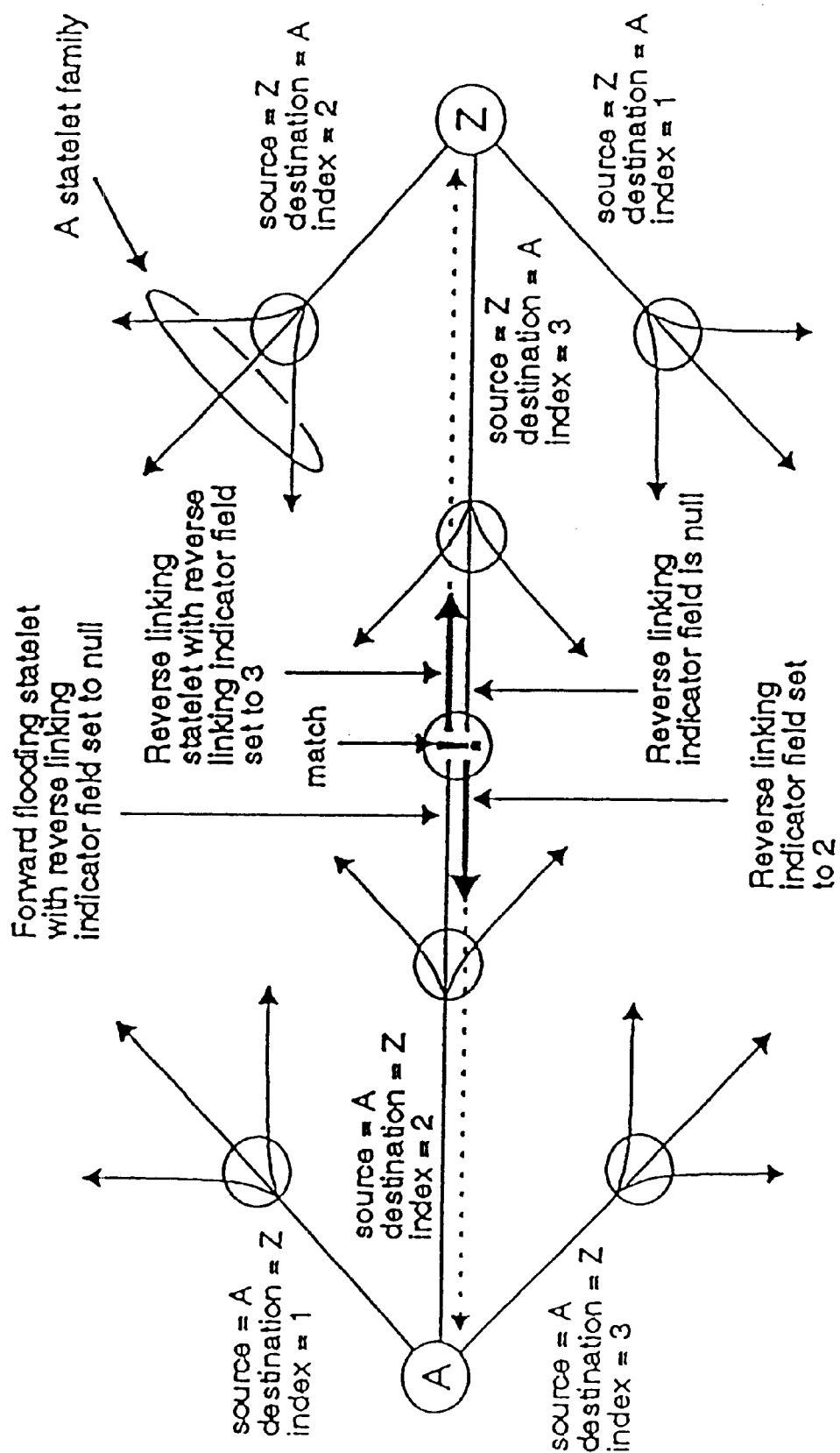
FIG. 6 is a schematic showing setting of the reverse linking indicator in a statelet according to an embodiment of the invention.

Reverse linking Indicator (complement field): As mentioned previously, bidirectional flooding may be employed when synthesizing restoration pathsets. After a failure, both end-nodes terminating a severed working path, named A and Z here, begin transmitting statelets that form the base or root of a broadcast mesh from a single source-destination-index statelet family, as shown in FIG. 6. At this stage of restoration, nodes A and Z behave analogous to senders in the SHN which initiate an index specific, rather than a source, destination, and index specific, flooding pattern. Unless a restoration path is one hop long, the statelet's initiated by A and Z will in general be rebroadcast through the network and meet at some tandem nodes, as shown in FIG. 6. When a statelet initiated by node A collides with a statelet initiated by node Z, the source-destination field is recognized as a match and a potential restoration path is identified. This event is called a match. After a match, the reverse linking indicator of the forward flooding statelet initiated by node A is set to the value of the index of the statelet initiated by node Z, and conversely for the reverse linking indicator of the statelet initiated by node Z.

Once the reverse linking indicator is set to a non-null value, the statelet from node A follows a path paralleling the forward flooding path of the statelet initiated by node Z, as shown in FIG. 6. A statelet whose reverse linking indicator is set is always paired with another statelet whose logical direction is its exact complement, so the source of the statelet initiated by node A is the destination of the statelet initiated by node Z, and vice-versa. Consequently, a statelet with the reverse linking indicator set may be referred to as a complemented statelet, and the reverse linking indicator may be referred to as the complement field. Reverse linking is complete when a complemented statelet reaches the source of the forward flooding statelet with which it is matched.

When the forward flooding statelet paired with a complemented statelet does not disappear at a tandem node, the reverse linking process is similar to the one described in the SHN. In this case the arrival of a complement statelet at a tandem node causes the complement condition to be propagated toward the source of the forward flooding statelet with which the reverse linking statelet is paired, and the cancellation of all other statelets on that source-destination-index family, reopening the local tandem node competition for new statelets on other families. However, unlike the reverse linking process in the SHN, a crosspoint order may not be given at this stage because the forward flooding statelet paired with a reverse linking statelet may disappear. A forward flooding statelet paired with a complemented statelet may disappear even after reverse linking is continued locally at one node. This is different from reverse linking in the SHN, and is believed to permit synthesis of a near optimal restoration pathset.

Confirmation Indicator: A statelet may be overwritten by a statelet from another family up until reverse linking is complete. In the event that the forward flooding statelet which is paired with a complemented statelet is overwritten locally at one node, reverse linking is stopped at that node. To determine whether or not the two complemented statelets initiated after a match reach their destination, the demand pair to be restored (A and Z in FIG. 7) perform a loop-back test using the confirmation indicator.

Figure 7:
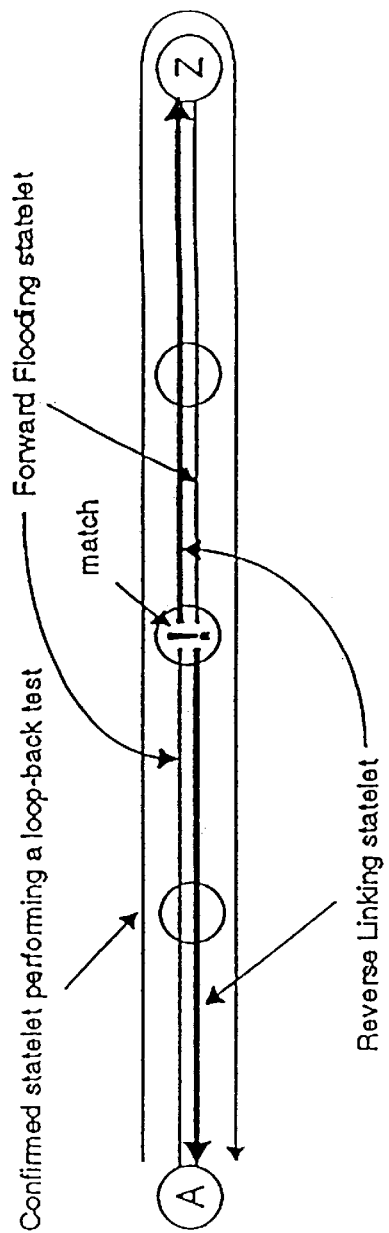
FIG. 7 is a schematic showing initiating of a loop-back test using a confirmation indicator according to an embodiment of the invention.

This confirmation phase is not an optional choice in deployment of an embodiment of this invention that uses bidirectional flooding because without it, in the event that the one reverse linking statelet reaches node A and the other reverse linking statelet never reaches node Z, node A in FIG. 7 would erroneously assume a complete restoration path existed between itself and node Z. Unlike the SHN, the state-based nature of the event-sequence during reverse linking that forms the paths of a statelet family, which in the SHN is defined by a signature's index and in a bidirectional flooding implementation of this invention is defined by a statelet's source-destination-index label, does not constitute an inherent end-to-end continuity test. only the confirmation phase of the restoration process constitutes an inherent end-to-end continuity test in the case of bidirectional flooding.

The confirmation phase is initiated after the complemented statelet destined for the node with the smaller ID, node A in FIG. 7, reaches its destination. This continuity test mimics the loop-back test often performed to check a new circuit in a telecommunications network, and involves transmitting a statelet with the Confirmation Indicator bit set along the path traced by the complemented statelet. A statelet with the confirmation indicator set will be referred to as a confirmation or confirmed statelet. A confirmation statelet starts at the source with the smaller node (node A in FIG. 7), proceeds to the destination along the path traced by the reverse linking statelet, and returns to the source if a valid restoration path exists.

mode: The mode field of a statelet is used to identify the particular application which should be executed using real-time distributed autonomous path-finding. The described implementation of this invention has been primarily oriented around path restoration. This involves special considerations such as alarm detection and checking that links are in spare status before using them for rerouting. These and other aspects specific to the restoration application appear in the description of which follows. The invention may also have use in other applications whenever it is desired to find a communications path in a network.

Factors Determining Statelet Length

The factors determining the bit size of the various fields of a statelet are based on several planning and implementation considerations. A statelet's length must be specified so that network growth is allowed for. Two measures of a network's size are reflected in the statelet:

(a) maximum number of nodes: this determines the length of the three node-name fields—NID, source, and destination.

(b) maximum number of working links on any one span: this determines the maximum number of bits that could be required for the index field of a statelet.

Not every field of a statelet is dependent on the size of a network. The RA field requires only a single bit to echo a receive failure to the far-end node.

The interference number of a statelet depends on the number of statelets competing to restore lost working paths after a network failure. In the event of a single span failure, the maximum interference number of a statelet can be estimated by multiplying the link-size of the largest span in a network by the degree of the largest node in the network and by the hop length of the longest restoration path allowed. A conservation estimate of the IntNo field's size would set it large enough to accommodate an interference number of this magnitude.

When 4 bits are used to transport the repeat count, a maximum repeat count limit of 16 spans is possible, and restoration paths are restricted to a maximum of 32 hops. A 32 hop maximum restoration path length limit is certainly sufficient for an extensive search of the solution space in even the largest networks used to test the invention's ability to synthesize a near optimal restoration pathset.

The reverse linking indicator is set to the value of a statelet's index after a match, as explained in the previous section. Therefore, the size of a statelet's complement field should be the same size as a statelet's index field.

The confirmation indicator is always assigned a unique value upon initiating a loop-back test. The size of a statelet's confirmation field should be large enough to assign a unique value to each restoration path initiated by a node. The maximum number of restoration paths for a given demand pair will never be more than the size of the largest span in a network. Therefore, an estimate of the confirmation indicator's bit size is the binary number for the link-size of the largest span in a network.

The size of a statelet's mode field depends on the number of applications which may use the invention's path finding capability. The invention may be adapted to a number of provisioning, network audit, and network functions. The reservation of 3 bits for the mode field would allow development of up to 8 different applications which reuse OPRA's kernel at each node.

The size of a statelet's parity or checkbits depends upon whether simple repetition rather than parity checking is used to verify a statelet's field. Simple repetition may reduce the effective statelet transfer speed by a factor which may be significant enough to affect real time performance. A single parity check bit may therefore be used to qualify received statelets, eliminating the need to wait for repetition in most cases. However, 2 errors within a statelet would defeat a one bit parity check. A 5 or 6 bit Cyclic Redundancy Check (CRC) would be the most conservative allocation to make. CRC-6 computation is simple to implement in a shift register circuit, and provides virtually zero probability of an errored statelet being interpreted as a state change, especially if repetition/persistence is also relied upon to generate a changed statelet event in a DCS port.

When one or both of the unused bytes in the LOH of a SONET transport signal is used to transmit statelets, no word alignment field is required to identify the start of a statelet. However, in some methods for statelet transport such as addition of transparent signalling capability to the D53 signal, it is impossible to use the timing attributes of the carrier signal to frame on a statelet. In this case one constantly toggling bit will allow simple statistical frame alignment on a statelet. If the statelet word alignment bit toggles in every statelet repetition, framing is simple and fast. Fast, robust, framing can also be derived from the presence of an embedded CRC or FEC code, without explicit allocation of framing overhead.

For SONET, the following is a possible distribution of statelet field sizes:

| statelet Field | Number of bits allocated |
| --- | --- |
| NID | 8 |
| source | 8 |
| destination | 8 |
| index | 8 |
| RA | 1 |
| IntNo | 9 |
| repeat count | 4 |
| reverse linking indicator | 8 |
| confirmation indicator | 8 |
| mode | 3 |
| CRC | 6 (optional) |
| statelet word alignment | 1 (variable) |
| Anticipated statelet bit length | 72 |

This anticipated statelet bit length is a natural allocation for a SONET implementation of this invention because a single SONET line overhead byte yields 8 bits of information. Given 9 bytes of statelet contents, plus a byte to align on the repetition sequence, a statelet's insertion time on a span would be 1.25 msec.

In the description of this invention, statelets may be classified into 3 groups depending on which information fields are assigned null values. In the forward flooding statelet, the reverse linking indicator and the confirmation indicator are both null, and none of the node ID, source, destination, index, IntNo, repeat count and mode fields are null. In the reverse linking statelet, only the confirmation indicator field is null. In the confirmation statelet, no fields are null.

Special relationships may exist between various statelets during a restoration event. These relationships are formally defined here.

Figure 8:
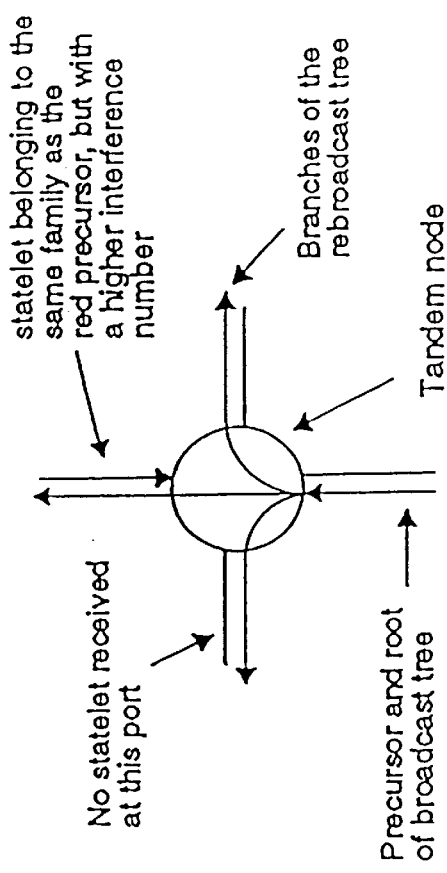
FIG. 8 is a schematic showing precursor relationships at tandem nodes according to an embodiment of the invention.

The Precursor Relationship: For each statelet family present at a tandem node, the port at which the root of the rebroadcast tree for that statelet family is found is called the precursor for that statelet (see FIG. 8). Transmitted statelets from the same family as the precursor are referred to as the branches of the rebroadcast tree. The precursor of a statelet family usually has the lowest interference number of all incoming statelets at the node on the same source-destination-index label and always is the root of the broadcast tree for that mesh. A precursor is a directed one-to-many relationship. One incoming statelet can be the precursor for many outgoing statelets, and every outgoing statelet has only one precursor. The precursor relationship strictly applies between statelets, meaning the precursor of a source-destination-index label may change ports at a node while restoring a failure.

Restoration Statelet Families: A family is the network-wide set of statelets with the same source, destination, and index. All of the statelets from the same family have the same logical direction, i.e. from source to destination regardless if the statelet is classified as forward flooding or a complemented statelet. Each statelet family may lead to the establishment of at most one restoration path. During forward flooding, a family of statelets expands outward from the source, tracing a path which is always connected back to the source via the sequence of precursor relationships established through preceding tandem nodes in a statelet family's mesh.

Matched Restoration Statelets: Two precursors, x and y, form a match when the source of statelet x is the destination of statelet y, and the source of statelet y is the destination of statelet x. Before a forward flooding statelet is rebroadcast at a tandem node, each port is checked to see if the received statelet matches any other received statelet. Matched statelets do not need to have the same index, but must both be precursors and be on the same source-destination label. Only statelets whose confirmation and reverse linking indicator fields are null can establish a match, i.e. a match can only be defined between forward flooding statelets. While a match condition arises frequently in bidirectional flooding, reverse linking is not always initiated. Initiating reverse linking after a match in bidirectional flooding is carefully controlled to minimize initiating reverse linking procedures which are destined to fail, and maximizing those which lead to the creation of a near optimal restoration pathset.

The Logical Environment of a Node

The following definition of a hardware environment in which this invention may be executed establishes a model logical programmers can reference when establishing and specifying an embodiment of this invention. The hardware environment described in this section is not the only implementation of this invention possible, but one which is consistent with the hardware environment developed to support the SHN.

The ports which interface the links of the transport network are viewed as the logical environment of a node. The port is the location at which statelets are received, and through which statelets are applied to a link. Each DCS port has storage registers (register 54 and register 80 in FIG. 31) for one transmit statelet and one receive statelet. In addition to the statelet registers, a register is required to store port specific, rather that link specific, state information. The Port Status Register (PSReg) stores port specific information pertaining to both the transmit and receive links termination at that port.

Port Status Register

The PSReg includes the following one-bit status fields: Line Alarm, Path Alarm, spare, activated, Restoration Statelet Change Interrupt Enable (RSCIE), Alarm Interrupt Enable (AIE), Alarm Indication Signal (AIS), and Receive Restoration Statelet (RxRS). It also includes an associated port (assoc-port), an associated span (assoc-span), and Trace field as shown in FIG. 9.

Figures 9, 10:
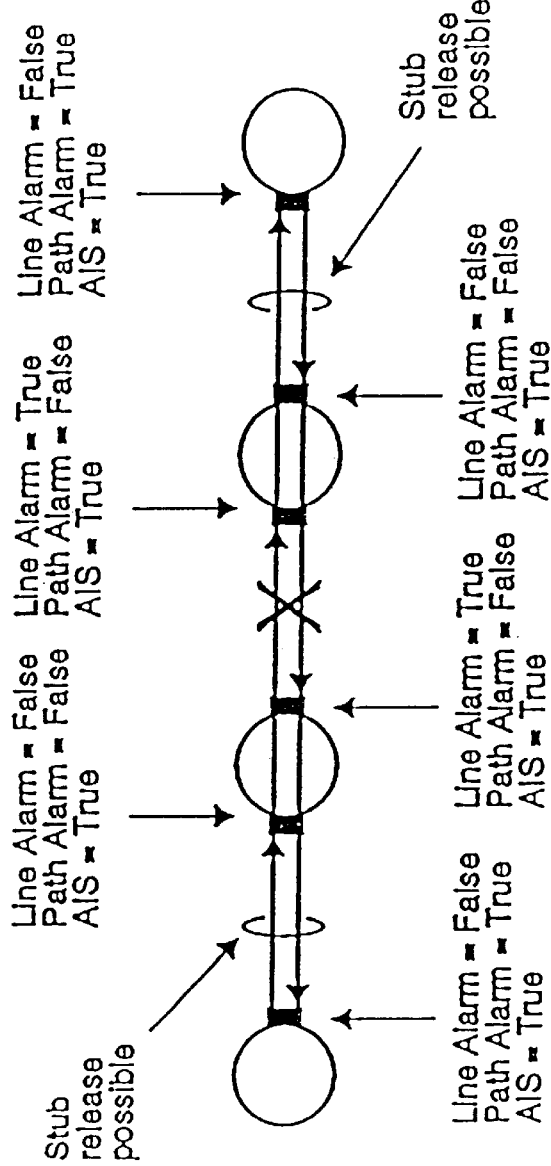
FIG. 9 is a schematic showing information fields in a register at a port status register (PSReg) in a node operating according to an embodiment of the invention.
FIG. 10 is a schematic showing alarm detection related PSReg contents after the failure of a working path according to an embodiment of the invention.

The function of many of the fields shown in FIG. 9 are similar to those associated with the port status register presented in SHN. In the following explanation of each field these similarities are identified.

Line Alarm: A Line Alarm occurs when a port terminates a link that is cut, as shown in FIG. 10. Any number of incoming link conditions such as signal loss, framing loss, clock recovery, loss of lock, high BER, etc. may trigger a line alarm signal at the conventional line terminating equipment of a SONET network (LTE).

Path Alarm: A Path Alarm occurs when a port terminates a failed working path. Any number of incoming link conditions such as signal loss, framing loss, clock recovery, loss of lock, high BER, etc. may trigger a path alarm signal at the conventional path terminating equipment of a SONET network (PTE). The path alarm informs a node it will be involved as a source and destination in the restoration process.

Alarm Indication Signal (AIS): The AIS bit is used to indicate which ports lost live traffic due to the failure of either a working or previously found restoration path. The AIS bit of all ports in a failed working path or a failed restoration path are set to true. The AIS field is used, along with the Line Alarm and spare bits, to determine which ports may be released after a failure when performing stub release. Only ports with AIS=true, spare=false, and Line Alarm=false are eligible for stub release, as shown in FIG. 10. When a working port is added to the pool of spare capacity available for use in restoration, the activated and AIS fields of the PSReg are set to false.

spare: The spare bit is set by the DCS in the course of normal provisioning activities and never changed. Under normal network conditions of no network failures, the spare bit of those ports not carrying any demand is set to true, and the spare bit of those ports carrying demand is set to false. Unlike the use of a port's spare bit in the SHN in the Grover thesis, the spare bit here is not used to identify those ports available for use in restoration at the time of a failure because under abnormal network conditions, such as after restoring a failure, a port with its spare bit set true may be part of a restoration path used to restore an earlier failure. The spare bit is used along with the Line Alarm and AIS bits to determine which ports can be released after a failure when performing stub release, as explained previously.

activated: the activated bit indicates whether a port is logically connected, and identifies those ports available for use in restoration at the time of a failure. If the activated field of a port is false, that port may be used to transmit a statelet. Under normal network conditions the activated bit of a spare port is set false, and true for a working port. After stub release, the activated bit of a working port added to the pool of spare capacity available for use in restoration is set to false.

The activated bits of ports of a forward flooding process are always set to false. The activated bits of ports which are part of a reverse linking process are always set to true. A pair of logically connected ports at a node part of a reverse linking process whose activated bits are set to true are not physically cross-connected in a DCS's switching matrix until a path's continuity is confirmed (see FIG. 7). Unlike the spare bit, the value of the activated bit is toggled between true and false when a link becomes part of a reverse linking and forward flooding process respectively. During the course of restoration, the activated field of a port may toggle between true and false many times while the paths traced by all statelets coalesce into a near optimal replacement pathset.

The activated field is not simply an indicator if a link is in statelet use or not, rather it indicates when a link is part of a reverse linking process, which may or may not lead to the successful synthesis of a restoration path. During the synthesis of a restoration path a single link may be part of multiple distinct reverse linking and forward flooding processes. Before, during, and after a restoration event, the activated field indicates which ports are not part of a reverse linking process and can be used to transmit new forward flooding statelets.

Restoration Statelet Change Interrupt Enable (RSCIE): The receipt of alarms and statelets generates interrupts that are sent to the controller (FSM). A port's interrupts can be masked by setting the RSCIE false. Setting the RSCIE false prevents a port from participating in a restoration event, effectively turning that port off. The use of the RSCIE is the same as the SCIE in the SHN.

Alarm Interrupt Enable (AIE): AIE is used to inhibit alarms on failed links. If the AIE is set false, a port is prevented from receiving alarms. Usually the AIE is only set false after a link receives an alarm, ensuring that repeated alarms are prevented from generating interrupts. The use of the AIE is the same as the AIE in the SHN.

Receive Restoration Statelet (RxRS): Whenever a statelet is received and confirmed, possibly by a hardware level check for CRC or repetition, and that statelet is different from the current contents of the receive register, the RxRS bit is set to true. This informs the controller (FSM) that a statelet-change event has occurred in that port. It is possible that multiple restoration statelets and/or alarms arrive at a node while the controller (FSM) is responding to an interrupt. Only after the controller (FSM) has completed processing an interrupt does it acknowledge newly received statelets as indicated by a port's RxRS field. The use of the RxRS is the same as the RSDEL in the SHN.

assoc-port and assoc-span: assoc-port and assoc-span store the identity of the port to which this port is connected logically by the precursor relationship during restoration, or physically connected via the local DCS matrix after restoration. During restoration, the assoc-port and assoc-span fields of all ports point to the location of the precursor for the outgoing statelet transmitted on that port. Given a completed restoration path, the assoc-port and assoc-span fields record physical cross-connect information.

Given that a port's span can always be obtained by reading the NID, only the assoc-port field is fundamentally required for the invention implementation described in this patent document. The assoc-span field is for convenience only. Furthermore, if the ports on a DCS have a node-global numbering assignment, the assoc-span field is not even needed for convenience, because a port in this case can be uniquely identified at a node by its port number alone, without specifying the span in which that port lies.

Trace: For each node terminating a working path, the Trace field records the ID of the far-end node. The Trace field is required to identify the demand pair to be restored after a failure in a path restorable network. While the path overhead of a SONET STS signal could carry the node ID of a signal's source, possibly using the J1 trace byte, such an application has not been standardized in SONET. Consequently, it is preferred to store the ID of the far-end node of a working path terminated at a port at the time a working path is provisioned in the Trace field.

The receive statelet register 54 (RxReg), transmit statelet register 80 (TxReg), and the Port Status Register 90 (see FIG. 31) collectively form the memory space in which all data needed are present and automatically updated by hardware in response to external events outside the node itself. All statelet processing rules are defined in terms of operations on the set of all registers at the active ports of a given DCS node. From the viewpoint of the implementation of the invention at a node, the host environment is therefore an array of logical records called ports.

Together, the RxReg, TxReg, and PSReg form the logical environment within which a preferred embodiment of this invention operates. A preferred embodiment of this invention perceives its environment through these registers only. All of the functions that this embodiment of the invention performs while restoring a failure require manipulating one or more fields of these registers.

The next part of this disclosure presents a detailed description of an embodiment of this invention emphasizing the node logic to analyze and react to the various events encountered during the restoration process, and thereby determine the protocol response by a node to those events. The overall action of an exemplary implementation of this invention will be introduced in seven conceptual stages:

1 activation,
2 bidirectional selective forward flooding,
3 recognizing a match
4 reverse linking,
5 restoration path confirmation,
6 traffic substitution, and
7 terminating a restoration event In reality, these phases are not exclusive, separate, or sequential, in time or space. They occur in a heavily concurrent manner while restoring a failure. However, the embodiment of this invention is described in the following sections as if these phases were separate and non-overlapping in time and space, solely to convey a functional understanding of the algorithm.

Finite State Machine (FSM) Representation of a Preferred Implementation of This Invention The controller logic uses for implementing this invention is preferably embodied as a Finite State Machine (FSM). As with the SHN, all processing by a preferred embodiment of this invention is of an event-driven nature using FSM techniques to encode all behaviourial rules, and can be described in terms of two primary event types that drive the FSM: a statelet arrival and "alarm" events. Restoration statelets as well as line and path level alarms generate interrupts which initiate transitions in the algorithm starting from the idle or normal state (state 14 in FIG. 11, traversing one or more action blocks (states 1–13 in FIG. 11), and ultimately returning to the idle state.

Action blocks are referred to as forced states in OPNET (M123, Inc. OPNET Modele-Manuals, 340D International Drive NW., Wash.D.C.), and the term forced state is used throughout this patent document. OPNET is a comprehensive development environment supporting the modelling and performance evaluation of distributed systems by discrete event simulation. OPNET was used to implement and test an implementation of this invention.

Figure 11:
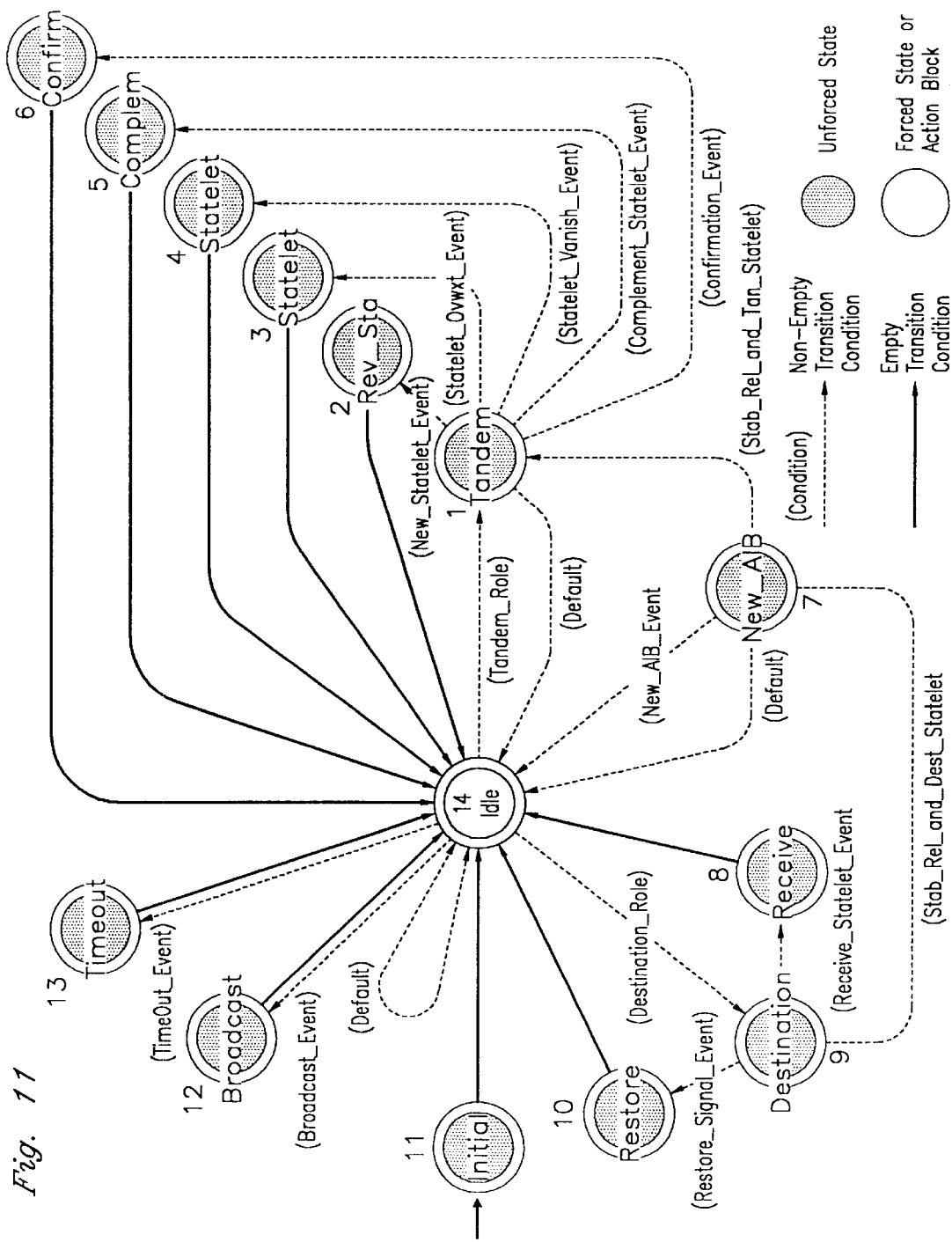
FIG. 11 is a schematic showing a state transition diagram for a finite state machine for use in implementing a method according to an embodiment of the invention.

Each of the seven conceptual stages requires traversing one or more of the action blocks shown in FIG. 11. States are mutually exclusive and complementary, meaning that a controller implementing a preferred embodiment of this invention is always exactly in one FSM state or action block: more than one state or action block may never be occupied at a time. The controller moves between states in response to the interrupts it receives. The transitions shown in FIG. 11 that depart from the idle state indicate which action block is executed, and the event condition that each change requires.

The condition which must be evaluated to determine whether or not the controller should enter the transition's destination state appears as a parenthesized label next to the arc. Transitions that have non-empty condition expressions are depicted as dashed arcs; unconditional transitions are depicted as solid arcs. All transitions that depart from a state are evaluated before the controller (FSM) progresses to any transition destination. Transitions that emanate from a state are mutually exclusive at the time they are evaluated (no two can simultaneously be true), and complementary (at least one is necessarily true).

The light state (state 14) shown in FIG. 11 is the only state in which the controller (FSM) may pause between interrupts, and is consequently referred to as an Unforced State in OPNET terminology. Unlike state 14, the controller does not wait for an interrupt while in states 1–13. As mentioned previously states 1–13 represent action blocks, and are referred to as forced states in OPNET terminology. While forced states cannot represent actual system states, they are useful to graphically separate the actions and control flow decisions the controller must perform in response to an interrupt. Graphically separating definitions of decisions and actions into action blocks or unforced states as shown in FIG. 11 provides better modularity for specification, as well as a more visually informative FSM.

Initializing and Activating An Embodiment of the Invention

After initializing the PSReg, RxReg, and TxReg, as well as any required memory locations, activation occurs when a path-level alarm is received at a node. In reality the individual port alarm detections may be distributed in time. Detection of an alarm raises an interrupt in response to which the controller identifies all working ports that have an alarm and all logical spans and links present at a node. The functions associated with the activation of the controller are categorized and implemented using three states shown in FIG. 11: state 11—initialization, state 14—idle, and state 7—new AIS. The following description of the activation of the controller details the contents of these three states, i.e. the actions the controller must perform whenever it transits states 11, 14, or 7.

Initialization (State 11, Initialize)

At the heart of an implementation of this invention is a set of predefined responses to various events encountered while restoring a network failure. These responses may be specified using a programming language such as C and a few OPNET kernel procedures. Due to the unique nature of OPRA, there are no OPNET kernel procedures which contained or encoded any of the logic necessary to correctly process a statelet or alarm. OPNET kernel procedures may be used to manipulate linked lists. These linked lists, as well as other required memory structures, are initialized in state 11 when OPRA is loaded into a DCS.

During initialization, the degree and ID of a node, as well as the total number of links per span is determined. Then the controller initializes four lists to increase its speed of execution by avoiding frequent searches of the whole node to find ports satisfying various statelet conditions. The first list, rec_set, is used to track all non-null statelets received by a node. The second list, spares, identifies all links available for use in restoration. The third list, dmd_pair_list, is used to record the amount of demand lost by this node and the IDs of the end nodes terminating the failed working paths sourced by this node. The fourth list, precursors, is used to track the port and span of a statelet family's precursor. A copy of the first two lists, rec_set and spares, is initialized for each span terminated at a node, while only a single copy of the third and fourth lists, dmd_pair_list and precursors, is initialized at a node.

The procedures described above executed upon transiting state 11 are summarized below:

1. Initialize variables.
2. Determine this node's degree.
3. Create one rec_set and spares list per span 4. Create one dmd_pair_list and precursors list per node.

Idle State (State 14)

After initialization, the controller enters the idle state. This state is the only state in which the controller can pause between interrupts, and the only static state of the state transition diagram shown in FIG. 11. Consequently, all transitions in FIG. 11 begin and end here. Which trajectory should be followed in response to an interrupt is determined by the conditions or logic associated with each transition.

Upon entering the idle state, the transmit statelet registers which the controller changed while processing an interrupt are latched onto the outgoing links of each altered port. Latching a transmit register onto a link updates that link's outgoing statelet. Registers are latched onto links in the same order in which they were updated internally in the controller's execution sequence.

The controller will remain in the idle state until the arrival of a statelet or until an alarm occurs. Before leaving the idle state, the controller determines which span and port originated the interrupt.

When leaving the idle state, if a new restoration task is being started, the controller builds a list of all ports available for use in restoration. This list is named spares and is built after the start of a restoration event rather than maintained independently at a node so that the controller can rely on the integrity of the data depicting the actual network structure at the time of a failure.

The procedures executed upon transiting state 14 are summarized below:

1. Update the outgoing links at a node if necessary.
2. Determine which port issued the interrupt.
3. Populate the list spares with all ports available for restoration when starting a new restoration event.

The transition which should be followed when exiting the idle state is determined by evaluating the conditions shown in parentheses in FIG. 11. A restoration event is started when some node in the network detects a path level alarm. Detection of a path level alarm raises an interrupt causing the controller to determine whether the AIS is true for the port initiating that interrupt. If so, the transition New_AIS_ event is followed from state 14 to state 7.

Receipt of an Alarm (State 7, New_AIS)

As shown in FIG. 10, whenever a path or line level alarm is detected at a node, AIS is true. Furthermore, AIS is true for every port in a failed working path even when no line or path level alarms exist. While a port showing only a AIS alarm cannot initiate a restoration event, that port can be added to the pool of spare capacity available for use in restoration. This is referred to as stub release. Since state 7 effects the local node's role in stub release as well as alarm processing, the transition condition from state 14 to state 7 is evaluated using the PSReg's AIS field, rather than the line or path alarm fields.

The first function performed transiting state New_AIS determines if a path or line alarm exists on the port initiating the interrupt. If a path alarm exists, the ID of the far end node terminating this failed working path, stored in the Trace field, is entered into a list which records the number of alarms received per affected relation, dmd_pair_list. In addition, state New_AIS releases the surviving portions of a cut working path when stub release is employed by setting the AIS and activated fields of the PSReg to false, and commanding the release of crosspoints between the ports on the failed working path.

Figure 12:
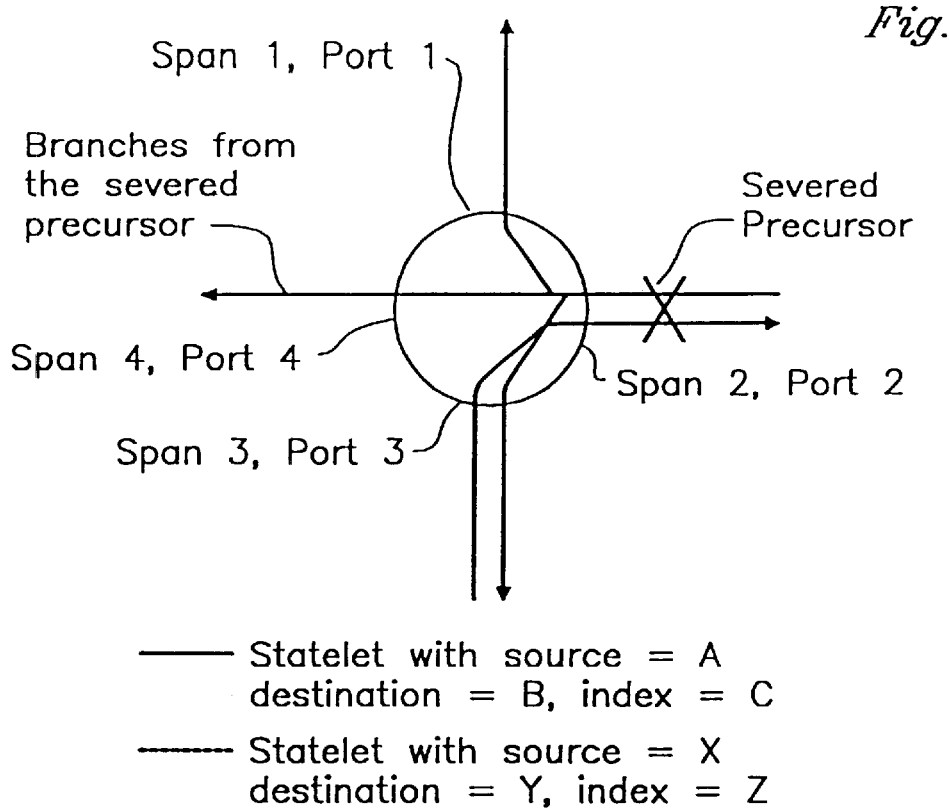
FIG. 12 is a schematic identifying a severed precursor according to an embodiment of the invention.

If a port supporting a restoration path, rather than a working path fails, the source, destination, and index of the restoration path must be determined. This information can easily be determined from the transmit statelet register of the failed port. However, in the event that a precursor seeking a restoration path, rather than a completed restoration path, is severed, as shown in FIG. 12, the information on the transmit statelet register of the failed port will not identify the source, destination and index of the failed precursor. Furthermore, after the precursor is severed, all of the fields in the receive statelet register on the failed port (port 2 in FIG. 12) are set to null.

To identify the family of the severed precursor as shown in FIG. 12, assoc_span and assoc_port fields of each port must be searched until a pointer to the severed precursor is found. Whether a restoration path or a precursor existed on the severed port, the assoc_span and assoc_port fields identify the port to which this port was connected, and the family of the statelet received on the severed link. For example, in FIG. 12, the assoc_span and assoc_port fields of span 1, port 1 point to the precursor on span 2, port 2, identifying span 1, port 1, as a branch of the severed precursor. When the branch of a severed precursor is identified, the family of the precursor can be identified because a precursor and its branches all belong to the same statelet family.

Once the family of the statelet received on the severed port is identified, all outgoing links transmitting a statelet belonging to the same family are either cancelled, or possibly re-rooted. Re-rooting a precursor is only performed when a new precursor for the statelet family on the severed port is found, and requires updating the assoc_span and assoc_port fields of all the severed precursor's branches to point to the new precursor. If a replacement precursor cannot be found, or if a restoration path carrying live traffic was severed, all of the links transmitting statelets belonging to the same family as the statelet received on the severed port are cancelled. That port is then removed from the list of ports available for use in restoration and from the list of ports receiving statelets.

A preferred implementation of this invention was designed to contend with the failure of working paths as well as completed restoration paths so that:

1. OPRA is capable of restoring restoration paths synthesized in a previous restoration event in the same network, and
2. OPRA is free to establish restoration paths using any surviving spare links on a partially cut span, as explained below.

Given that it is impossible in reality to sever all links in a span simultaneously, partial and complete span cuts are indistinguishable from OPRA's node-local point of view at the start of a restoration event. Therefore, OPRA may establish restoration paths over a span which are destined to fail when the remaining spare links on that span are severed. Without a priori knowledge whether a partial or complete span failure has occurred, and to exploit any surviving spares on a partially cut span, a controller implementing OPRA needs to be able to contend with the failure of both restoration paths and working paths.

Alternatively, an implementation of this invention can avoid using any span containing at least one links with an active Line Alarm signal, sacrificing the ability to use any surviving spares on a partially cut span, and thereby avoid dealing with the failure of completed restoration paths synthesized in the same restoration event. Assuming that once one link on a span fails, all links on that span will eventually fail, simplifies a DRA's design and allows span DRAs like the SHN to begin synthesizing restoration paths for all working links on a span containing at least one failed working link. This is referred to as preemptive activation in Grover, W. D., Venables, B. D., "Performance of the Self-healing Network Protocol with Random Individual Link Failure Times", IEEE ICC '91, pp. 660–666 and is practical in span DRAs like the SHN, but not necessarily in the present invention, because the failure of one working path at a source/destination node distant from a failure does not mean all working paths from that demand pair traverse the severed span and are destined to fail.

The procedures executed upon transiting state 7 are summarized below:

1. Record the demand pair affected by the failure of a completed restoration path or a working path as identified by the alarm.
2. Release the surviving portions of a cut working path if employing stub release.
3. If an uncomplemented precursor failed, rather than a completed restoration path or a working path, reroot the branches of that precursor onto a new precursor, otherwise cancel its branches.

Which transition is followed upon leaving the New_AIS state depends on whether the port which issued the interrupt received an alarm, or an AIS signal on a working link destined for stub release along with a forward flooding statelet simultaneously. In the event an alarm was received, the default transition is followed back to the idle state. In the event a statelet was received on a port just added to the pool of spare capacity available for restoration, either state 9 or state 1 follow. State 9 follows if this node is the destination of the statelet just received, otherwise this node functions like a tandem node and state 1 follows.

Bidirectional Selective Forward Flooding

After the arrival of a path level alarm at a node, that node initiates forward flooding statelets on its spare links. Each primary statelet issued by a source from a given demand pair is tamped with a locally unique index value. The basic target broadcast pattern at a source node aims to transmit on all spans this node terminates a number of statelets equal to the number of working paths lost by this node. Through rebroadcast at tandem nodes, each primary statelet will become the root of a tree of logical associations between statelets, all of which have the same source, destination, and index value in common. The basic target broadcast pattern of a tandem node aims to forward one restoration statelet on one link on all spans terminated at the node except the span on which that restoration statelet arrived. Physically, the expansion is away from the source in all directions, on each statelet family. There is no preferential orientation towards the destination, because neither the source nor any other nodes know which direction is "towards" the destination.

Statelets propagate at carrier velocities and appear within milliseconds as statelet arrival events at the ports of neighbouring DCS machines. The ensuing statelet interrupt generated by the port causes the operating system of those nodes to invoke the operation of OPRA. Nodes awakened by a non-null statelet with no line or path alarms on the associated link behave as tandem nodes performing the functions associated with states 1–6.

The main function of a tandem node at this stage is selective rebroadcasting of statelets based on their interference number. The network-level effect of selective rebroadcast is to activate yet more nodes as tandems. In this way, all nodes within a certain range of the source are alerted and develop an interacting mesh of rebroadcast patterns on each statelet family. The range of influence of the forward flooding phase is controlled by the repeat field of a statelet. As more tandem nodes become involved, the interference patterns of their rebroadcast efforts becomes increasingly complex and rich with information about the network's topology and capacity. The interference heuristic is responsible for mediating the competition between broadcast patterns such that a near optimal restoration pathset is found.

The basic functions associated with selective forward flooding are reused in five of the 14 states shown in FIG. 11: state 12—Broadcast, state 1—tandem_Node, state 2—New_Statelet, state 3—Statelet_Ovwrt, and state 4—Statelet_Vanish. The Contents of these five states are described next.

Forward Flood Management Logic (State 12, Broadcast)

The broadcast state is responsible for computing the broadcast pattern at a node. Computing the broadcast pattern at a node entails transmitting new forward flooding restoration statelets, but it does not involve cancelling statelets on other links by pruning the branches of a precursor, and/or transmitting a confirmation statelet.

The transition from the idle state to the broadcast state occurs when a node implementing OPRA is issued an interrupt indicating that the broadcast pattern should be computed. The polling mechanism used to service all ports at a DCS during a restoration event is responsible for issuing this interrupt.

Upon entering broadcast state 12, a list of all precursors present at the node is compiled. The best statelet from a family is found and designated that family's precursor. The best precursor for a given statelet family has the lowest interference number of all forward flooding statelets belonging to the same statelet family. If two or more statelets satisfy this condition, the one with the lower repeat count is chosen to be the precursor. If two or more statelets are still eligible to be the precursor, the one which was the precursor previously is chosen, otherwise one of the remaining candidates is designated the precursor for that family arbitrarily. Precursors are only found for statelet families which have not established a restoration path traversing this node, as indicated by the activated field of a port.

In path restoration it is possible that a node will simultaneously source statelets as well as rebroadcast statelets from other relations as a tandem node. For the statelets initiated at a node, the source node itself acts as the initiating precursor as if an internal "failed" working link existed. To ensure a source has the opportunity to initiate its own statelets on some or all of the spare links leaving it, a flag named SOURCE-FLOOD-INDICATOR is entered into the list of precursors whenever a node has its own demands to be restored.

The list of precursors, is sorted from lowest to highest interference number. The SOURCE-FLOOD-INDICATOR is assigned an interference number equal to the IIN(Initial Interference Number). The precursor at the head of the list is given the opportunity to establish its broadcast pattern first. Subsequent entries in the list then satisfy their target broadcast pattern to the fullest extent possible, using the remaining spare surviving outgoing links after any stub release has occurred.

Whenever the value of the IIN is zero, source flooding precedes the broadcast of all other precursors because source flooding precedes extending the broadcast mesh of an externally arising precursor in the event a precursor's interference number is equal to the IIN. If two or more precursors have the same interference number, the one with the lower destination ID is preferred. If a tie still cannot be resolved, the statelet with the lower source ID is chosen. While the repeat count is used to resolve a tie between statelets from the same family vying to be that family's precursor in the event both have the same interference number, the repeat count is not used to resolve a tie between precursors with the same interference number when sorting the list of precursors. Using the method described above to sort the precursor list ensures one precursor will precede another in the precursor lists constructed at all nodes. Consistently satisfying one statelet family at all nodes in the event two or more precursors at a node have the same interference number facilitates finding a match and helps decrease the restoration time, as explained below.

Figure 13:
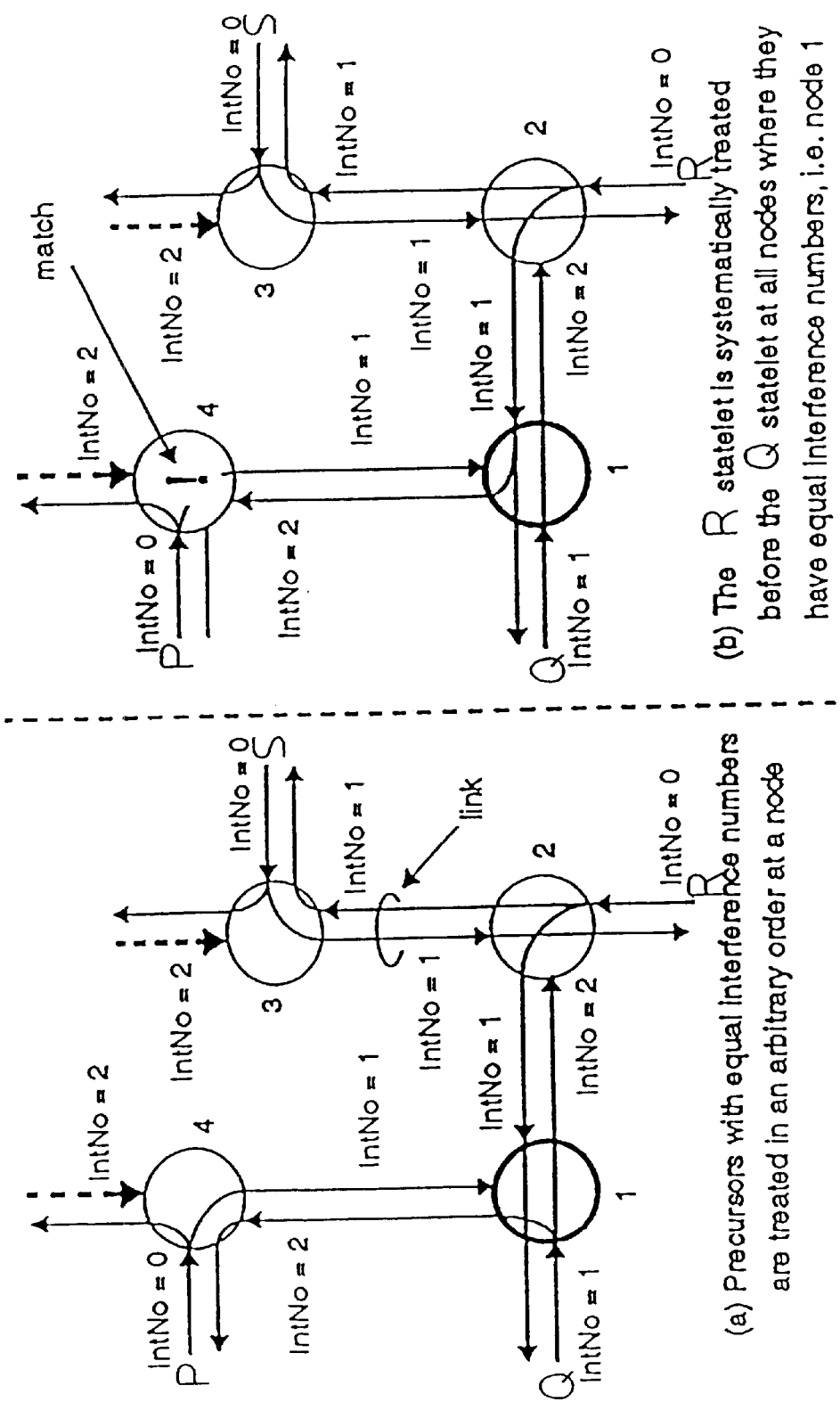
FIG. 13 is a schematic showing broadcasting of precursors according to an embodiment of the invention.

Consistently satisfying the broadcast pattern of one statelet family at all nodes receiving precursors with equal interference numbers promotes the growth of more complete forward flooding meshes at the network level. An expansive broadcast mesh improves a family's chances of either reaching its destination or finding a match. An example is shown in FIG. 13 where P,Q,R,S represent different statelet families, and the interference number of a statelet received by a node is written beside it. A match is possible in FIG. 13 between solid and dashed statelets of the same letter family. When the broadcast pattern of the R precursor is satisfied before the Q precursor at all nodes, a match results. When the broadcast patterns of precursors with equal interference numbers are arbitrarily satisfied, no match may be found, as shown in the illustrative example.

Given a sorted precursor list in a node, the composite broadcast pattern over all families present at a node may be computed. When a SOURCE-FLOOD-INDICATOR is encountered, the node attempts to transmit from each relation it sources a number of statelets equal to the demand lost by that relation on the spares of each span. For example, if 5 and 2 units of demand are lost between nodes A-X and A-Y respectively, node A attempts to broadcast 5 statelets per span with source=A and destination=X, and 2 statelets per span with source=A and destination=Y. Similarly, because bi-directional flooding is being performed, node X attempts to broadcast 5 statelets per span with source=X and destination=A, and node Y attempts to broadcast 2 statelets per span with source=Y and destination=A.

The interference number of each statelet initiated at a source is determined by calculating the interference number of the span on which the statelet is transmitted and adding this value to the IIN. The interference number of a span is calculated by counting the number of precursors that need to transmit a statelet on that span in order to satisfy their target broadcast pattern, and subtracting from this sum the total number of spare links still available for use in restoration on that span. Ports locked by reverse linking are not available to carry forward flooding statelets, and are therefore not subtracted from the sum of statelets waiting to be rebroadcast. Since reverse-linking takes precedence over forward flooding, an incoming complement statelet at a tandem node is reverse linked, supplanting any outgoing forward propagating statelet occupying that port matched with the reverse linking statelet, before span interference numbers are calculated.

The opportunity to establish restoration paths one hop long can arise when jointly optimizing the placement of working and spare capacity in a network. This would imply that a restoration path on the shortest route existed, but that the working demand was routed on a different one-hop route in parallel or via a longer route. Normal provisioning processes would put the working path on the shortest route. However in some combined capacity optimization designs, a linear programming technique may route demand over a few working paths longer then the shortest route in order to minimize the sum of working and spare capacity. When the working path routing is tailored to facilitate the target restoration mechanism, restoration paths one hop long are often possible, and it is preferred to exploit these opportunities when they present themselves.

Figure 14:
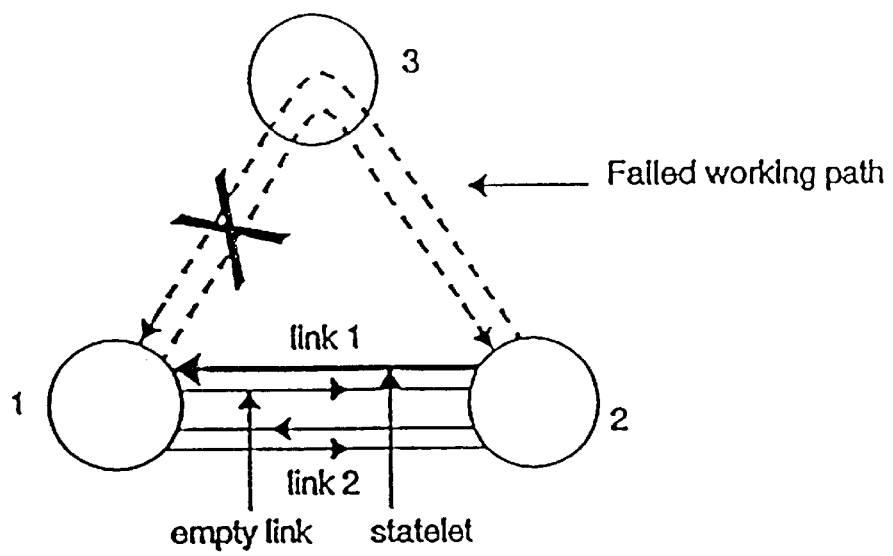
FIG. 14 is a schematic showing establishment of a restoration path one hop long according to an embodiment of the invention.

The opportunity to restore a failed working path using a restoration path one hop long, as shown in FIG. 14 is identified at a source node by comparing the destination of a forward flooding statelet this node proposes to transmit on a port to the NID present in the RxReg of that port. The event the NID and destination fields are the same, a restoration path one hop long can be established, and only the source node with the larger ID, as determined by comparing this node's ID to that same NID field identified previously, initiates sending statelets on the connecting span. Establishing a restoration path one hop long represents the most efficient use of spare capacity in a network and is used to restore lost demand whenever possible.

Only one of the nodes terminating a one-hop restoration path transmits statelets (node 2 in FIG. 14) to avoid occupying more links than required, and to avoid entering an indeterminate state. For example, in FIG. 14, if node 1 transmits a statelet on link 2, and node 2 transmits a statelet on link 1, two potential restoration paths may be identified simultaneously. The one that should be chosen to restore the single failed working path is indeterminate. Therefore only node 2 transmits a statelet on the span connecting nodes 1 and 2.

Figure 15:
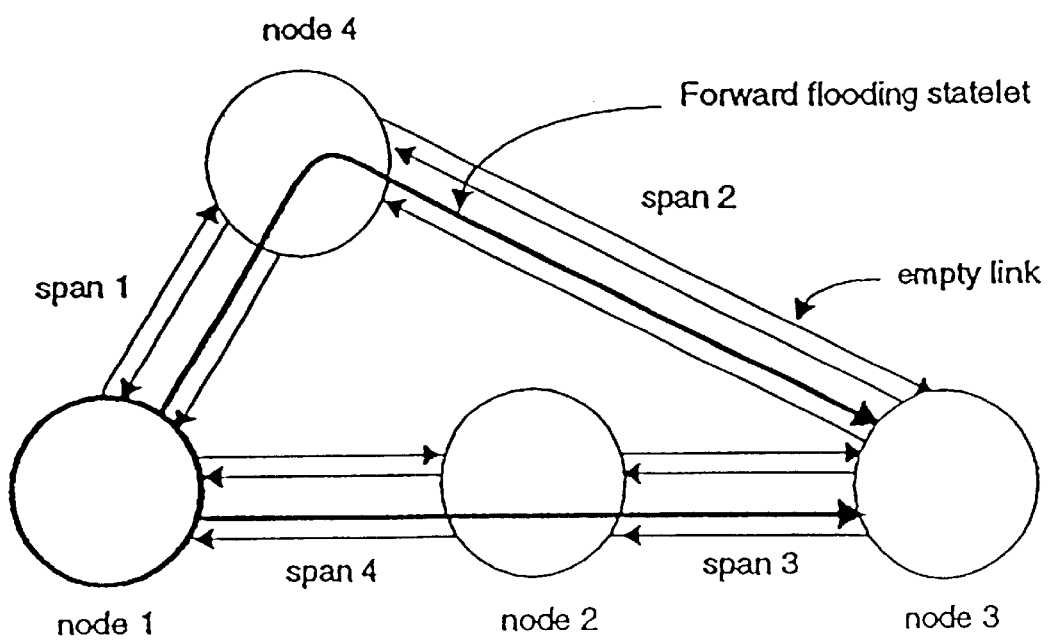
FIG. 15 is a schematic showing growing of a statelet's broadcast mesh away from the source according to an embodiment of the invention.

For a statelet entered into the list of precursors, the controller at a node attempts to transmit one statelet on one link in each outgoing span, provided that span doesn't contain an incoming forward flooding statelet from the same family as the precursor. The controller doesn't attempt to transmit a statelet on a span which contains an incoming forward flooding statelet from the same family so that a precursor's broadcast mesh expands in a direction away from that precursor's source. As shown in FIG. 15, whether the statelet on span 2 or 3 is chosen to be the precursor for the forward flooding statelet family at node 3, no branch should be established on spans 2 or 3, because it would grow the forward flooding statelet broadcast mesh towards node 1. When this basic target broadcast pattern cannot be satisfied at a node for all families, the multi-family flooding pattern at a node is determined by competition among statelets based on their interference numbers.

In a span where all links already bear active outgoing statelets, competition among statelets may require that some families lose their outgoing statelet in that span. When a precursor with a lower interference number cannot access a span filled with statelets from other families, the precursor takes over the link occupied by the statelet whose interference number is the highest among those statelets present on the outgoing links of that span. The broadcast pattern for each precursor is adjusted until every precursor is either fully satisfied or is partially satisfied to the greatest extent possible, consistent with its overall rank in the list of precursors.

Figure 16:
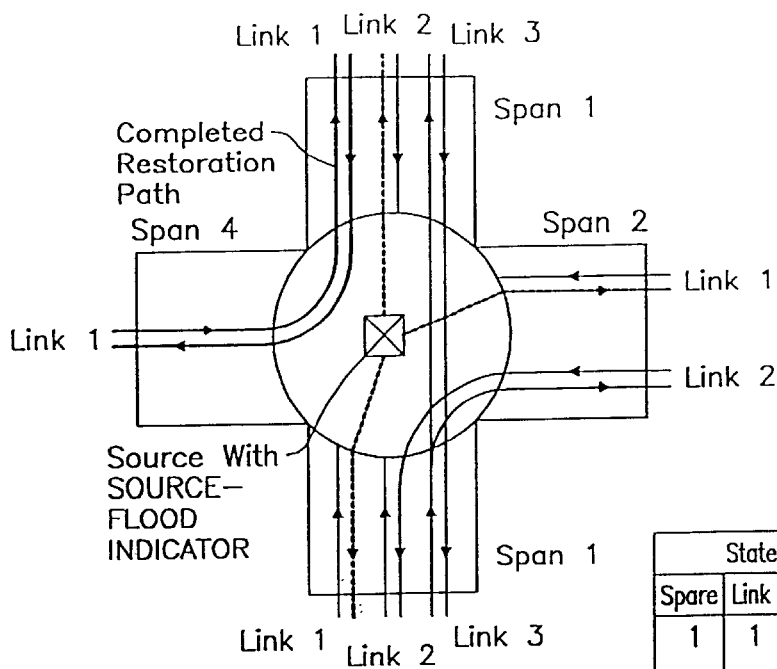
FIG. 16 is a schematic showing computing the composite broadcast pattern at a node according to an embodiment of the invention.

Every time the broadcast pattern is revised, the basic flooding pattern per statelet is applied, working up from those precursors with the lowest interference numbers to the highest, applying no statelet in a span that is already full. An example is shown in FIG. 16. The patterns are graphically complex but the underlying principle is that maximal, mutually consistent flooding patterns are provided for multiple concurrent flooding processes, one per primary statelet emitted by a source. Their multilateral coordination at every node is on the basis of an incoming statelet's interference number. Statelet arrivals which are not of the lowest interference number for that family are ignored.

Finally, before the broadcast pattern at a node is computed, the Broadcast state checks whether a precursor is able to form a match. The details of recognizing a match are covered in detail below.

The procedures executed upon transiting state 12 are summarized below:

1. Compile a list of all precursors present at this node. The precursor for a given statelet family has the lowest interference number of all forward flooding statelets belonging to the same statelet family. If two or more statelets have the same minimum interference number, the one with the lower repeat count is the precursor.
2. Order the precursor list from lowest to highest interference number, using a precursor's source and destination ID to resolve ties.
3. Check for a match.
4. Compute the composite broadcast pattern at this node ensuring that:
    a. opportunities to establish a restoration path one hop long are exploited,
    b. no statelet is transmitted on a span containing a forward flooding statelet from that same family, and
    c. the broadcast pattern for each precursor is either fully satisfied, or partially satisfied, to the greatest extent possible, consistent with that precursor's overall rank in the list of precursors.

Event Parsing at a Tandem Node (State 1, Tandem_Node)

Whenever a statelet destined to cause a rebroadcast on the same family to another node is received, the rules and functions pertaining to updating the broadcast pattern of a statelet as explained in this section apply. Unlike the functions required to compute the composite broadcast pattern at a node, updating the broadcast pattern at a node by definition here does not involve transmitting new forward flooding statelets on links. Updating the broadcast pattern of a statelet is limited to pruning the branches of a precursor, moving the root of a precursor, reverse linking a complemented restoration statelet, and/or transmitting a loop-back test signal. Which function needs to be performed depends on the nature of the incoming statelet received. A tandem node may receive forward flooding, reverse linking, complemented, confirmation, and null statelets. Each of these statelets must be processed differently, and determining the nature of a statelet to facilitate its processing is the responsibility of the tandem node state.

Any time a statelet is received for which this node is not the destination, the transition from idle to tandem node occurs. Upon entering the tandem node state, the controller determines whether a null statelet was received and whether a statelet existed previously on the port which issued this interrupt. If the port of the received statelet is non-null, it is put into the list of all non-null statelet's received by the node, rec_set.

Before exiting state 1, the controller determines whether a precursor previously resided on the interrupting port by searching the assoc_span and assoc_port fields of each PSReg for a pointer to the interrupting port. To ensure the controller functions correctly without acknowledging every interrupt received, rather than searching this node's precursor list, which may be outdated from the time it was created in the Broadcast state, all of the PSRegs at a node are searched for a branch rooted in the interrupting port. If any other PSRegs at a node are searched for a branch rooted in the interrupting port. If any other port points to the interrupting port, there was a precursor on the port which issued the interrupt, and a branch from the precursor exists on the port whose assoc_span and assoc_port fields point to it.

The procedures executed upon transiting state 1 are summarized below:

1. Determine whether a statelet existed previously at the interrupting port, and if a null statelet now exists.
2. Enter any new incoming non-null statelet into rec_set.
3. Determine if the incoming statelet overwrote a precursor from another family. If so, record the source, destination, and index of that precursor.

Three of the five possible transition conditions leaving the tandem state belong conceptually to the stage described as bidirectional selective forward flooding, acting in a manner similar to that of a sender node as defined in the SHN. Processing these three events requires knowing whether a statelet existed previously at the interrupting port, and if a null statelet now exists. The first of these transitions occurs when a new non-null statelet arrives at a tandem node, and there was no prior statelet in that port. The second transition condition occurs when a non-null statelet overwrites another non-null statelet at a tandem node. The third transition condition is satisfied when a null statelet overwrites a non-null statelet, i.e. a statelet vanishes. The destination states of these three transitions, states 2, 3 and 4 respectively, are discussed next.

Arrival of a New Restoration Statelet at a Tandem Node (State 2, New_Statelet)

When a non-null statelet is received at a tandem node on a previously empty port, state 2 named New_Statelet in FIG. 11 is entered. Upon entering New_Statelet, the controller determines whether the new statelet is better than any other statelet belonging to the same index-source-destination family. Of all the forward flooding statelets received at a node belonging to the same family, the statelet which:

1. doesn't trace a cyclical path starting and ending at its own source node, as detected by comparing the incoming statelet's source field to this node's ID,
2. has not exceeded the repeat limit,
3. doesn't occupy a port which this node is using to establish a restoration path one hop long,
4. doesn't belong to the family of a statelet already complemented, and
5. has the lowest interference number, is considered best. If two or more statelets satisfy these conditions, the statelet with the lowest repeat count is chosen.

Conditions 1, 2 and 5 do not require further explanation; however, conditions 3 and 4 need some clarification. The third condition is required to ensure restoration paths one hop in length are used whenever possible. When establishing a restoration path one hop in length, as shown in FIG. 13, only the node with the larger ID initiates sending statelets on the connecting span. However, the node with the smaller ID, node 1 in FIG. 14, is allowed to relay a statelet from another relation over link 1 on the connecting span, until the statelet initiated by the adjacent node, node 2, is received. Therefore node 2 may momentarily receive a spurious statelet from another relation on a port which it is using to establish a restoration path one hop long.

The fourth condition is required to ignore a late-arriving forward flooding statelet from a family which either has already completed a restoration path, or is in the process of reverse linking or confirming a restoration path. Such families are said to be complemented locally at a node. While some late-arriving statelet may have a lower interference number than an existing complemented statelet from the same family, that late statelet is not allowed to interrupt its own families reverse linking or confirmation process. Considering that any statelet may establish a match and initiate reverse linking so that the restoration time as well as the amount of spare capacity used to restore a failure is minimized, the controller prevents late-arriving forward flooding statelets from supplanting early arriving statelets which are already complemented locally at a node.

When a new statelet is the best precursor at a tandem node, its port becomes the precursor of that family. If a precursor existed prior to the arrival of a new best precursor, the old broadcast pattern is re-rooted onto the new precursor. Otherwise the new statelet waits until the broadcast state computes the composite broadcast pattern for this node.

Figure 17:
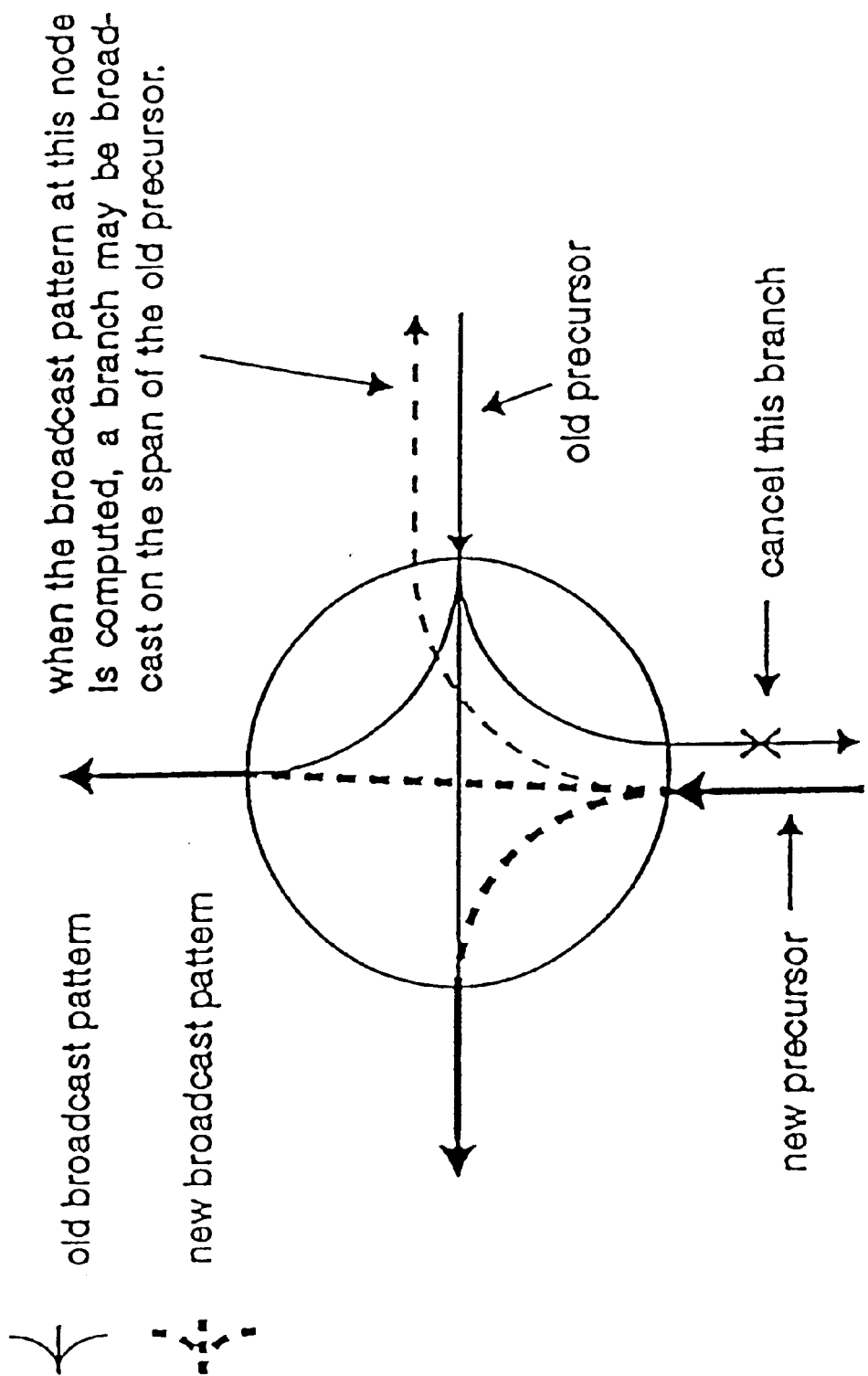
FIG. 17 is a schematic showing re-rooting of a precursor according to an embodiment of the invention.

The function of re-rooting a precursor is performed by updating the assoc_span, and assoc_port fields of all the branches of the old precursor to point to the new precursor. As shown in FIG. 17, moving a precursor's root requires:

1. finding and cancelling any branches (statelets) from the old precursor lying in the same span as the new precursor leftover from the old broadcast pattern, and
2. finding all elements of the existing broadcast fan and swinging them to the new root.

Figure 18:
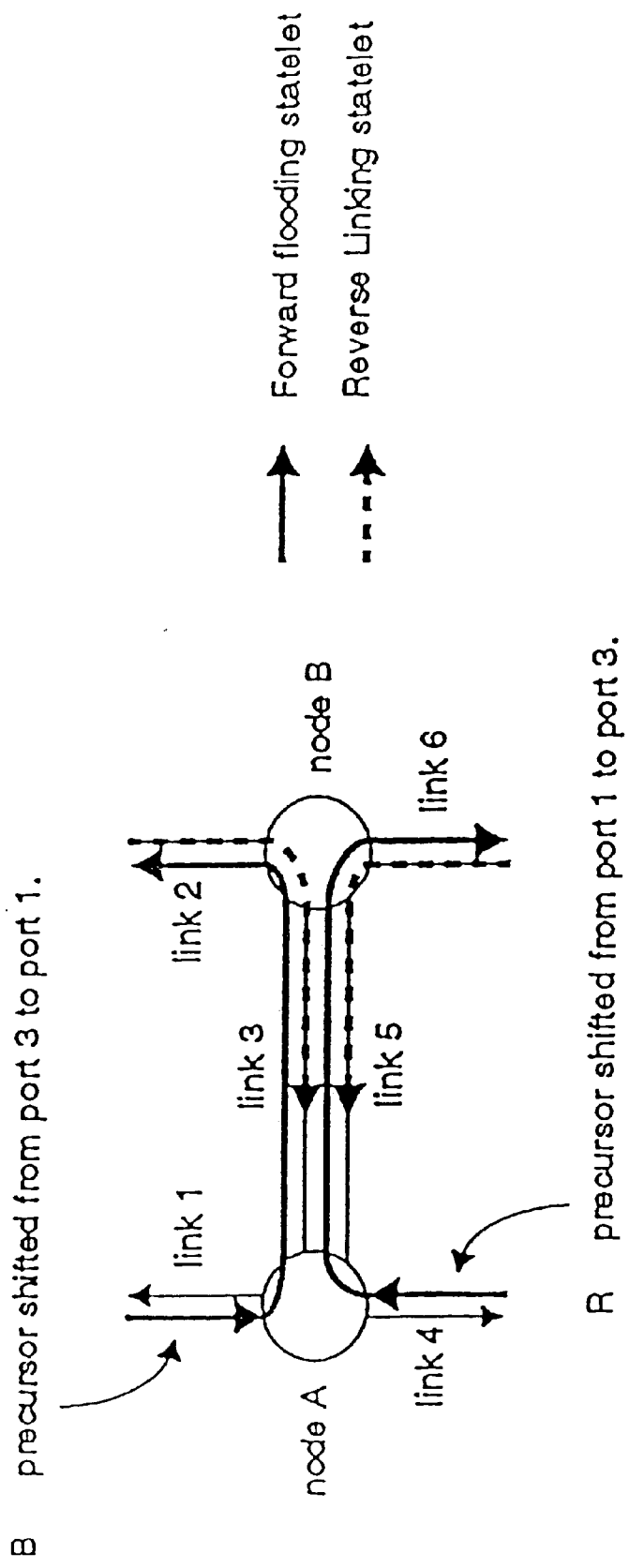
FIG. 18 is a schematic showing rerooting of a broadcast mesh after a precursor has changed positions according to an embodiment of the invention.

In general, whenever a precursor is overwritten, before its branches are cancelled, the controller checks whether those branches may be rooted onto a new precursor from the same family. This is done because a precursor may disappear at a node, due to the collapse of its broadcast mesh elsewhere in the network, or shift from one port to another at the same node during the normal course of forward flooding, in which case the broadcast mesh of that statelet family should be rerooted rather than cancelled. Consider FIG. 18, given that the R statelet overwrote the B precursor on link 4 at node A, and the B statelet overwrote the R precursor on link 1 at node A, instead of cancelling the forward flooding statelets transmitted on links 3 and 5, it is advantageous to reroot the B broadcast pattern onto link 1, and the R broadcast pattern onto link 4. When the broadcast pattern is rerooted instead of cancelled, reverse linking is continued at node A rather than stopped, which is desirable because it may lead to the completion of a restoration path.

The procedures executed upon transiting state 2 are summarized below:

1. Determine if the statelet received should become the precursor of that family. If so, reroot the branches of that family onto the interrupting port.

Overwriting a Restoration Statelet at a Tandem Node (State 3, Statelet_Ovwrt)

When a non-null statelet overwrites another non-null statelet at a tandem node, state 3, Statelet_Ovwrt in FIG. 11, is entered. To facilitate processing, the overwrite event is put into one of four classes:

1. a statelet overwrites an existing precursor from its own family, or
2. a statelet overwrites a non-precursor statelet on its own family, or
3. a statelet overwrites an existing precursor from another family, or
4. a statelet overwrites a non-precursor statelet from another family.

The first action associated with case 1 determines if the statelet received is better qualified to be that family's precursor than any other statelet present belonging to the same family. If the statelet received is not the best, a new precursor is sought amongst the other incoming statelets from the same family to replace the one overwritten. The old broadcast pattern is then re-rooted onto the new precursor. If the repeat count of the new incoming statelet exceeds the repeat limit, and no new precursor is found to replace the one overwritten, any branches of the old precursor are cancelled. In the event a statelet overwrites an existing precursor from its own family on a connected port part of a reverse linking process, and the newly received statelet is qualified as best, the entry in that port's TxReg register is sustained with updated fields only.

If a statelet overwrites a statelet from its own family which was not the precursor, the actions required to process the second case of statelet overwrite events are followed. If the newly received statelet is found to be the best of all statelets received for that family, the current precursor of that family is found. Because the new statelet overwrote a statelet which was not the precursor of that family, the precursor after that family must reside on another port. After finding that port, the family is re-rooted onto the new statelet as precursor.

In the third case, if a statelet overwrites an existing precursor from another family the controller attempts to find a new precursor to replace the one overwritten. If a new precursor is found, the statelet family for that index-source-destination label is rerooted, otherwise the branches of the prior broadcast pattern from that family are cancelled. Then, if the newly received statelet is best for its family, that family is rerooted onto the interrupting port.

In case 4, the actions required to process a statelet which overwrites a statelet from another family, which was not a precursor, are followed. If the statelet received is best, the statelet family of the received statelet is rerooted onto the interrupting port, otherwise nothing is done.

Disappearance of a Restoration Statelet at a Tandem Node (State 4, Statelet_Vanish)

When a non-null statelet vanishes at a tandem node, state 4 named Statelet_Vanish in FIG. 11 is entered. Upon entering Statelet_Vanish, the port issuing the interrupt is removed from the list of all non-null statelets received by a node, rec_set. If the statelet which vanished was a precursor, the controller looks within the other statelets on the family to see if another has become the valid precursor. If a new precursor is found, the old broadcast pattern is re-rooted onto the new precursor, otherwise the branches of the old broadcast pattern are cancelled.

Recognizing a Match

When two forward flooding statelets meet at a tandem node, and the source of one statelet corresponds with the destination of the other, and vice-versa, an event known as a match occurs. While matches occur relatively frequently during the dynamic phase of restoration, initiating reverse linking as a result is controlled to minimize starting those reverse linking processes which are destined to fail, and maximizing those which lead to the creation of a near optimal restoration pathset.

Before the composite broadcast pattern for a node is computed in the Broadcast state, the possibility of forming a match between two precursors is evaluated. The procedure responsible for identifying a match is placed in the Broadcast state so it can access the same list used to compute the composite broadcast pattern for the node at the time it is compiled and therefore up-to-date. Every statelet in the precursor list is checked to see whether it is a match to the new statelet. When two forward propagating statelets in the precursor list establish a match locally at a node the following conditions must be satisfied before initiating reverse linking:

1. The NID number of the node where the match occurred must be less than the NID number of an adjacent node which is transmitting one of the matched precursors and receiving a forward flooding statelet from the same relation. (The NID is borne in the statelet so this arbitration is simple to effect.)

2. The node where the match occurred must not be sourcing a statelet whose destination is the adjacent node on either of the matched ports.

3. The matched statelets must not reside on the same span.

Figure 19:
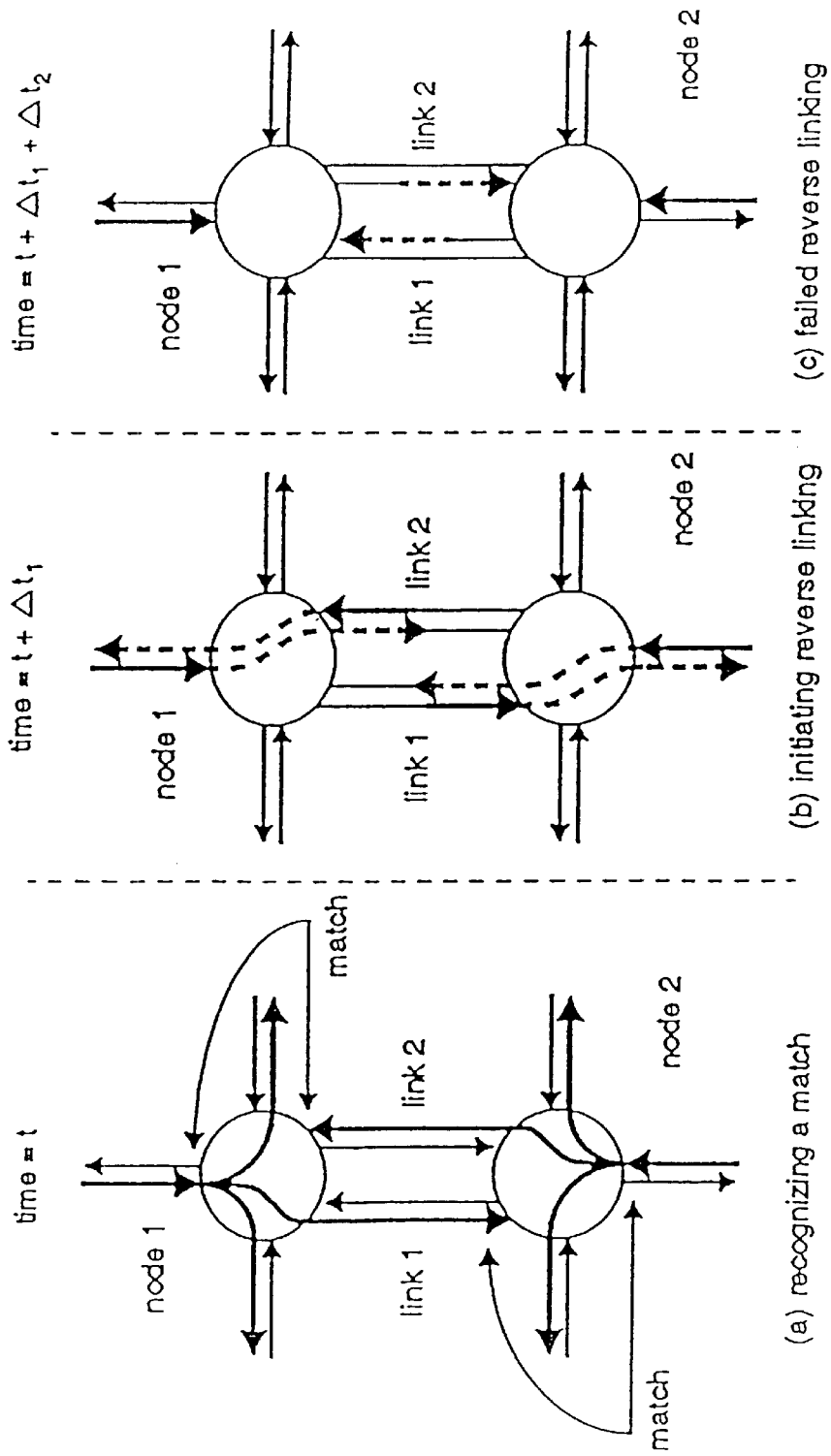
FIG. 19A is a schematic showing recognition of a match according to an embodiment of the invention.
FIG. 19B is a schematic showing initiation of reverse linking according to an embodiment of the invention.
FIG. 19C is a schematic showing failed reverse linking according to an embodiment of the invention.

The first condition is required when a match occurs between a forward flooding statelet just received and a precursor that was previously broadcast. Completing a match involves cancelling the branches of a precursor and transmitting a reverse linking statelet on the port of the forward flooding statelet just received. As shown in FIGS. 19A–C, if both nodes 1 and 2 simultaneously complete a match, node 1 transmits a reverse linking statelet on link 2 and cancels the forward flooding statelet on link 1, while node 2 transmits a reverse linking statelet on link 1 and cancels the branch on link 2. Subsequently the forward flooding statelet on link 2 at node 1 disappears and the forward flooding statelet at node 2 on link 1 disappears. When the forward flooding statelet on a matched port disappears, the complemented as well as the forward flooding statelets on the matched ports are cancelled as shown in FIG. 19C, terminating the construction of a possible restoration path. To avoid this, only the node with the smaller ID is allowed to acknowledge a match, while the node with the larger ID simply waits for the arrival of the reverse linking statelet on the matched port.

If node 1 were a source rather than a tandem node, node 2 could safely complete a match because node 1 would not cancel any forward flooding statelet that it sources, even if it received a forward flooding statelet on line 2 from node 2.

Figure 20:
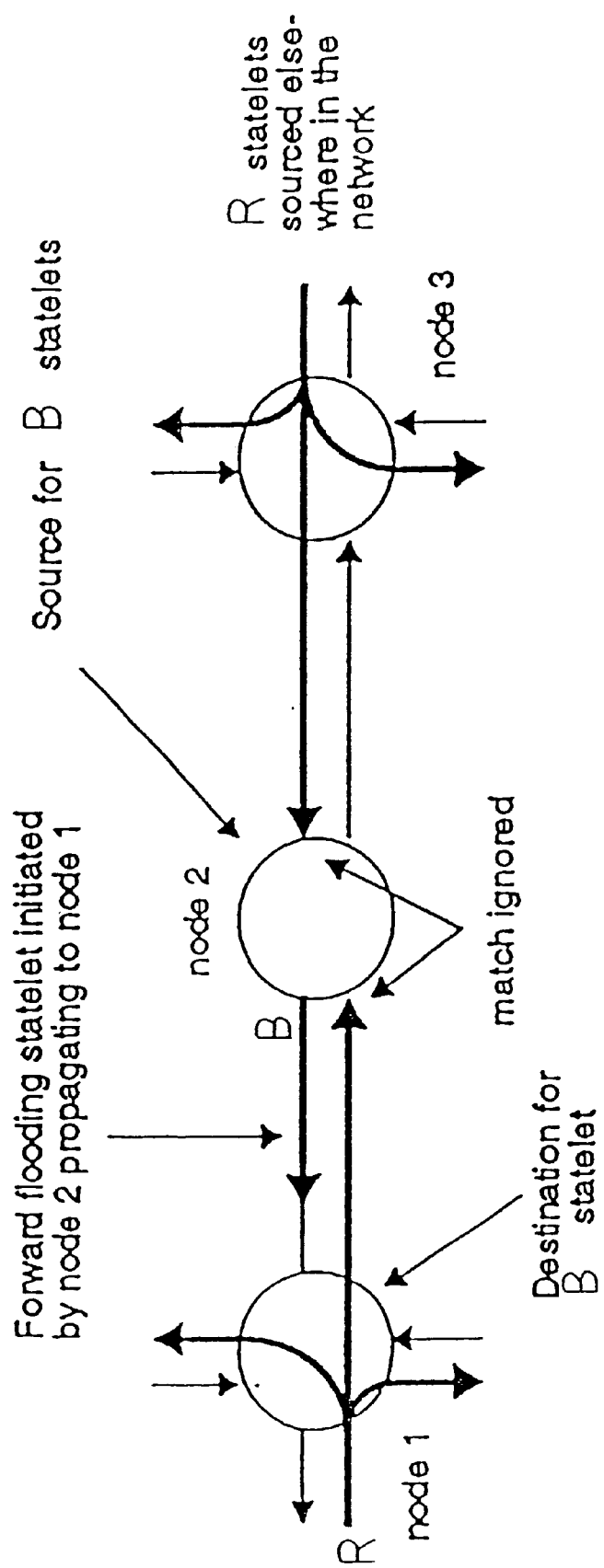
FIG. 20 is a schematic showing ignoring of a match when a node is attempting to establish a restoration path one hop long according to an embodiment of the invention.

The second condition is required in the event a restoration path one hop long can be established. As shown in FIG. 20, the match at node 2 is not recognized because it would require transmitting complemented red statelets on spans 1–2 and 2–3, thereby overwriting the blue statelet and eliminating the opportunity to create a restoration path one hop long. Restoration paths one hop long represent the most efficient use of spare capacity and are therefore given priority over longer restoration paths by this mechanism. This also contributes to the principle of protecting each nodes adjacent spans for its own demands to "escape" through the wider network, i.e. avoiding end-node region traversal by other families.

Figures 21A, 21B:
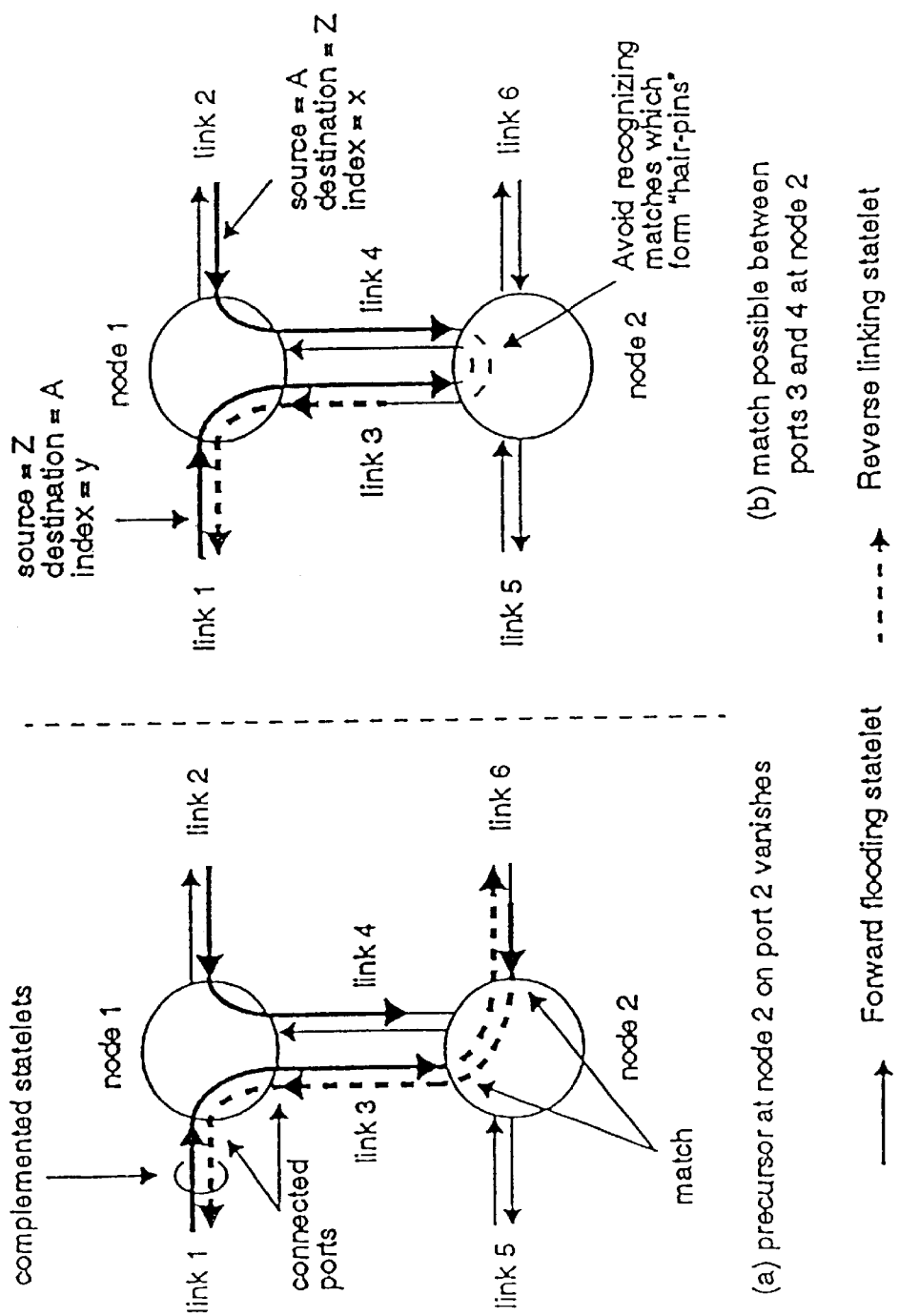
FIG. 21A is a schematic showing avoidance of "hair-pins" when forming restoration paths, (precursor at node 2 on port 2 vanishes) according to an embodiment of the invention.
FIG. 21B is a schematic showing avoidance of "hair-pins" when forming restoration paths (match possible between ports 3 and 4 at node 2) according to an embodiment of the invention.

The third and final condition avoids completing a match between two statelets received on the same span. Such a match could create an inefficient restoration path which forms a "hair-pin" turn as shown in FIGS. 21A–B. In the event a forward propagating statelet arrives at node 2 on link 4 shortly after the precursor on link 6 vanishes, a match between links 3 and 4 is possible as shown in FIG. 21B. However, recognizing the match at node 2 would form a hair-pin turn which wastes spare capacity. Instead, the controller ignores the match at node 2 and waits for the complemented statelet on link 1 and the forward flooding statelet on link 3 to be cancelled when the complemented statelet on link 3 disappears, before re-attempting a match between the forward flooding statelets received on links 1 and 2.

When two matched precursors satisfy the four conditions explained above, they are removed from the precursor list. All of their branches, except those on the matched ports, are cancelled, and a reverse linking statelet is transmitted at each matched port, i.e. their broadcast mesh collapses onto the matched ports.

Transmitting reverse linking statelets requires that the complemented field of the reverse linking statelet be set to the index of the forward flooding statelet received on the same port. Because the direction of a reverse linking statelet and that of its precursor are the same, the source, destination, and index of a reverse linking statelet and its precursor are the same.

The repeat count and interference number of a reverse linking statelet are needed to record the length and interference number of an entire restoration path from source to destination. Therefore, the repeat field of a reverse linking statelet continues to accumulate as it is repeated by a tandem node, and the IntNo field is set to the sum of the interference numbers of the matched precursors. For example, if two matched precursors, x and 7, have interference numbers of 3 and 7 respectively, the IntNo field of both reverse linking statelet's transmitted is set to 10. Unlike the repeat counter, the IntNo of a reverse linking statelet is never altered once set during a match by subsequent tandem nodes.

After a match is completed, no other statelet may be transmitted on either of those ports. The matched ports are locked by setting the activated field of the PSReg to true. While statelets may not be transmitted on connected, or activated ports, new statelets may be received, including null statelets. Often a forward flooding statelet will disappear or be overwritten on a connected port because it was supplanted or eliminated elsewhere in the network. When a new statelet is received, the activated field is usually set to false. The resetting of a port's activated field to false is explained in more detail in the following section.

Though resetting a port's activated field to false terminates reverse linking and stops the construction of a restoration path, generally only those forward flooding statelets associated with suboptimal paths are overwritten. The controller will abandon suboptimal paths in favour of new and better restoration paths until those forward flooding statelets with the lowest interference number, which represent the best paths are sustained, allowing reverse linking to complete.

Reverse Linking

Reverse linking begins after a match is recognized and collapses the mesh of a matched forward flooding statelet family in the network onto a subset of links that trace a path between the matched statelet's source and destination. The completion of reverse linking identifies a path through the cooperating tandem nodes. The successful completion of the confirmation process for this path establishes one restoration path available to restore one unit of lost demand.

While reverse linking is usually initiated by a match at a tandem node, the destination of a forward flooding statelet may also initiate reverse linking. It is possible that a forward flooding statelet will not collide with another statelet from the same relation travelling in the opposite direction before that statelet reaches its destination. Whether a forward flooding statelet finds its destination or a match, a path is identified, and construction of a possible restoration path is continued by initiating reverse linking.

When a reverse linking statelet arrives at a tandem node, the controller takes the following steps:

1. all rebroadcast statelets emitted by the tandem node having the same source-destination-index family as the reverse linking statelet are deleted,
2. a logical connection between the port where the reverse-linking statelet and the port of the precursor for that family is presently found is formed by setting the activated field of the PSReg to true,
3. a new complemented statelet is originated in the transmit direction at the port containing the precursor, and 4. general reorganization of the forward flooding statelets at a node occurs to effect an optimized reallocation of new ports available for restoration amongst the set of statelet families still outstanding at this node. The composite broadcast pattern is revised to take all effects of statelet removals into account in the revised pattern.

After transiting one or more tandem nodes, a reverse linking statelet arrives back at the source of the forward flooding statelet with which it is paired. A complete bidirectional path is then known to have been traced between the source and destination, although no one node knows the overall routing. However, whether the path will be sustained and utilized to restore lost demand isn't known until the continuity test associated with the confirmation phase of the restoration process is performed. The following sections detail the functions associated with reverse linking. These functions are implemented using state 5, Complement_Statelet, shown in FIG. 11.

Receiving a Reverse Linking statelet(State 5, Complement_Statelet)

When a complemented statelet is received at a tandem node the transition condition leading from state 1 to state 5 in FIG. 11 is satisfied. The first action performed upon entering the Complement_Statelet state determines if the complemented statelet received over-wrote a precursor from another family. If so, a new precursor is sought to replace it.

Figure 22:
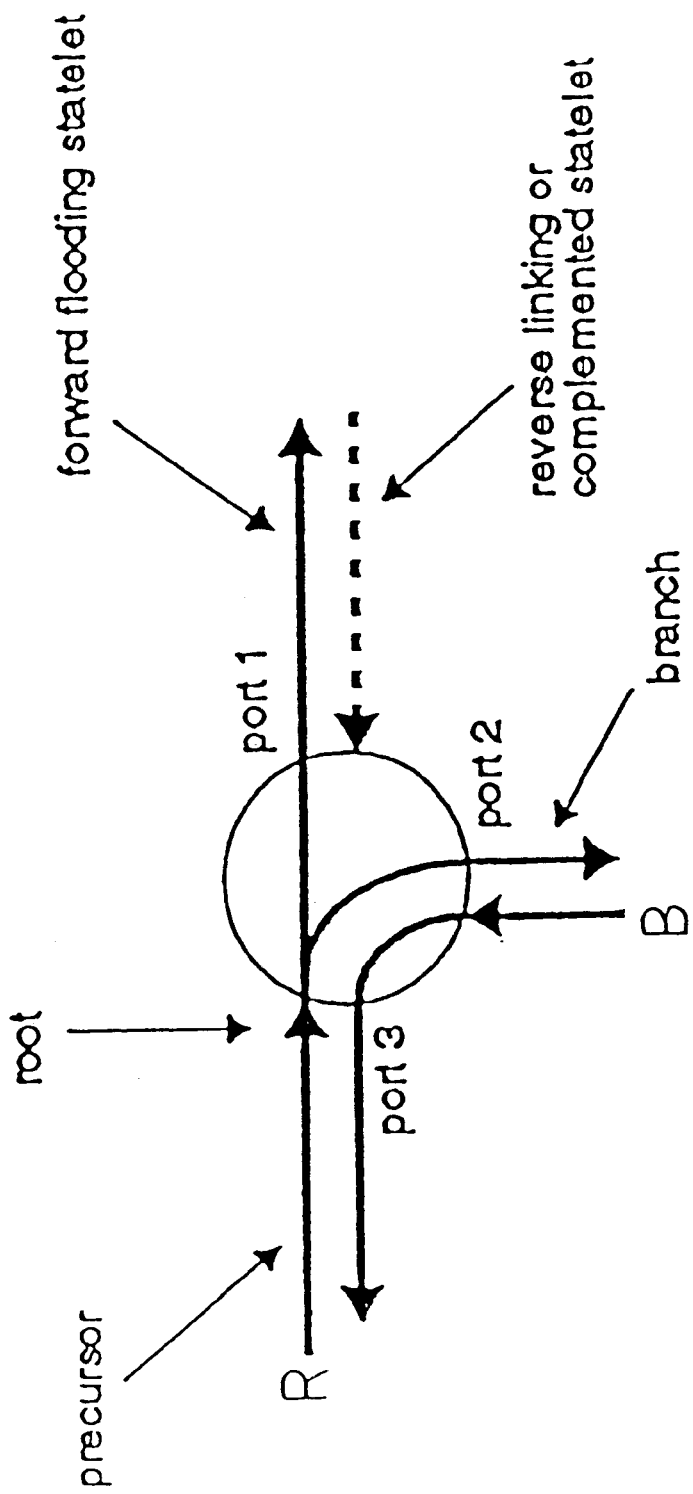
FIG. 22 is a schematic showing receiving a reverse linking statelet according to an embodiment of the invention.

Then the controller determines whether reverse linking should be stopped or allowed to continue. Reverse linking is only allowed to continue if the forward propagating statelet with which this statelet is matched has not disappeared or been supplanted locally. Referencing FIG. 22, to continue reverse linking at a tandem node the following conditions must be satisfied:

1. the source field of the forward flooding statelet transmitted on port 1 and received on port 3 must be equal to the destination field of reverse linking statelet on port 1,
2. the destination field of the forward flooding statelet transmitted on port 1 and received on port 3 must be equal to the source field of reverse linking statelet on port 1, and
3. the index of forward flooding statelet transmitted on port 1 and received on port 3 must equal the reverse linking indicator of the complemented statelet on port 1.

A by-produce of these conditions is that the statelets on the receive and transmit links of a view port are never both reverse linking or forward flooding. If these conditions are satisfied, reverse linking continues, and the complemented statelet is further relayed back to the source of the forward flooding statelet, supplanting the B statelet on port 3 in FIG. 22, otherwise reverse linking is stopped.

To explain why reverse linking may stop, consider FIG. 23, in which the B forward flooding statelet is received at node 2 on link 5 before the reverse linking statelet is received on link 3. Since the interference number of the B statelet received on link 5 is less than the interference number of the R precursor on link 2, and the activated field of link 3 is not set to true as shown in the table, the B statelet on link 5 is allowed to supplant the R statelet on link 3. Consequently, when the complemented statelet is received on link 3 at node 2, reverse linking is stopped. Had the reverse linking statelet arrived before the B statelet, node 2 would have relayed the reverse linking statelet along the path traced by the precursor on link 2 and logically connected links 2 and 3, setting the activated field of both ports to true, thereby preventing the B statelet from transmitting any forward flooding statelets at node 2. When the activated field of a port is set to true, no statelet may supplant the statelet being transmitted on that port.

When the B forward flooding statelet is received at node 1 on link 3, the R forward flooding statelet on link 4 is cancelled along with the R reverse linking statelet on link 3. Subsequently the broadcast patterns of the B precursor on link 3 at node 2 and the G precursor on link 1 are satisfied to the greatest extent possible, consistent with the overall rank of the statelets.

By suspending the reverse linking process of those statelets with higher interference numbers, the controller resolves itself into those restoration paths with the lowest interference number. Unless the reverse linking process of a forward flooding statelet with a large interference number is very quick, it may not succeed, as depicted in FIG. 23. Given that all the branches of a broadcast mesh seek a match simultaneously, many reverse linking processes may be initiated at the same time for a given statelet family, each racing to collapse the broadcast mesh on itself. Only the reverse linking process which succeeds in cutting off all other branches in the broadcast mesh survives this race, and all other reverse linking processes from that family die. Note that this is a mechanism which helps self-allocate the available spare links amongst the relations to be restored.

If the forward flooding statelet paired with this complemented statelet has disappeared or been supplanted, reverse linking is stopped, and nothing else is done. Otherwise the broadcast pattern of the precursor for the forward flooding statelet paired with the complemented statelet (e.g. the statelet received on port 3 in FIG. 22) is pruned leaving only the branch on the port receiving the reverse linking statelet (e.g. the statelet transmitted on port 1 in FIG. 22). Pruning the branches of the precursor collapses the broadcast pattern of the forward flooding statelet onto a single path and allows those statelet families still vying for complete rebroadcast at this node to extend their broadcast pattern. Reverse linking then transmits the complemented statelet on the port receiving the precursor (e.g. port 3 in FIG. 22), supplanting a statelet from another family if necessary. Relaying a complemented statelet locks those ports involved in reverse linking (ports 1 and 3 in FIG. 22) by setting the activated field of the PSReg to true. In the event a complemented statelet from another family is received on a connected port, the connection is broken by nulling the outgoing links of the connected ports and setting their activated field to false.

The procedures executed upon transiting state 5 are summarized below:

1. Determine if the incoming statelet overwrote a precursor from another family. If so, reroot the branches of that old precursor onto a new precursor; otherwise cancel its branches.
2. Determine whether reverse linking should continue. If so, collapse the broadcast mesh of the received complemented statelet onto the matched ports and continue reverse linking; otherwise, do nothing.

Restoration Path Confirmation

After successfully transiting one or more tandem nodes, a reverse linking statelet arrives at its destination, which is the source of the forward flooding statelet with which it is matched. In addition to complemented statelets, a destination node may also receive forward flooding statelets or confirmation statelets. A destination must therefore be able to process three different types of statelets: forward flooding, reverse linking, and confirmation statelets. State 9, Destination_Node in FIG. 11 identifies the type of statelet received and performs functions common to the processing of all three. State 8, Receive_Statelet, performs functions specific to the processing of forward flooding and complemented statelets at a destination node. State 6, Confirmation, performs functions specific to the processing of confirmation statelets at a tandem node. State 10, Restore_Signal, performs functions specific to the processing of confirmation statelets at a destination node. The details of states 6, 8, 9 and 10 relating to the confirmation of a restoration path are discussed next.

The Arrival of a Statelet at a Destination Node (State 9, Destination_Node)

Whenever a statelet is received on an active port at a destination node, the transition condition leading from state 14 to state 9 in FIG. 11 is satisfied. Upon entering this Destination_Node state the statelet is inserted into the list used to track all non-null statelets received at this node, rec_set. Next, the controller determines whether the statelet received over-wrote a precursor from another family by searching the assoc_span and assoc_port fields of each PSReg for a pointer to the interrupting port. If a branch from an old precursor is found, a replacement precursor for it is sought. Provided a new precursor is found, the old broadcast pattern is re-rooted onto the new precursor, otherwise the branches of the old precursor are cancelled.

Processing a Forward Flooding or a Complemented Statelet at a Destination Node (State 8, Receive_Statelet)

Whenever a forward flooding or a complemented statelet is received at a destination node, state 8, Receive_Statelet, is entered. If the interrupting port contains a forward flooding statelet from an adjacent node the opportunity to establish a restoration path one hop long exists. In this event, only the source with the larger ID initiates sending statelets. The node with the smaller ID, i.e. this node, transmits a confirmation statelet to the adjacent node on the interrupting port and locks the port by setting the activated field of the PSReg to true. Establishing a restoration path one hop long represents the most efficient use of spare capacity, and the Receive_Statelet state checks if the interrupt was caused by a forward flooding statelet from an adjacent node first.

Whenever a destination receives a forward flooding or a complemented statelet from some node other than one adjacent to it, a path longer than one hop was traced. However, whether this path will be sustained is not known because only when all the ports along the path are locked (i.e. activated=true for each port) is it impossible to supplant those forward and backward propagating statelets that act as a bi-directional holding thread for that path. Because none of the ports along the path traced by a forward flooding statelet are locked until reverse linking is performed, the forward flooding statelet received by a source or destination may disappear. For example, when a forward flooding statelet arrives at a destination node and that statelet is supplanted at a tandem node elsewhere in the network, the forward flooding statelet will vanish shortly after being received. Furthermore, a complemented statelet received at an end-node will vanish or be overwritten when the complemented statelet propagating in the opposite direction fails to reach its destination. To sustain a path, both reverse linking statelets resulting from a match at a tandem node must reach their destinations.

To ensure that all the ports along the path traced by a reverse linking statelet are locked, the node with the smaller ID initiates a loop-back test by transmitting a statelet to the far-end node with the confirmation field set to a unique value. If all the tandem nodes along a path are connected, the far-end node receives the confirmation statelet and sends it back to the originating node. When the source and destination of a restoration path receive a confirmation statelet, a complete restoration path which will not disintegrate is identified.

The Receive_Statelet state is responsible for initiating the loop-back test to confirm the lock-in of a restoration path. When a complemented or forward flooding statelet is received at a destination node on a port which is transmitting a statelet from the same relation, and the receiving node's ID is less than the ID of the node terminating the far end of the path, a confirmation statelet is transmitted on the interrupting port. Otherwise, the activated field of the interrupting port is set to true and the node waits for a confirmation statelet from the node with the smaller ID. If all the ports along the statelet's path are connected, the confirmation statelet in that port will disappear.

Figure 24:
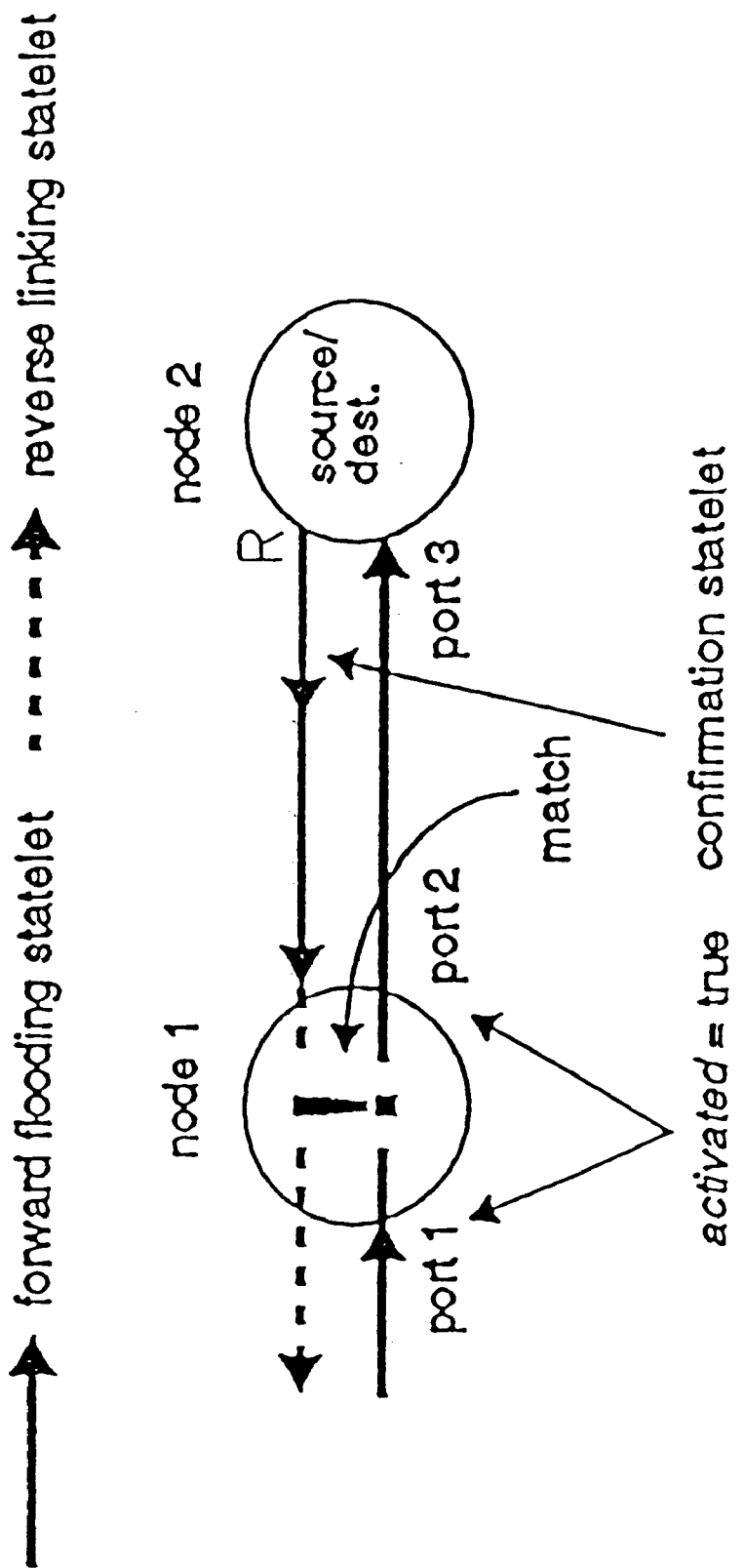
FIG. 24 is a schematic showing initiation of a loop-back test according to an embodiment of the invention.

Both complemented and forward flooding statelets received at a destination node on a port that is transmitting a statelet from the same relation are treated identically because the port which initiated the statelet will be locked. As shown in FIG. 24, even though the statelet received at node 2 is not complemented, ports 1 and 2 at node 1 are connected because a match condition exists. The statelet received at node 2 was not complemented because the match at node 1 was recognized after transmitting the forward flooding statelet on port 2.

However, when a forward flooding statelet is received at a destination node on a port that is not transmitting a statelet from the same relation, the port which initiated the statelet will not be locked and it is not known whether there is still any demand to be restored. If any lost demand remains to be restored from the relation identified by the forward flooding statelet just received, this node sources a statelet from that relation on the interrupting port.

Figure 25:
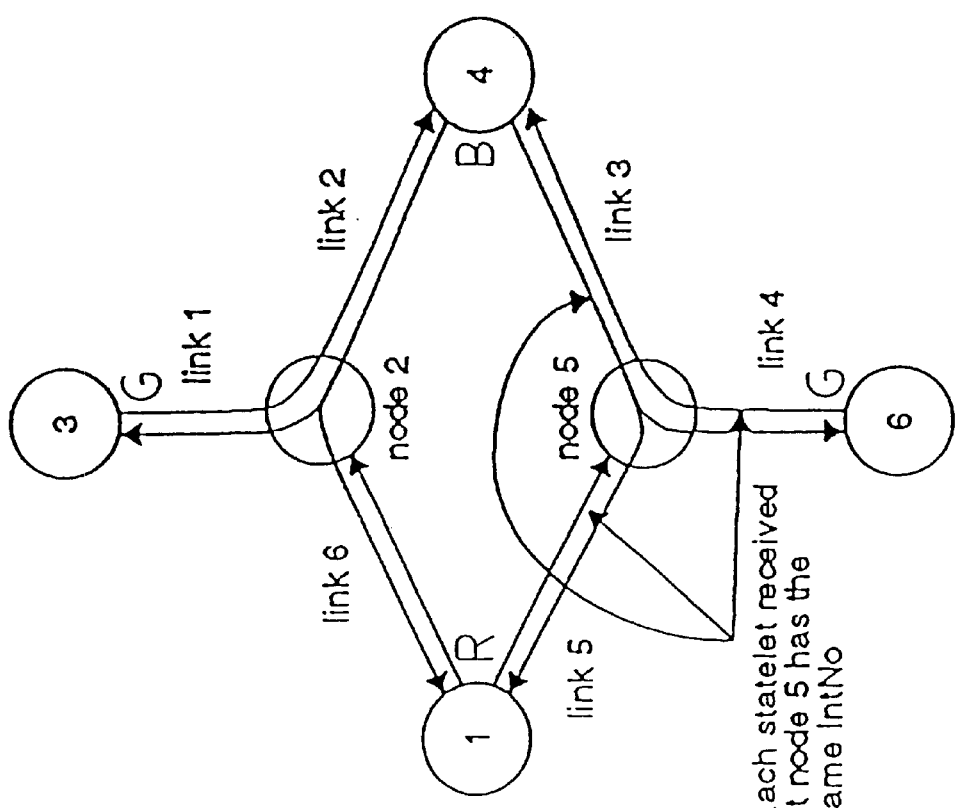
FIG. 25 is a schematic showing problems associated with anchoring a statelet's broadcast mesh at the source according to an embodiment of the invention.

Originally an implementation of this invention was designed such that forward flooding statelets received at a destination node on a port that was not transmitting a statelet from the same relation were ignored. However, it was found that anchoring a statelets broadcast pattern at the source and destination did not yield the best pathsets. As shown in FIG. 25, unless a destination node is allowed to transmit statelets in response to the receipt of a forward flooding statelet, the network may reach a state in which no matches are found and no restoration paths are formed. Therefore, destinations were designed to transmit a complemented statelet from the same relation as the received statelet on an empty port, or a port occupied by a statelet from another relation, even if the node was already transmitting a number of statelets equal to the demand lost by that relation on that span.

When the ID of the destination node receiving the forward flooding statelet is greater than the ID of the statelet's source, a complemented statelet is transmitted on the interrupting port, otherwise a confirmation statelet is transmitted. A confirmation statelet may be transmitted immediately in some cases because not only will a confirmation statelet ensure that all the ports in a path are connected, it will also collapse a forward flooding statelet's broadcast pattern and set a port's activated field to true whenever possible.

The procedures executed upon transiting state 8 are summarized below:

1. Establish a restoration path one hop long whenever possible.
2. If this node is transmitting a forward flooding statelet on the interrupting port from the same relation as the statelet received, and this node's ID is smaller than that of the source of the statelet received, initiate a loop-back test. Otherwise only lock the interrupting port by setting its activated field to true.

3. If this node is not transmitting a forward flooding statelet on the interrupting port from the same relation as the statelet received, and unrestored demand from the relation identified by the received statelet exists, initiate a loop-back test (transmit a complemented statelet) on the interrupting port if this node's ID is smaller (larger) than that of the source of the statelet received.

Processing a Confirmation Statelet at a Tandem Node (State 6, Confirmation)

When a confirmation statelet is received at a tandem node the transition condition leading from the tandem state to the Confirmation state in FIG. 11 is satisfied. If the interrupting port is not connected (i.e. activated=false), the FSM determines whether or not the statelet transmitted on that port, and the precursor to the statelet transmitted on that port, are in a complement relationship to the confirmation statelet just received. Similar to the processing of a complemented statelet at a tandem node, the confirmation statelet received is relayed on the port containing the precursor to the statelet transmitted on the interrupting port, thereby continuing the loop-back test if 1. the source of the forward flooding, or complemented statelet, transmitted on the interrupting port and that of its precursor are the destination of the confirmation statelet,
2. the destination of the forward flooding, or complemented statelet, on the interrupting port and that of its precursor are the source of the confirmation statelet, and
3. the index of forward flooding, or complemented statelet, transmitted on the interrupting port and that of its precursor are equal to the reverse linking indicator of the confirmation statelet, Relaying a confirmation statelet at a tandem node on a port which was not previously locked by reverse linking requires:

1. collapsing the broadcast pattern of the precursor for the forward flooding statelet residing on the port receiving the confirmation statelet, and
2. locking those ports terminating the confirmation statelets by setting their activated fields to true.

Instead of simply checking that the port receiving a confirmation statelet is connected, i.e. activated=true, before continuing a loop-back test, attempting to collapse the broadcast mesh of a confirmation statelet as described above allows a destination node to skip the last logical step of local reverse linking and transmit a confirmation statelet immediately upon receiving a forward flooding statelet.

Whether a loop-back test is continued or not, the Confirmation state always determines if the confirmation statelet received over-wrote a precursor from another family. If so, a new precursor is sought to replace it. If a new precursor is found, the old broadcast pattern is re-rooted onto the new precursor, otherwise the branches of the old precursor are cancelled.

Traffic Substitution(State 10, Restore_Signal)

When a node to be restored, i.e. a source/destination node, receives a confirmation statelet, the transition condition leading from state 9 to state 10 in FIG. 11 is satisfied. If this node is the destination of the confirmation statelet, a loop-back is performed and the confirmation statelet returned to its source. The return path of the confirmation statelet traverses the same set of ports traversed while propagating from source to destination.

If this node is the source of the confirmation statelet, and the confirmation field of both the transmitted and received confirmation statelets on the interrupting port are equal, a successful loop-back test is complete and a single unit of demand may be restored over the path traced by the confirmation statelet. The forward and backward propagating statelets that remain for a given family after successfully completing a loop-back test act as a bidirectional holding thread for that restoration path, sustaining it as long as the source and destination do not cancel them.

After successfully completing a restoration path, the source of the confirmation statelet bridges one of the failed transport signals onto the restoration path. When a unit of lost capacity is restored, a source/destination node increases the IIN of all statelets it sources in ongoing broadcasts by IIN_STEP. Increasing the IIN of those statelets sourced by this node increases the likelihood that other demand pairs which have not restored as much lost capacity as this node will complete one of their restoration paths. In a network which is not 100% restorable, or in the case of node recovery, this helps to achieve an overall pattern of individual restoration levels on each relation that is more proportional to the network's pre-failure connectivity. Given that the networks used to test an embodiment of this invention were 100% restorable against all single span cuts, IIN_STEP was set to zero when testing this invention's ability to restore all single span cuts.

After restoring a unit of lost capacity, the count of working demands to be restored by this relation is decreased. When all of the demand between this node and a far-end node is restored, all of the outstanding initial broadcast statelets for that relation are cancelled.

Terminating a Restoration Event

This invention preferably synthesizes restoration paths until 100% restoration is achieved, at which time the controller inherently terminates implementation, or until the time-out interrupt is issued, signalling the termination of a restoration event. In the event a network is spared for less than 100% restorability, implementation of this invention reaches a static best effort restoration equilibrium, and the time-out interrupt is needed to "tidy-up" a network by cancelling any forward flooding statelets which have not been confirmed. Because this invention is preferably designed to restore a failure within two seconds, a conservative time-out limit of 3 seconds was used in all tests.

Cancelling Outstanding Statelets (State 13, TimeOut)

Each node starts its own timer upon entering a restoration event. Given that not all nodes are activated simultaneously, nodes are also not deactivated simultaneously. When a node times-out, the transition condition leading from the idle state to the TimeOut state is satisfied. Upon entering TimeOut state all of the statelets this node is sourcing which have not successfully completed a loop-back test are cancelled.

Network Level View

The seven conceptual processes just described actually occur concurrently at different stages and times at all nodes involved in a restoration event. Forward flooding proceeds simultaneously for several statelet families while other statelet families may be reverse linking. Each family of statelets, comprising the network-wide set of selective rebroadcasts resulting from each primary statelet issued by a source, competes against others to expand in the forward flooding process. Successful statelet families collapse in the process of reverse linking.

During forward flooding the precursor of each statelet family that has the lowest interference number over all statelets present at a node asserts its target broadcast pattern fully. In a span where all links already bear active outgoing statelets, the link occupied by the statelet whose interference number is the highest is supplanted. Each node acting as a tandem continues to adjust the broadcast pattern for each precursor in response to incoming statelet changes occurring at its ports so that every precursor at the node is either fully satisfied, or is partially satisfied to the greatest extent possible, consistent with the precursor's overall rank in terms of the interference numbers of incoming statelets and the spans in which it and other precursors lie. When the precursor location for a statelet shifts, the broadcast pattern for that statelet family is rerooted onto a new precursor and the composite broadcast pattern adjusted. When a new statelet appears at a node, it is fitted into the composite broadcast pattern. When a statelet family collapses due to a match or reverse linking, the composite broadcast pattern is reviewed, and extended for one or more statelet families which did not previously receive a full broadcast pattern at the node.

Reverse linking has the effect of dissolving a statelet family's mesh except for the subset of links traversing those nodes on the path of the reverse linking process. If no precursor from that family exists when the complemented statelet reaches a node, reverse linking is stopped. As long as reverse linking continues, a statelet family's mesh continues to collapse by suspending all transmit statelets from the given family except for the statelets on the newly created path itself. Suspension of these statelets causes them to disappear from the inputs of adjacent nodes, thereby collapsing the broadcast at those nodes as well, ultimately collapsing the entire mesh of any statelet family which successfully completes reverse linking onto a single path.

At the network level the effect is self-organizing contention amongst all statelet families to expand their mesh with the goal of completing a match and collapsing that mesh onto a path described by the trajectory of the reverse linking process. Freed links are incorporated into remaining meshes. If these meshes succeed in completing a match, they too collapse onto a path and make links available for other families and so on. All this occurs simultaneously, in parallel across the network and is limited only by node processing times, and link transmission and propagation delays.

This process is potentially very rapid because it proceeds asynchronously and exploits all parallel manners of completing a match at once. Significant parallelism is being exploited in both the spatial depth and breadth in the plane of the network; depth referring to the number of spares on each span, and breadth meaning the geographical diversity of the network topology.

Thus restoration proceeds self-paced until all statelet families have succeeded and collapsed onto a path, or halts when no remaining statelet families can succeed in expanding their mesh. In the latter case, a node suspends any remaining meshes by cancelling those unconfirmed statelets which it originated. Furthermore, at any time that 100% restoration is achieved during the dynamic restoration process, a source suspends any unneeded surplus statelets, collapsing unneeded meshes without waiting for a time-out. In either case, in the final state, only bidirectional complementary statelet pairs persist. Each pair runs the length of one continuous non-branching non-looping restoration path that condensed out of the mesh of one statelet family. The result is a mechanism which has been shown to produce link-disjoint loop-free pathsets that are very close to the multicomodity max-flow ideal obtainable otherwise only be centralized IP computation. Moreover, this is achieved by autonomous, database-free, self-organizing interaction between nodes.

Preventing Looping Event Sequences

Figure 26:
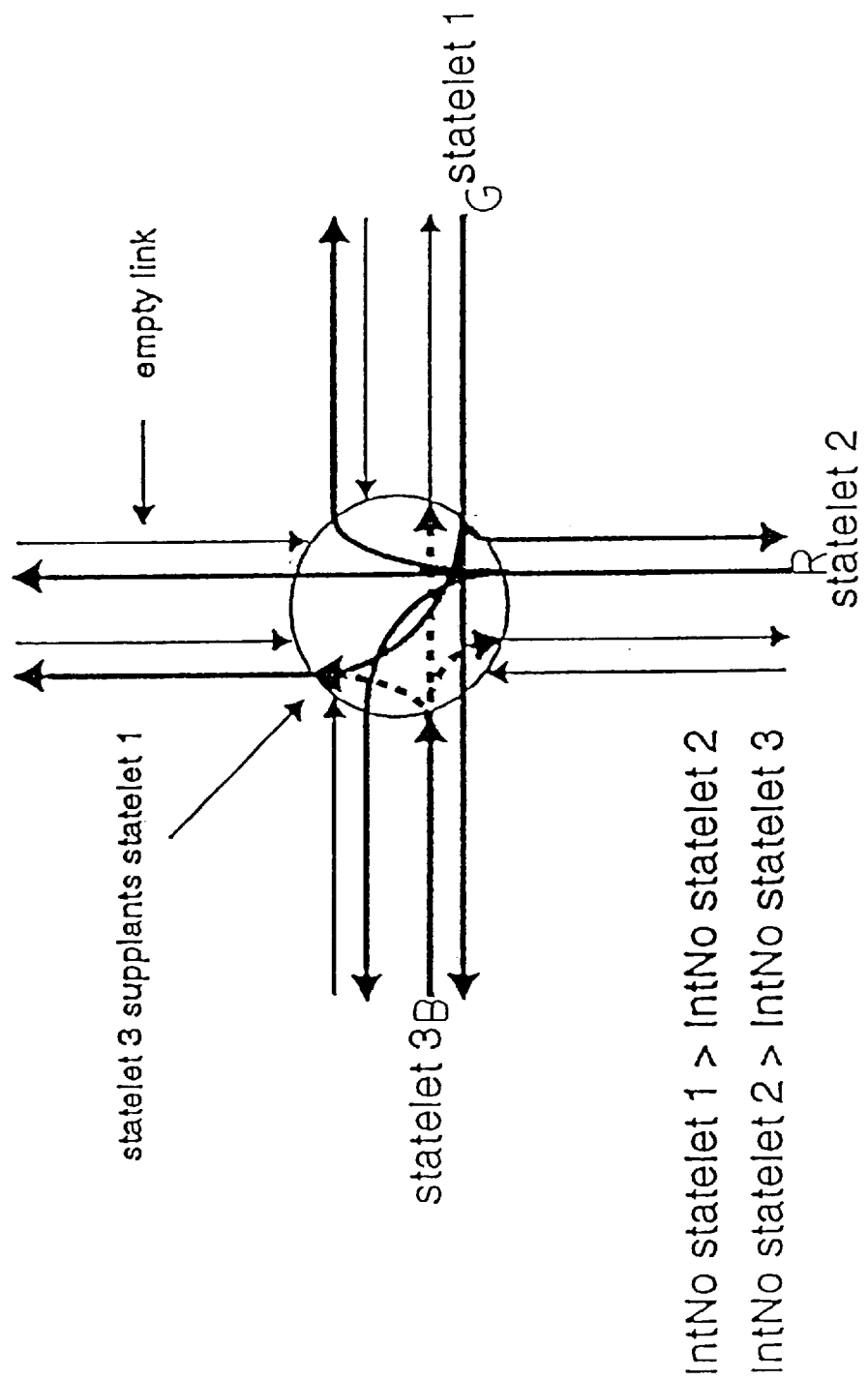
FIG. 26 is a schematic showing competition between statelets at a node according to an embodiment of the invention.

The controller usually allows a forward flooding statelet to be overwritten by a statelet from another family. Whenever a new forward flooding statelet with a lower interference number arrives at a node where all outgoing links contain non-null forward flooding statelets from other families, the new statelet is usually allowed to supplant another statelet which has not been complemented and has a larger interference number, as shown in FIG. 26.

Figure 27:
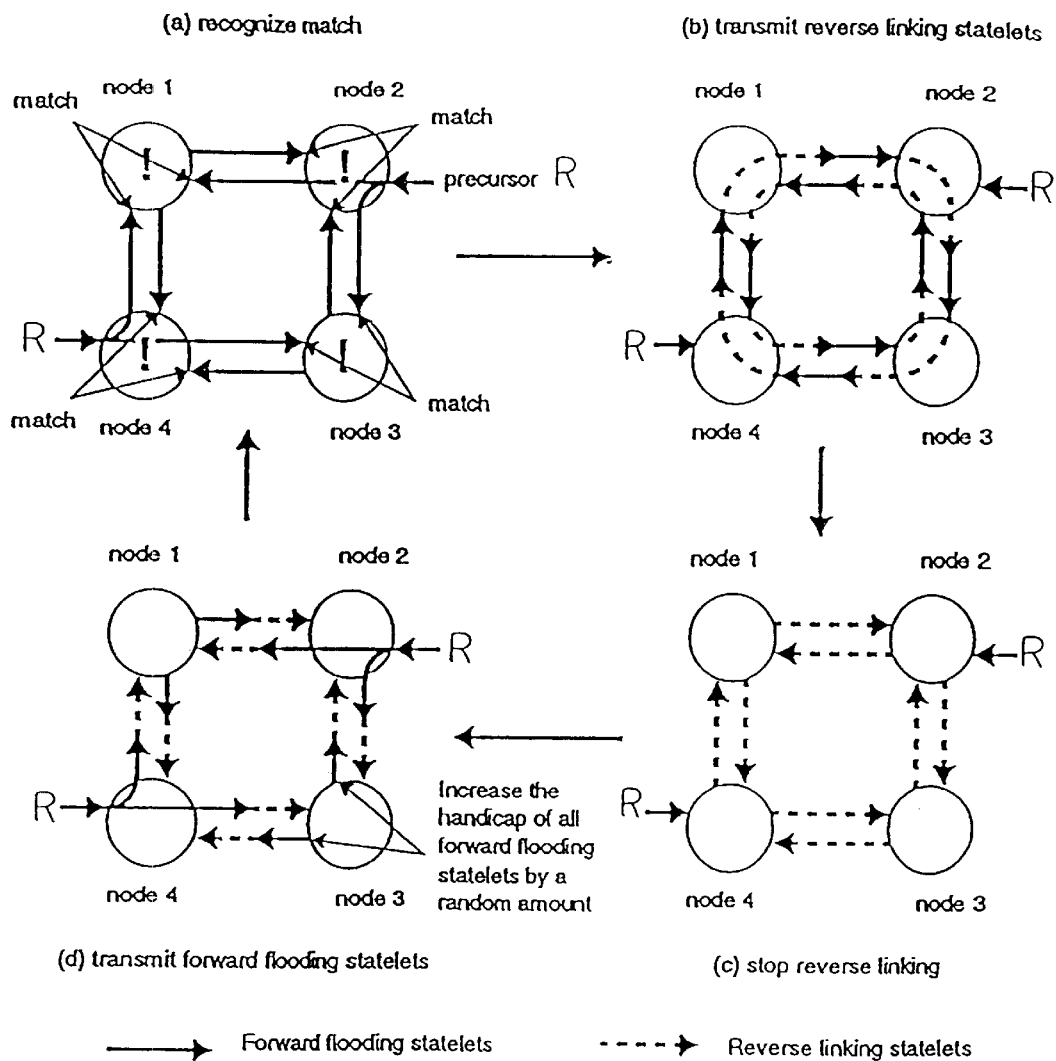
FIG. 27 is a schematic showing use of a handicap indicator to avoid oscillations according to an embodiment of the invention.

Because discrete event simulations advance in small finite time steps, a situation in which the statelets from two or more competing families continuously supplant one another may arise. As shown in FIG. 27, in a discrete event simulation it is possible that a network will enter a cycle in which multiple nodes recognize a match, (a), initiate reverse linking, (b), stop reverse linking due to the disappearance of the forward flooding statelets, (c), re-transmit new forward flooding statelets (d), and again recognize a match opportunity. In reality this effect would likely resolve itself after one interaction, if it happened at all, because the event sequences to create a loop as shown in FIG. 27 are unlikely to repeat themselves with the random timing variations present in the real world.

A key characteristic of an embodiment of this invention is the supplanting of one statelet by another, and simulating this process is necessary when testing this invention's ability to restore a failure in a transport network. In any discrete event simulation of this invention, the supplanting of one statelet by another must be modelled, and a sequence of looping events as shown in FIG. 27 resolved when it arises. To prevent such loops, a handicap is associated with every statelet at a node.

In discrete event simulations of this invention, the handicap of a statelet is entered into a separate information field along side those shown in FIG. 4. The value of a statelet's handicap is propagated throughout a family's broadcast mesh and accumulates whenever it is increased by a node, similar to the way a statelet's repeat count accumulates.

When an outgoing statelet is overwritten, the value of its precursor's handicap is increased such that it is more difficult to supplant that outgoing statelet in subsequent competitions for broadcast. Before the controller allows an incoming statelet with a lower interference number to supplant a statelet with a higher interference number as part of:

a) the forward flooding process, or b) the beginning of the reverse linking process, as shown in FIG. 27, the handicap of the incoming and outgoing statelet are compared. During forward flooding, an incoming statelet is allowed to overwrite an outgoing statelet only if the handicap of the incoming statelet multiplied by a weighting factor, named PRECURSOR-WEIGHTING, is larger than the handicap of the outgoing statelet. Similarly, reverse linking is only initiated if the handicap of the incoming matched statelets, after being multiplied by the constant MATCH-WEIGHTING, is greater than the handicap of any outgoing statelets from other relations being transmitted on one or both of the matched ports, as shown in FIG. 27. Once reverse linking is initiated, it is allowed to continue as long as the forward flooding statelet with which a complement statelet is matched persists, regardless of the handicap of any outgoing statelet occupying the outgoing link on a matched port.

In a sense the handicap indicator assigns a higher priority to statelets which have been supplanted numerous times. To insure a statelet's handicap does not undo the desirable effects of competition based on the interference heuristic, it is increased by a very small amount, determined experimentally, so that the simple flux of events at a node don't lead to the growth of a broadcast mesh which violates the interference principle. Based on tests performed, a PRECURSOR-WEIGHTING and MATCH-WEIGHTING of 5 effectively eliminate any oscillations, i.e. non-self-settling interactions, without degrading the controller's performance, when the handicap of a statelet is initially assigned a value, as well as increased by a random value, uniformly distributed between 0.1 and 1.

By slowly increasing the handicap indicator of all forward flooding statelets transmitted by a random amount, eventually a point is reached where some, but not all, of the nodes in a looping event sequence sustain a match or the broadcast pattern from one precursor. For example, in FIG. 27, node 1 will only recognize a match between the red statelets received on spans 1-4 and 1-2 if the handicap indicator of the received statelets after being multiplied by MATCH-WEIGHTING are larger than each of the handicaps of the blue statelets sourced by node 1. If this node is the source of the statelet to be overwritten by the reverse linking statelet (e.g. nodes 1 and 3 in FIG. 27), the upper and lower limits of the handicap assigned to a new forward flooding statelet are increased by a random variable uniformly distributed between 0 and 0.1. If the statelet to be overwritten is the branch of a precursor (e.g. the R statelets broadcasted by nodes 2 and 4 in FIG. 27), the handicap of the precursor is increased by a random variable uniformly distributed between 0 and 0.1.

The constants MATCH-WEIGHTING and PRECURSOR-WEIGHTING control how quickly oscillations are stopped. Larger values will allow oscillation for a longer period, while smaller values resolve the process very quickly. In the extreme, a value of zero for MATCH-WEIGHTING would prevent a match from supplanting any forward flooding statelets, and an infinite value for MATCH-WEIGHTING would always allow a match to supplant a forward flooding statelet. Similarly, a value of zero for PRECURSOR-WEIGHTING would prevent a forward flooding statelet from supplanting another forward flooding statelet, and an infinite value for PRECURSOR-WEIGHTING would always allow one forward flooding statelet to supplant another.

In conclusion, replacing and supplanting statelets is an integral part of a preferred embodiment of this invention; these actions occur frequently while evolving the composite restoration paths., Oscillations of the nature shown in FIG. 27 are very rare, and it was found that a relatively large value for MATCH-WEIGHTING and PRECURSOR-WEIGHTING compared to the value of a statelet's handicap quickly stopped any oscillations when they arose without degrading the ability to find a near optimal restoration pathset.

Correct Sequencing of Port Updates

Figure 28:
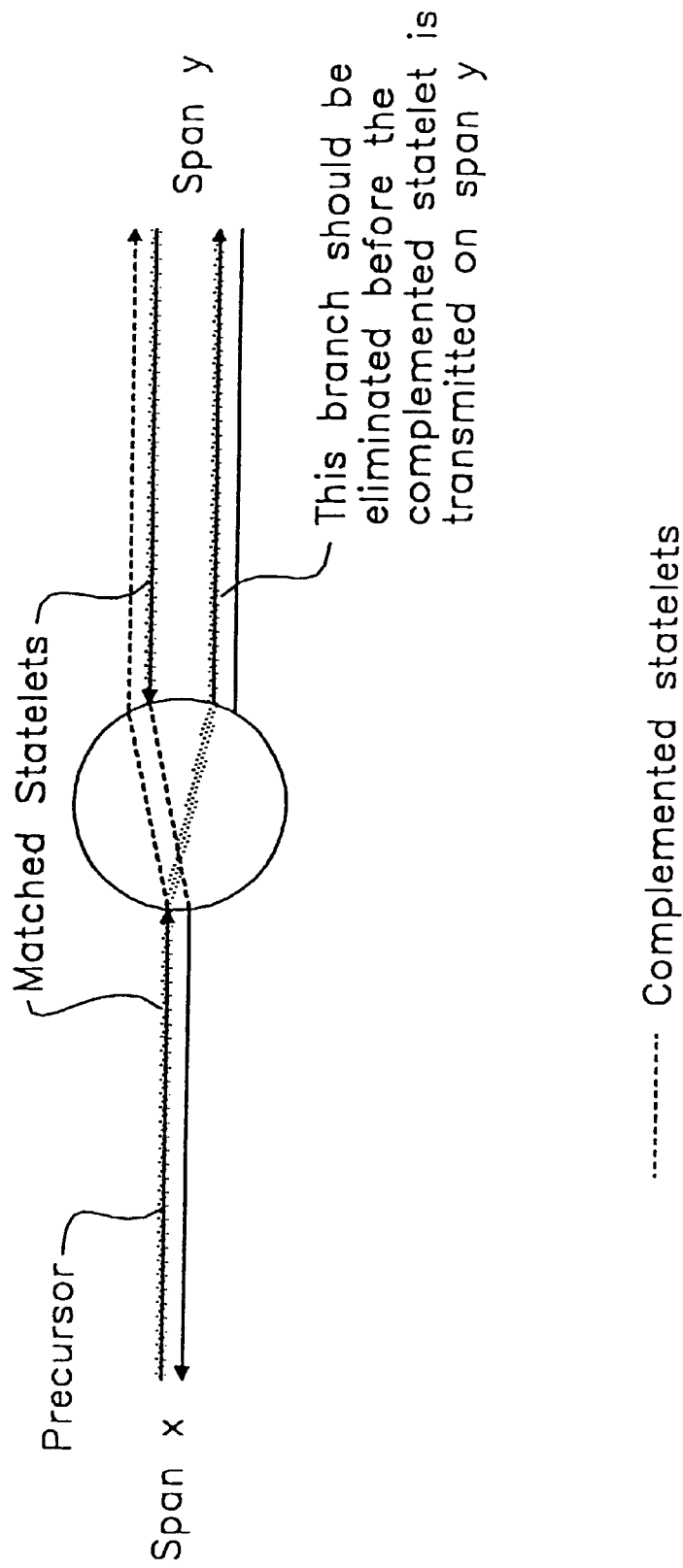
FIG. 28 is a schematic showing correct sequencing of port updates according to an embodiment of the invention.

When processing a single interrupt, it may be required to transmit two or more statelets on a single span. When this invention is implemented such that not all new statelets on a span are presented to the DRA at once, the sequence in which those ports are latched to their respective links should follow the same sequence followed in altering the contents of the transmit statelet registers. For example, when the branch from a matched precursor on span x resides on span y, and the precursor to which the precursor on span x is matched also resides on span y, but not the same port, as shown in FIG. 28, and new statelets are processed immediately without waiting for all of the links on a span to be updated, the branch on span y should be eliminated before transmitting the complemented statelet. Latching all registers onto links in the same order in which they were updated internally in the execution sequence ensures that statelets are processed within one span in the proper sequence, regardless of how this invention is implemented.

Re-initiating Reverse Linking

Depending on the implementation of this invention, the TxReg of a port which is part of a reverse linking process, i.e. activated=true, may have to be cancelled and retransmitted after a forward flooding statelet overwrites an existing precursor from its own family in order to continue reverse linking. After the start of a restoration event, if this invention is implemented such that a mechanism external to the controller is responsible for informing the controller of a new statelet arrival (as for example in a polling mechanism) the arrival of a statelet, qualified as best, which overwrites an existing precursor from its own family on an activated port, requires retransmitting the entry in that port's TxReg register.

Two ports become activated when a match is found, as shown in FIG. 28A. Reverse linking continues at a tandem node, node 2 in FIG. 28, as long as the forward propagating statelet matched to the complemented statelet persists at that node.

As shown in FIG. 28B, if the precursor on span c disappears at node 2 and the forward flooding statelet to node 1 on span b is cancelled before the complemented statelet on span b arrives at node 2, reverse linking stops. It is possible that a new forward flooding statelet from the same family as the vanished precursor on span c arrives on span d at node 2 shortly afterwards, and becomes that family's new precursor as shown in FIG. 28C. Unless the DRA implementation is somehow able to inform the controller of the existence of the reverse linking statelet at node 2 without the RxRS flag being set, the complemented statelet on span b at node 2 will not continue reverse linking and follow the path traced by the new precursor on span d until node 1 cancels and retransmits that same complemented statelet.

Therefore, when
1) the time interval between the disappearance and reappearance of a statelet from the same family is very short, as shown by the "gap" in FIG. 28C, and
2) the controller only processes those ports whose RxRS flag is raised at discrete time intervals, node 1 may not process the first disappearance event, because possibly another statelet is being processed at that node, and determine that a statelet overwrote a precursor from the same family on an activated port when processing the second reappearance event. Unless node 1 cancels and retransmits the complemented statelet on span d, the reverse linking event halted at node 2 is never restarted, as shown in FIG. 28D. 1 Restarting the reverse linking process is desirable because it may lead to the formation of a restoration path. In the discrete event simulations performed, given the situation depicted in FIGS. 28A–D, the entries in the TxReg register of node 1 on span b were cancelled and retransmitted.

Optimizing the Forward Flooding Process

Figures 29A, 29B:
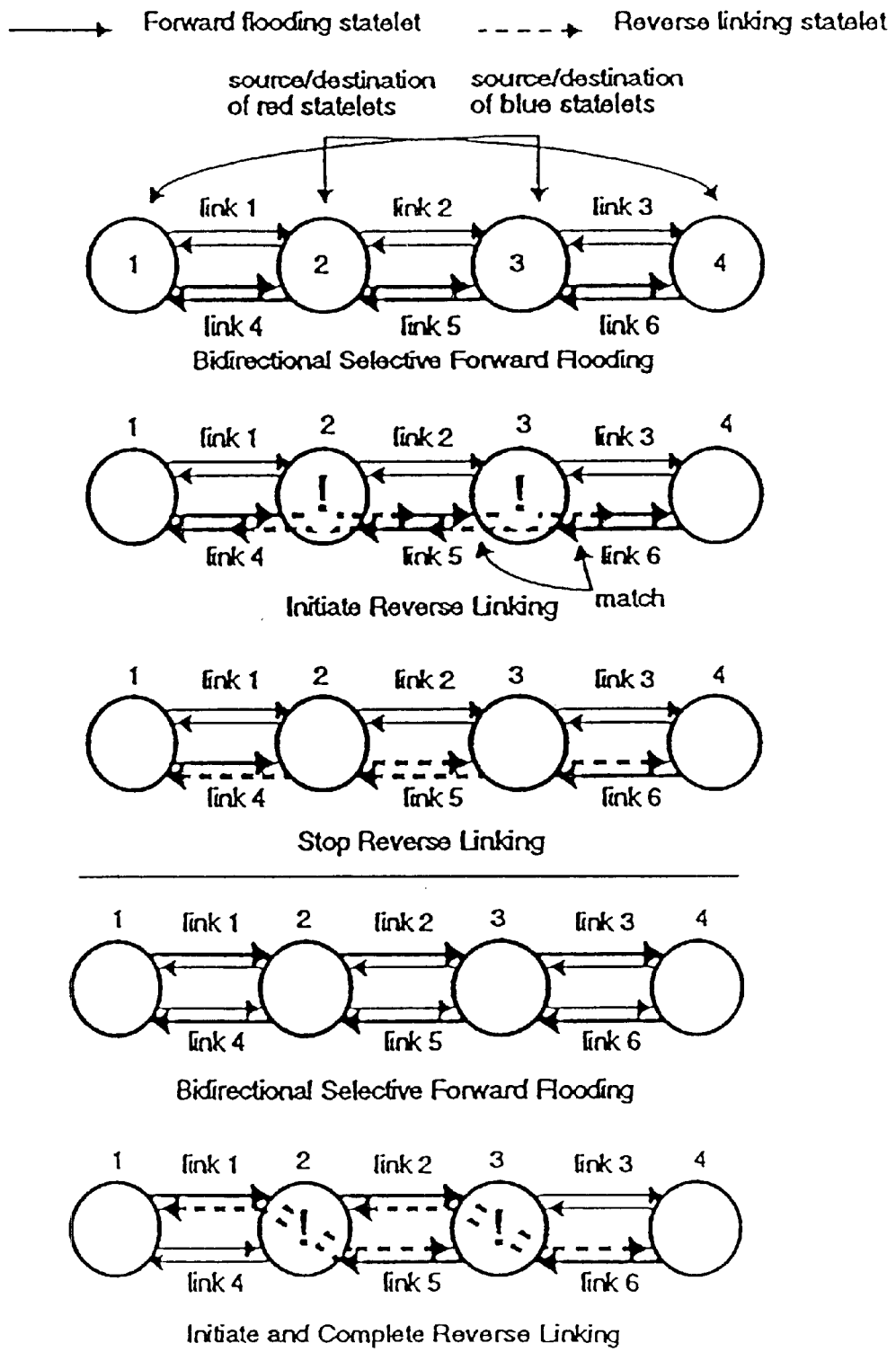
FIGS. 29A and 29B are schematics showing initiation of forward flooding statelets on different spares on a connecting span according to an embodiment of the invention.

To reduce the number of times a statelet is supplanted when a match is completed, and thereby possibly reduce the restoration time, it is advantageous to choose different spares on a connecting span when both nodes terminating that span are sourcing forward flooding statelets from different relations. As shown in FIG. 29A, when nodes 1,2 and 3, transmit forward flooding statelets on links 4, 5, and 6, a reverse linking event destined to fail is initiated in nodes 2 and 3.

Reverse linking is stopped at node 2 when the blue forward flooding statelet is overwritten by the red complemented statelet, and at node 3 when the red forward flooding statelet is overwritten by the blue complemented statelet. However, when nodes 1, 2, and 3, transmit forward flooding statelets as shown in FIG. 29B, reverse linking is completed and two restoration paths are found. As shown in FIG. 29C, this invention is preferably implemented such that different spares on a connecting span are used when initiating forward flooding statelets at a source whenever possible so as to minimize initiating reverse linking processes destined to fail.

Alternative Embodiment for Avoiding Congestion at End Nodes

In this alternative, a local protection area is established around an end node to favour statelets whose destination is the end node. Bidirectional flooding is not required. Each pair of end nodes (source and destination nodes) with demand flows that are damaged by the network failure senses signal loss (or appearance of AIS signal). Through statelet information applied prior to the failure, each end node knows the symbolic name or ID number of its corresponding end node and the total number of incident spare links at the other site. The site with the lesser incident spare capacity becomes sender, the other chooser. A tie is broken by comparing node Ids. Arbitrarily the lower ordinal ranked name will be sender.

The sender initiates selective flooding statelets according to the usual principles. As the complete system state evolves, the sender acts as combined sender/tandem according to the rules set out for OPRA (other than for bidirectional flooding) for combining and prioritizing the actions of sender for the interests of the host node and the actions of tandem on behalf of other origin-destination (O-D) pairs seeking restoration. This contributes to reducing total volumes of statelets in the network and inherently lets sender end nodes get a strong influence on their own localized end node bottleneck resources.

In an alternative embodiment believed to be feasible in some situations, the sender initiates statelets without any explicit designation of the target chooser node. Statelets are labelled only by their originating sender. Any node can as chooser determine whether it needs more paths to the sender node. The implication with this however is that more than one node may simultaneously respond as chooser to different branches of the same statelet tree arising from each primary statelet emission at the sender. One of them will always achieve a path back to the sender in this case, but it means in general that the protocol has to be written with the possibility of non-guaranteed reverse linking. On the other hand the advantage would be reduced statelet volumes.

The chooser node establishes a local protection area (LPA) in its end-node bottleneck vicinity: this is the primary way for addressing one of the main pathset coordination issues in path restoration, without resorting to double-ended flooding. An LPA statelet is emitted on at least one and as many as all incident spare links from a chooser. The LPA statelet has the sole purpose of marking the network vicinity of chooser nodes for the given failure scenario. The LPA statelets propagate only 1–3 hops from their originating chooser. The presence of an LPA statelet does not seize or prohibit use of the marked links (or marked span) by tandem related actions of incident nodes, but raise the "cost" or impediment to using these links in the tandem node competition rules. Additionally, the marking weight of the LPA statelets decreases with number of hops from origin and decreases with time as (if) the chooser realizes success in restoration. The LPA does not affect any statelet with the respective chooser as its destination node. The LPA may be conceptualized as a local rise in some potential field. This preferentially influences path forming tandem node event flows towards collective path-set formation through regions that are more compatible with preservation of local end node resources which are crucial to achieve high restorability for all damaged source-destination pairs. The intensity of the routing impediment that the chooser vicinity field effects is initially in proportion to the number of working demands it has lost, inverse proportion to the number of spares it has available, and distance from its origin. It also decreases with time as restoration paths accumulate for the given chooser.

As sender statelets propagate away from their sender, an identical sender vicinity protection field protocol could be piggybacked onto them in principle. However, this is redundant because the ordinary sender statelets have an inherently strong self-reservation effect around their sender, and also already decrease in influence away from home and decrease their number as restoration is achieved.

The tandem node role in connection with an LPA stays essentially as previously described with the following variations: (a) augmentation of the statelet competition rules to include the effect of the LPA. The tandem rules would now mediate competition not just based on incoming statelet properties, especially their Interference measures, but now also considering the outlet span they would like to get on to. It is in the tandem rules where a statelet homing in on its respective chooser would be progressively more able to win these competitions and cut through to its chooser. The tandem node competition may also be effected (a) globally over all incoming statelets present or (b) as sub-competitions amongst statelets of a given family (source-destination pair and index), or (c) as sub competitions within each family specific index. In this embodiment of the invention, statelets may be guaranteed to succeed in reverse linking.

In the detailed discussion of bidirectional flooding, complexity arises from the fact that a reverse linking statelet can be taken over or blocked by another family winning in a competition to use some of the resources that were in the forward flooding tree of the given reverse linking index. A great deal of robustness and simplicity will attain if the reverse linking process is guaranteed to be completed if started. In the path context the best pathsets are not necessarily shortest path sets for each source-destination pair, so that reverse linking may not be achievable as a guarantee, but it is still a desirable tendency to embed through consideration of the scope of the tandem node competition rules.

Figure 32:
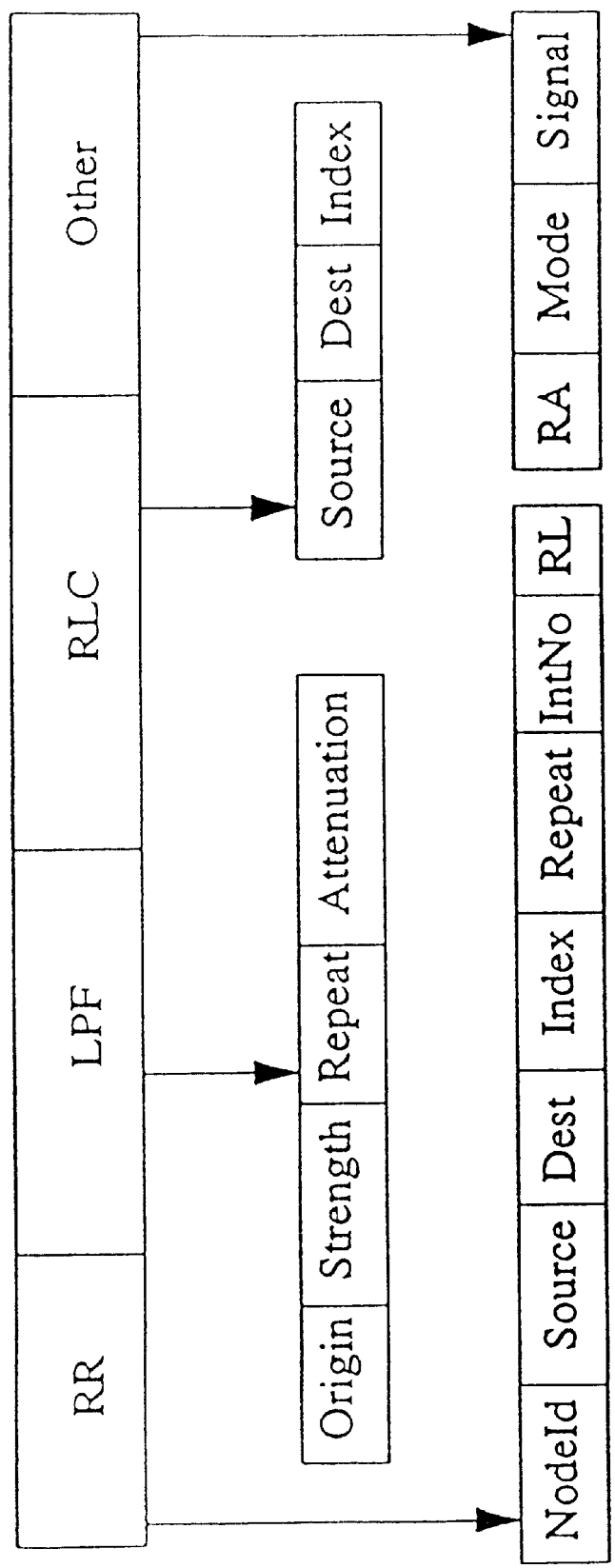
FIG. 32 shows fields of a statelet for use in unidirectional path restoration according to an embodiment of the invention.

For the implementation of a unidirectional path restoration protocol, the generalized statelet may consist of four information regions, each containing multiple fields as illustrated in FIG. 32. RR designates restoration request fields. LPF designates the fields used to establish a local protection area. RLC designates reverse linking cancellation fields. RR fields are the same as those shown in FIG. 4 with some exceptions.

RL is a Boolean bit that indicates whether the statelet is a reverse-linking statelet. The source of an RL statelet is the chooser node; the destination is the sender. This field replaces the Complement field and is a better suited label because it always travels back towards the sender. The Verify field is no longer needed. The return of an RL statelet to the sender guarantees that a bi-directional path exists and demand can be restored without the need for verification. The Priority field is not needed. Reverse-linking will be secure from the chooser end of the path. The looping event sequence found in bidirectional flooding will not occur in this unidirectional protocol. The Signal field is set to "true" when a sender node has completed a restoration event and is used exclusively by the sender to identify restored paths.

To accommodate the propagation of penalty information throughout the network, four new fields are added to the statelet. The chooser attempts to secure its vicinity with the transmission of a field (LPF) carried on the generalized statelet that defines the Local Protection Area. A statelet having an LPF field is referred to as an LPA statelet. The initial LPF strength is based on the number of spares leaving the node and the total demand (for all relations) that has been lost by the node. The function of the LPF is to apply a penalty to RR's not travelling to the source of this particular LPA statelet.

The Origin field indicates the name of the chooser node which originated this LPA statelet. This field is set by the chooser and is not modified. The Strength field indicates the current penalty imposed by an LPA in IntNo units. Attenuation of the Strength field of the LPA statelet will cause the strength field to decrease as it propagates through tandem nodes. The Repeat field indicates the number of times the LPA statelet had been rebroadcast since leaving the chooser. This field is incremented at each rebroadcast, and is needed to determine the Next-Hop Strength (NHS). The Attenuation field describes the method of attenuation to be used for this LPA statelet. In general, different choosers may require different attenuation strategies to secure their portion of the available spares in the network. The method used may be influenced by demand lost, or nodal degree.

Upon receiving a RR statelet destined for it, a chooser secures the arrival port by activating it, and adds this RR statelet family to a list of "responded to family". The chooser will not respond to any more appearances of this family. Should a reverse-linking attempt fail, some mechanism is required to notify the chooser of the failure, and allow it to respond anew to the family. This is accomplished via a Reverse-Link Cancel (RLC) switch on the statelet. In the RLC, the Source field indicates the sender of the source-destination node pair being cancelled. The Dest field indicates the chooser node of the source destination node pair being cancelled, and the target of the statelet. The Index field is required to fully specify the family which is to be reinstated at the chooser.

In the implementation of unidirectional flooding, the FSM 90 (FIG. 30) must be somewhat reconfigured from the configuration for bidirectional flooding. The division of the SHN-p protocol into a set of states allows it to play the roles of sender, chooser and tandem nodes in an asynchronous manner during a restoration event. The functions of each states are described in the following sections.

Start state: This state serves as the initial state of the FSM. All lists required by the node are created and initialized. Having left this state, the protocol never returns to Start.

Ready state: This is the only idle state in the system. It is here that a node awaits an interrupt on one of its ports. From this state, any of the three roles can be invoked. Following an interrupt, the Ready state receives the information packet and determines the nature of the interrupt.

Tandem state: Entering the tandem state indicates that a RR event has occurred that requires a tandem role response. Event parsing occurs to determine the correct action to take. Only RR and RLC events are significant at this stage, LPA statelet competition is discussed later. None of the three regions can affect any of the others. For example, an LPA statelet overwrite modifies only the LPF field of the statelet, leaving the RLC and RR fields intact. A tandem node receiving an RLC immediately repropagates it on the link where the corresponding RL statelet is being received. The transmission of the RL from this node (necessarily towards the sender) is cancelled. Once the RLC reaches the chooser, the path created by the RL will be completely dissolved by the tandem nodes.

In the RL state a reverse-linking statelet has arrived at a tandem node. If the forward-flooding family member of this statelet is still being transmitted on the port receiving the RL statelet, the reverse-linking continues. The arrival port is connected as is the port receiving the precursor of this family, on which the RL statelet is rebroadcast back towards the sender. The rebroadcast of this forward flooding (FF) statelet on all other spans is cancelled. If no FF statelet from this family is present on the same link, or if the precursor has vanished, the chooser must be notified of this RL-failure. An RLC statelet is sent towards the chooser, as a piggyback indication, not altering the RR fields of the statelet. Once broadcast, the RLC statelet remains on a link of network "memory" as long as the RL statelet is still being received. A future RL attempt from the same family can reuse the path once the RLC has vanished.

In the Ovwrt state, an interrupt had been generated at a port which did, and does, currently receive a statelet. This can indicate a change in RR, RLC, or LPF field(s). Only the first two are handled here. Firstly, the arrival of an RLC indicates that the associated port should be disconnected. Reverse-linking has failed and the resources bound by dead connections must be freed. The RLC statelet is rebroadcast on the associated port towards the chooser. Following this, the RR overwrite state is followed as discussed in relation to OPRA with the disconnected ports liberated.

In the Vanish state, the port which received an RR field no longer sees one. No RLC or LPF modifications are needed here. RR statelet precursor management is implemented as described in relation to OPRA.

In the New state, a port which was not receiving an RR field begins to see one. Again, this operates in the same manner as described in relation to OPRA.

In the LOS state, alarms are detected indicating that some demand has been lost by this node, or that this node is due to undergo stub release. Sender-chooser arbitration is accomplished arbitrarily by node name (smaller name wins) since this is the only secure piece of information that one end point has about the other. If the node becomes a sender for this demand pair, the lost circuits will be incremented, and the new demand catalogued. In addition to this, a chooser must recalculate its initial LPF strength. A single node can be both a sender and a chooser for different demand pairs. No changes are made to the network memory in this state, ports are fired and left to the Brdcst state to change the registers.

In the RL_dest state, an RL statelet has arrived at the specified sender. The arrival port is connected and the demand can be immediately restored. All flooding of the restored index is cancelled, as are the remainder of the source demand node pairs if all demand has been restored. The IIN of a node is increased if some demand remains to be satisfied in order to better distribute the available spare capacity among demand pairs. The arrival of an RL statelet at a sender which has already fully restored the source destination node pair results in the initiation of an RLC for this statelet.

In the FF_dest state, a forward flooding statelet has arrived at its specified chooser. The arrival port is connected, and a RL statelet is initiated on the same port. At this point, RL is assumed to be successful, and the LPF strength for this node is decremented accordingly (must be non-negative).

The family for which the RL is attempted is added to a list, and no more statelets belonging to this family will be responded to by the chooser unless RLC follows as per following section. Two techniques may be used. The first allows the chooser to respond to all statelets which indicate it as the destination. The second forbids the chooser from responding to more statelets from a source-destination node pair than are required by the demand. In the former case, more RL events occur which cancel statelets from the chooser side of the restoration path and thereby reduce congestion in the network. This has the effect of speeding up subsequent restoration attempts, but may have a negative influence on the PNE of the network. The arrival of an FF statelet at its chooser could be an event that disrupts an RL attempt from a different family tandeming this node. This and other simultaneous events occurring in normal operation add significantly to the complexity of the protocol.

In the Stop_RL state, an RLC request has arrived at its destination chooser. This cues the chooser to check its ports for another statelet from the cancelled family or source-destination node pair, depending on the FF_dest technique selected. Should a suitable statelet be available, a new RL attempt is initiated. If a suitable statelet is not found, the LPF field strength in increased and the number of circuits restored for the chooser is decremented.

In the LPF state, LPA statelets appearing at the node compete for rebroadcast based on their next-hop strength. Each LPA statelet seeks rebroadcast on all spans but its precursor span, and does not affect any RR statelets or RLC statelets or statelets used for rebroadcast. A flag set when the LPA statelet reception changes determines whether this state can be skipped on the way to the Brdcst state. Details of the LPA statelet competition are given in a later section.

In the Brdcst state, forward flooding RR statelets compete for rebroadcast from a tandem node. The LPA structure of the node must be determined before rebroadcast of RR statelets because this influences the penalties felt by particular RR families for a span. All RR statelet competition is carried out on a span-by-span basis (discussed later). Sender flooding is initially given priority over tandem RR requests through a lower IntNo. No rebroadcast can occur onto connected ports.

In the Timeout state, sender and chooser nodes begin the timeout clean-up process. This involves stopping statelet broadcast on any non-connected ports.

An LPA statelet arriving at a node gets an attenuated rebroadcast on all other spans of the node unless:

1. There is a stronger LPA statelet from the same origin arriving at the node in terms of Next Hop Strength (NHS).

2. The LPA statelet's NHS is zero.

3. There is no room for rebroadcast on a span—all positions are filled by LPA statelets of different origins with larger NHS.

The above rules must be satisfied for each LPA statelet that is received by a node—this is the optimal LPA broadcast pattern. To achieve this pattern, the LPA statelet received at a node compete for rank. The following steps are equivalent to establishing this broadcast pattern.

LPF Precursor List: All receiving ports are scanned, looking for LPA statelets. The first LPA statelet found is recorded in the LPF_precursor_list of the node, containing the following information:

span: the span on which the LPA statelet is received
port: the name of the receiving port on the span
origin: the node ID of the chooser which originated this LPA statelet
NHS: the attenuated strength of this LPA statelet should it be rebroadcast If the subsequent LPA statelet found has a different origin, it will be added to the list. If it has an origin already appearing on the list, it will replace the same-origin entry only if the new LPA statelet has a higher NHS than the one found on the list. A NHS of zero will not be added to the list. When all LPA statelets received have been scanned, the LPF_precursor_list is complete, containing the most suitable rebroadcast candidates from every origin appearing at the node. If this node is acting as a chooser for some demand pair, it will also source an LPA statelet itself with its node ID appearing in the origin field. The NHS of such an LPA statelet is given by the initial NHS of this node. This LPA statelet is entered into the LPF_precursor_list with the span and port fields set to a flag value of LPF_SOURCE_INDICATOR.

Transmission Port Check: Each port transmitting an LPA statelet is scanned to ensure that the origin of the transmitted LPA statelet has a precursor in the LPF_precursor_list. If a precursor is not found, the LPA statelet being rebroadcast has vanished from the node. The LPF fields of this port are set to NILL, cancelling LPA statelet transmission from this port.

Sorting the Precursor List: LPA statelet competition is based primarily on NHS, secondarily on origin name arbitration. The list of precursors is sorted placing the precursor with the highest NHS at the top of the list. The stronger precursors will have a greater chance of rebroadcast on all spans of the node.

Rebroadcast: Starting with the highest ranking precursor, each span of the node is checked. If this span is currently rebroadcasting the precursor, the transmission information (NHS, repeats) is updated if necessary. If not currently rebroadcast on the span, the precursor will replace the weakest (by NHS again) transmission on this span, providing that the precursor's NHS is greater. Empty ports are filled preferentially before other LPA statelets are displaced. Because of step 2, the strongest precursor is guaranteed rebroadcast on all spans that have some spare capacity—but does not seek rebroadcast on the span on which it came. Weaker precursors are not guaranteed any rebroadcast.

RR Competition: Like LPA statelets, RR statelets also seek to use non-destination nodes as tandem rebroadcast points. Because of LPA influence, however, RR competition occurs on a span-level instead of over the entire node. While a particular RR statelet may be ranked highest for rebroadcast on one span, it may be ranked lowest on another. RR statelets are rebroadcast on a span unless:

1. There is a "better" RR statelet from the same family at the node. This distinction will soon be clarified.

2. The RR statelet has travelled in a loop and returned to its source node.

3. There is no remaining spare capacity on the span—all capacity is used up by RR statelets which appear better to this span.

4. The RR statelet is received on this span.

5. The RR statelet has exceeded the maximum permissible number of rebroadcast events.

The simultaneous satisfaction of these rules for all RR statelets received at a node on all spans leads to the optimal composite broadcast pattern. Performing the following steps forms this pattern. This competition sequence occurs exclusively within the Brdcst state and is distinct from the actions taken following the tandem state (in the Ovwrt state, for example).

RR Precursor List: An exhaustive search, similar to the one done for LPA statelets, establishes the list of RR precursors for a node, the RR_precursor_list. Within families, the precursor is the RR statelet having the smallest IntNo appearing at the node. LPF penalties are peripheral to the selection of a family precursor. The complete precursor list contains the following information:

span: the span receiving the precursor
   port: the name of the receiving port on the span
   IntNo: interference number of the received precursor
   dest: chooser node ID of this RR statelet's demand pair
   penalty: the LPF penalty felt by this precursor on the span
in consideration If the node is acting as a sender for at least one demand pair, some RR statelets will originate within the node. Each demand pair (uniquely defined by its destination for a particular sender) will have one precursor representative of all the demand left to restore. This is different than the implementation described in relation to OPRA where all RR statelets sourced by a sender use one collective precursor. Sourced RR statelets have their span and port fields set to SENDER_FLOOD_INDICATOR and their IntNo field set to the IIN of the node, which may increase as the sender satisfies demands.

Sorting the Precursor List: The RR_precursor_list is resorted for each span. For each precursor, the LPF penalty of the span is calculated based on the LPA statelets received on this span. If the origin of an LPA statelet does not match the destination of the precursor in question, the Strength of that LPA statelet is added to the precursor's penalty. If the origin and the destination match, no penalty is incurred. The RR_precursor_list is then sorted using IntNo+LPF_penalty as the criteria. The precursor having the least sum is ranked highest. If the precursor is being received on the span in question, its penalty is set to infinity. If two RR statelets have the same penalty, the one with fewer repeats is given a higher rank.

Rebroadcast: Having sorted the span's list of precursors, rebroadcast begins with the highest ranking taking over the weakest transmitted RR statelet's port (again based on IntNo+LPF_penalty) if the precursor is not already transmitted on this span. If the precursor's family presently enjoys rebroadcast, the transmission statelet may require updating. Rebroadcast of a precursor involves increasing the IntNo of the statelet by the interference number of the span (defined as in the implementation described for OPRA) and incrementing the repeat number. If a sourced RR statelet obtains rebroadcast permission on a span, it attempts to occupy a number of spares equal to the demand lost by this relation before the next best precursor is given an opportunity for rebroadcast.

Apparatus for Implementation of the Invention

Figure 30:
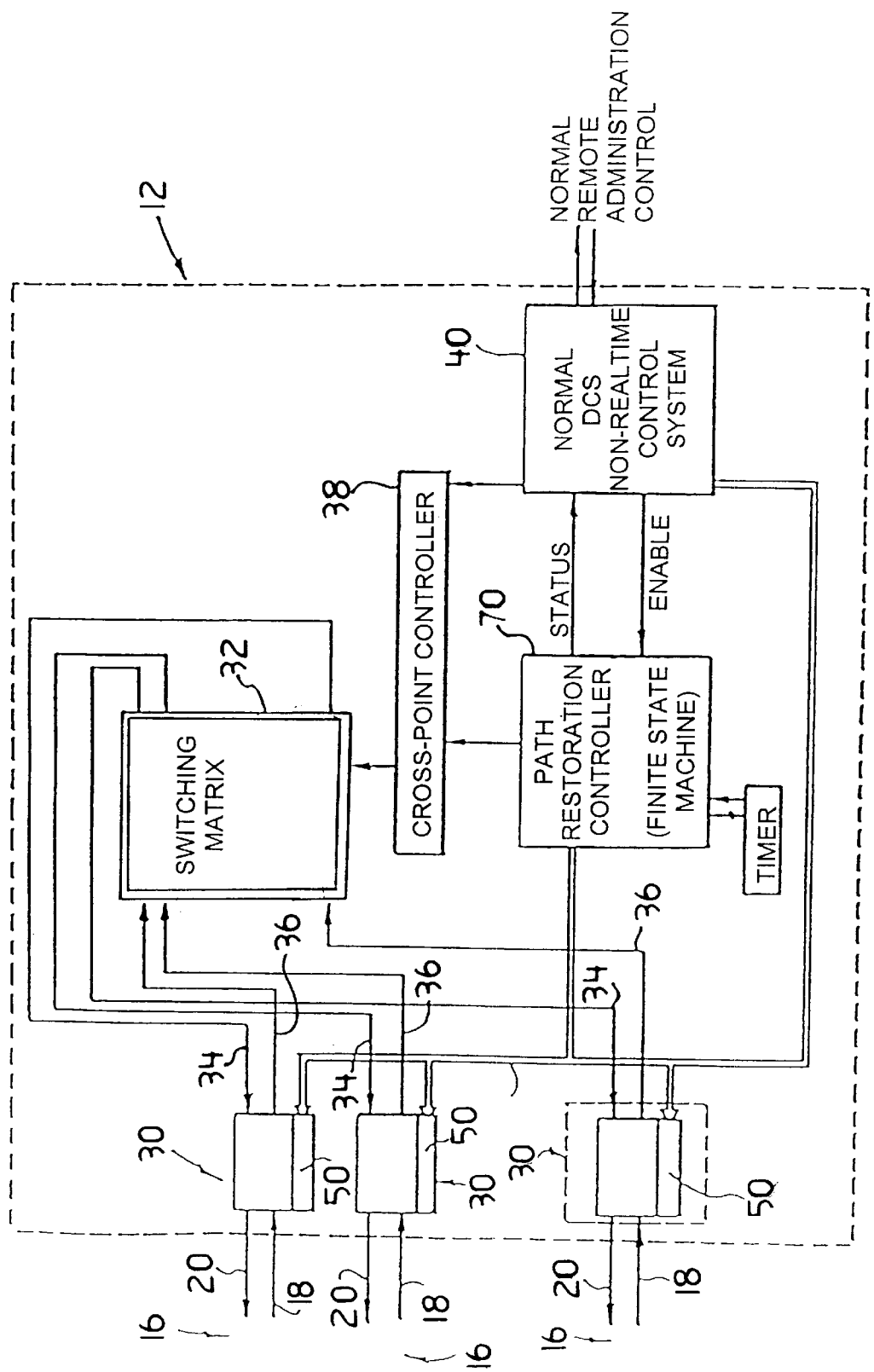
FIG. 30 is a schematic illustrating elements of a node configured for implementing a method according to an embodiment of the invention.
Figure 31:
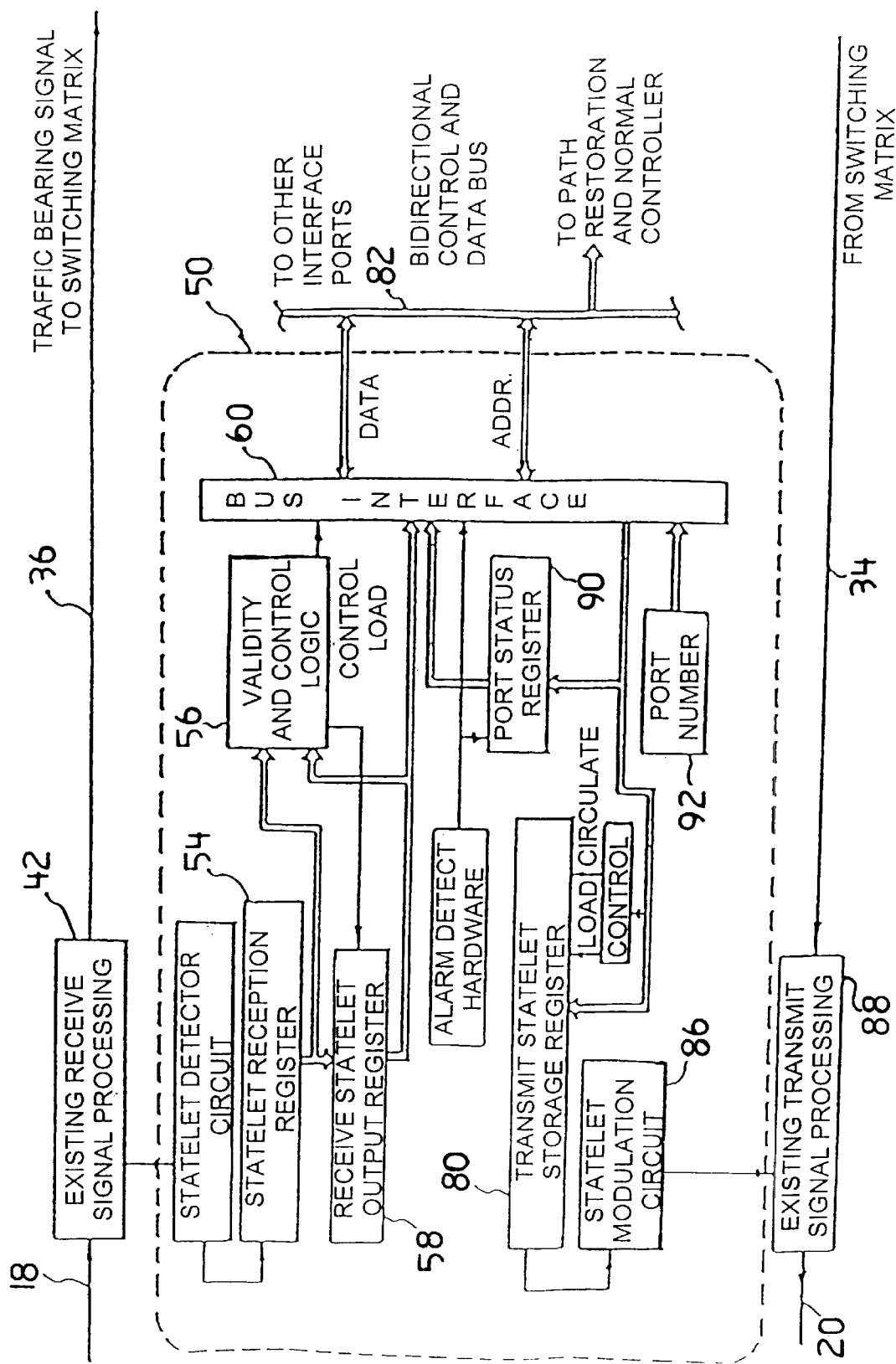
FIG. 31 is a schematic illustrating statelet reception and transmission circuits added by a preferred embodiment of the present invention to each transmission line interface block illustrated in FIG. 30.

The construction and operation of apparatus for implementation of a preferred embodiment of the invention is shown in FIGS. 30–31. FIG. 30 expands the view of the DCS machines with modifications required by a preferred embodiment of this invention, placed at every node of a network. With reference to FIG. 30, it can be seen that the creation of a pre-configured closed loop network requires two additional elements in the crossconnection machines of the network. In FIG. 30, components 30, 32, 34, 36, 38, 40, 42 and 44 comprise the normal general embodiment of a crossconnect machine, for the purposes that are essential here. The dashed outer boundary in FIG. 30 represents nodes. The known crossconnect machine structure is comprised of bidirectional transmission interfaces 30, which are connected to external transmission lines 16, which may be coaxial cable, fiber, or radio, for example, and connected internally to the switching matrix 32 of the DCS via paths 34, 36. The switching matrix is operated by a crosspoint operator means 38 which usually comprises hardware and software. As known in the art, the crossconnect switching matrix and all interface cards are directly monitored and controlled exclusively by the DCS operating system 40 and matrix reconfigurations are only performed through external command and telemetry links by a remote administrative centre often called NOC (Network Operations Center).

For the implementation of a preferred embodiment of the invention, means 50 are added to detect statelets, added transparently to the carrier signals of the network and provide a method for directly reconfiguring the switching matrix, without remote control, in accordance with the logical method implemented by the Finite State Machine (FSM) 70.

Each node in the network has a crossconnect machine incorporating, for the purposes of implementation of a preferred embodiment of the invention, statelet receiving and transmitting circuit means 50 on each transmission interface card 30 and an independent FSM 70 for processing receive statelets, controlling transmit statelets and recognizing statelet determined conditions under which the FSM requests operation of a specific crosspoint in switching matrix 32 through shared access to the Crosspoint Controller 38.

FIG. 31 is an expanded view of the statelet transmit and receive circuitry shown as 50 in FIG. 30. Detail of the content of the transmit and receive registers is set out above in the discussion of the node logic implemented at a node.

With reference to FIG. 31, the existing receive propagation path 12 and the existing receive signal processing interface card 30 are shown as they were in FIG. 30 and item 50 of FIG. 30 is exploded for closer view. The existing receive signal processing circuitry 42 is connected to the new circuits only in that a copy of the composite signal or a copy containing only the logical binary content of the received traffic signal plus overhead is provided as required to the statelet detector circuit 52. Statelet detector circuit 52 processes the received signal in a manner such that the particular bits or other attribute(s) of the signal used for transparent conveyance of the statelet information is recovered so as to identify the individual signalling elements of the statelet on that signal, if any. Various techniques for doing this are known, several of which are disclosed in U.S. Pat. No. 4,956,835. It is within the scope of this invention that any number of schemes for modulation and detection of transparent statelet transport methods are possible for implementation of the invention in transport networks using different, transport signal formats such as DS-1, DS-3, Syntran, Sonet, or CEPT formats.

Having detected the individual signalling elements of the statelet, statelet detector circuit 52 feeds its output into a statelet receive register 54. Each time a complete and valid statelet is recognized by a validity and logic control circuit 56 to be present in the statelet receive register 54 and that statelet is also seen by the logic control circuit 56 to be different in from the current contents of a statelet storage register 58, then the controller 56 causes the transfer of the newly received statelet in statelet receive register 54 to receive statelet output register 58, where it will stay until another valid but different statelet appears on the link 18.

Once the new statelet is in the receive statelet output register, bus interface 60 connected to FSM 70 (FIG. 30) raises an internal flag indicating that a new statelet has been received and, when appropriate, communicates the statelet to the controller over the bus and clears the 'new statelet' flag once the controller has read the statelet. Thereafter, the statelet remains addressable for reference by the controller as may be needed in executing its control logic sequences.

Many means for accomplishing the equivalent peripheral-to-controller transfer function are known including direct connections between each DCS port statelet circuit and the controller or there may be a shared interrupt line followed by polling or a vectored interrupt arrangement, etc. In all of these schemes, however, it is an aspect of a preferred embodiment of this invention that the controller needs no memory of its own since all statelets and status data which it needs to implement its function are retained as a distributed memory on each interface port card of the DCS machine. The controller polls continually for new statelets or each new statelet is explicitly brought to the controllers attention by an interrupt because the controller implementing the pre-configuration process is implemented as an event driven finite state machine and events are determined in terms of statelet appearances, changes and disappearances.

In a preferred embodiment, when bus interface 60 is alerted that a new statelet has been received, the bus interface logic completely handles the subsequent transfer of the new statelet contents and the identification of the respective DCS interface port along with the status bits to the FSM 70 in FIG. 30 by known bus interfacing and transaction techniques.

With reference to FIG. 30, the contents of any valid statelet received off a transmission interface are shown and will be discussed in detail. Suffice it to say now that checkbit fields for any number of known error checking and/or error detecting schemes can be appended to the statelet data field shown in FIGS. 20A–20C, and such circuitry would also be provided in statelet receive register 54 or control logic 56 of FIG. 31 without changing the nature of this invention.

The statelet receive and transmit circuit 50 includes a statelet transmit register 80 which can be loaded by FSM 70 over bus 82 and bus interface 60. This provides a means by which the FSM 70 can apply a desired transmit statelet to any desired transmission path 28 as may be appropriate to implement the logic of an embodiment of the method of the present invention embodied in FSM 70 in FIG. 31. Through control logic 84, the bus interface can load a new statelet into statelet transmit register 80 and then, once loaded, cause the repeated circulation of the contents of the register so that, by means of a transmit statelet modulation circuit 86, the transmit statelet in statelet transmit register 80 is indefinitely repeated on the outgoing transmission link 28.

Also shown in FIG. 31 is a Port Status Register 90 which stores certain information used by FSM 70 in the preferred embodiment. The contents of the port status register can be read by FSM 70 and, in the case of an alarm, the alarm-detection hardware is arranged to activate bus interface 60 to forward the contents portnumber register 92 and port status register 90 to FSM 70 without delay. The port status register 90 content is described in relation to FIG. 9.

A person skilled in the art could make immaterial modifications to the invention described in this patent without departing from the essence of the invention.

TABLE 1

| Classifying Restoration Statelets | |
|---|---|
| statelet class | Common characteristics |
| Forward flooding statelet | NID ≠ null<br>source ≠ null<br>destination ≠ null<br>index ≠ null<br>IntNo ≠ null<br>repeat count ≠ null |

TABLE 1-continued

| Classifying Restoration Statelets | |
|---|---|
| statelet class | Common characteristics |
| Reverse Linking or Complemented statelet Confirmation statelet | mode ≠ null<br>Reverse Linking Indicator = null<br>Confirmation Indicator = null<br>Only the Confirmation Indicator field from this class of statelets is null<br>No fields from this class of statelets are null |
| Null statelet | Each field from this class of statelets except the NID is null |

The embodiments of the invention in which an exclusive property or privilege is claimed are defined as follows:

1. A method of establishing a connected telecommunications path through a telecommunications network, in which the telecommunications network includes plural nodes interconnected by plural spans, each node having a digital cross-connect switch for making and breaking connections between links in adjacent spans forming span paths through the node and a controller for controlling transmission, reception and content of statelets arriving at or transmitted from the node, in which each statelet contains plural fields, the method comprising the steps of:

broadcasting statelets from plural source nodes along successive spare links to successive tandem nodes in the network;

preferentially broadcasting from each tandem node at which statelets arrive those statelets which, by comparison with other statelets competing to be broadcast at the tandem node, have traversed spans with higher spare capacity;

continuing to broadcast statelets from tandem nodes at least until a statelet arrives at a destination node; and creating a communications path through the nodes traversed by the statelet upon arrival of the statelet at the destination node.

2. The method of claim 1 in which each statelet contains a field defining the destination node for the statelet.

3. The method of claim 2 further comprising:

monitoring, at each tandem node, and for each span to which the tandem node is connected, how many statelets are competing to be broadcast along the span and how many spare links in the span are available for broadcasting statelets; and updating an interference field in each statelet transmitted from each tandem node according to a measure relating how many statelets are competing to be broadcast along the span upon which the statelet is to be transmitted and how many spare links in the span are available for broadcasting statelets.

4. The method of claim 3 in which the measure is the difference between how many spare links in the span are available for broadcasting statelets and how many statelets are competing to be broadcast along the span.

5. The method of claim 3 further comprising the step of favouring use of spare links terminating at an end node of a failed working path by any statelet for which the destination node of the statelet is an end node of the failed working path.

6. The method of claim 5 in which favouring use of spare links comprises:

defining a local protection area comprising nodes adjacent to an end node of a failed working path; and updating a field in statelets traversing the local protection area in a manner that decreases the likelihood that the statelets will be broadcast from subsequent nodes if the destination node of the statelets is not the end node of the failed working path.

7. The method of claim 6 in which creating a communications path comprises:
upon receipt of a statelet at a destination node, transmitting a reverse linking statelet from the destination node along the nodes traversed by the statelet.

8. The method of claim 2 further comprising the step of favouring use of spare links terminating at an end node of a failed working path by any statelet for which the destination node of the statelet is an end node of the failed working path.

9. The method of claim 8 in which favouring use of spare links comprises:
broadcasting statelets from first and second end nodes of a failed working path along respective paths until a statelet initiated by the first end node meets, at a tandem node, a statelet initiated by the second end node; and
propagating the statelet initiated by the first end node along the path followed by the statelet initiated by the second end node until the statelet reaches the second end node.

10. The method of claim 9 further comprising confirming the existence of a connected path between the first and second end nodes.

11. The method of claim 2 in which broadcast of statelets is initiated upon receipt by a node in the network of a signal indicating that a failure has occurred on one of the spans of the network.

12. The method of claim 11 in which each source node attempts to broadcast as many statelets, each corresponding to a different index family, as there are lost links in the failed span.

13. The method of claim 2 in which each statelet broadcast by a source node has an index field whose value is uniquely associated with the source and destination node of the statelet and the span on which the statelet is transmitted from the source node.

14. The method of claim 13 in which each tandem node transmits on each span only one statelet having a specific combination of index field, source node and destination node.

15. The method of claim 14 in which each tandem node attempts to broadcast each statelet arriving at the tandem node on as many spans as possible.

16. The method of claim 2 in which each statelet contains a repeat field and the method further comprises the steps of:
each tandem node incrementing the value of the repeat field of a statelet upon arrival of the statelet at the tandem node; and
preventing broadcast of statelets having a repeat field value greater than a pre-determined value.

17. The method of claim 2 in which each statelet contains a route field and the method further comprises the steps of:
each tandem node updating the route field of a statelet upon arrival of the statelet at the tandem node to include the identification of the tandem node, whereby the statelet contains a record of the nodes traversed by the statelet; and
preventing broadcast of each statelet to any tandem node previously traversed by the respective statelet.

18. The method of claim 17 further comprising the steps of:
identifying any communications paths having a length of one span; and preventing any statelet from being broadcast along a communications path having a length of one span.

19. The method of claim 2 in which creating a communications path comprises:
upon receipt of a statelet at a destination node, transmitting a reverse linking statelet from the destination node along the nodes traversed by the statelet.

20. The method of claim 19 in which each statelet broadcast by a source node has an index field whose value is uniquely associated with the source and destination node of the statelet and the span on which the statelet is transmitted from the source node.

21. The method of claim 20 further comprising:
cancelling transmission of a reverse linking statelet from a destination node if a reverse linking statelet having a given index field value arriving at a tandem node has traversed spans with lower spare capacity than another statelet with the given index field value competing to be broadcast from the tandem node.

22. The method of claim 19 in which each statelet contains a route field and the method further comprises the step of:
each tandem node updating the route field of a statelet upon arrival of the statelet at the tandem node to include the identification of the tandem node, whereby the statelet contains a record of the nodes traversed by the statelet.

23. A method of establishing a communications path in a telecommunications network, in which the network is formed by plural nodes interconnected by plural spans, each span containing working and spare links, each node having a cross-connect switch for connecting links in spans terminating at the node and a controller for controlling propagation and content of statelets arriving at or transmitted from the node, the method comprising the steps of:
propagating statelets through the network, in which each statelet comprises fields designating a source node for the statelet, a destination node for the statelet, a statelet index, and a measure of the spare capacity of spans traversed by the statelet;
updating each statelet transmitted from a node on a span, except at the destination node for that statelet, to alter the measure of spare capacity according to the spare capacity of the span on which the statelet is to be transmitted, in which the measure of spare capacity takes into account how many statelets are competing to be broadcast along the span and how many spare links in the span are available for broadcasting statelets; and
creating a communications path through the nodes traversed by a statelet upon arrival of a statelet at the destination node of the statelet.

24. The method of claim 23 in which the measure of spare capacity is the difference between how many spare links in the span are available for broadcasting statelets and how many statelets are competing to be broadcast along the span.

25. The method of claim 24 in which propagation of statelets is initiated upon receipt by a node in the network of a signal indicating that a working path in the network has failed.

26. The method of claim 25 further comprising the step of favouring use of spare links terminating at an end node of a failed working path by any statelet for which the destination node of the statelet is an end node of the failed working path.

27. The method of claim 26 in which favouring use of spare links comprises:
defining a local protection area comprising nodes adjacent to an end node of a failed working path; and updating a field in statelets traversing the local protection area in a manner that decreases the likelihood that the statelets will be broadcast from subsequent nodes if the destination node of the statelets is not the end node of the failed working path.

28. The method of claim 26 in which favouring use of spare links comprises:

broadcasting statelets from first and second end nodes of a failed working path along respective paths until a statelet initiated by the first end node meets, at a tandem node, a statelet initiated by the second end node; and propagating the statelet initiated by the first end node along the path followed by the statelet initiated by the second end node until the statelet reaches the second end node.

29. The method of claim 28 further comprising confirming the existence of a connected path between the first and second end nodes.

30. The method of claim 26 in which each source node attempts to broadcast as many statelets, each corresponding to a different index family, as there are lost working paths.

31. The method of claim 30 in which each statelet broadcast by a source node has an index field whose value is uniquely associated with the source and destination node of the statelet and the span on which the statelet is transmitted from the source node.

32. The method of claim 31 in which each tandem node transmits on each span only one statelet having a specific combination of index field, source node and destination node.

33. The method of claim 32 in which each tandem node attempts to broadcast each statelet arriving at the tandem node on as many spans as possible.

34. The method of claim 33 in which each statelet contains a route field and the method further comprises the steps of:

each tandem node updating the route field of a statelet upon arrival of the statelet at the tandem node to include the identification of the tandem node, whereby the statelet contains a record of the nodes traversed by the statelet; and preventing broadcast of each statelet to any tandem node previously traversed by the respective statelet.

35. The method of claim 34 further comprising the steps of:

identifying any communications paths having a length of one span; and preventing any statelet from being broadcast along a communications path having a length of one span.

36. The method of claim 35 in which creating a communications path comprises:

upon receipt of a statelet at a destination node, transmitting a reverse linking statelet from the destination node along the nodes traversed by the statelet.

37. The method of claim 36 further comprising:

cancelling transmission of a reverse linking statelet from a destination node if a reverse linking statelet having a given index field value arriving at a tandem node has traversed spans with lower spare capacity than another statelet with the given index field value competing to be broadcast from the tandem node.

38. The method of claim 37 in which each statelet contains a repeat field and the method further comprises the steps of:

each tandem node incrementing the value of the repeat field of a statelet upon arrival of the statelet at the tandem node; and preventing broadcast of statelets having a repeat field value greater than a pre-determined value.

* * * * *

UNITED STATES PATENT AND TRADEMARK OFFICE
CERTIFICATE OF CORRECTION

PATENT NO.   : 6,377,543 B1
DATED        : April 23, 2002
INVENTOR(S)  : W.D. Grover et al.

It is certified that error appears in the above-identified patent and that said Letters Patent is hereby corrected as shown below:

<u>Title page,</u>
Item [56], References Cited, U.S PATENT DOCUMENTS, "1/1991" should read -- 2/1991 --; "Ghng et al." should read -- Chng et al. --; "9/1995" should read -- 8/1995 --; and "5,537,534" should read -- 5,537,532 --

Signed and Sealed this

Sixth Day of May, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,377,543 B1
DATED : April 23, 2002
INVENTOR(S) : W.D. Grover et al.

It is certified that error appears in the above-identified patent and that said Letters Patent is hereby corrected as shown below:

<u>Title page,</u>
Please insert: -- [30] Foreign Application Priority Data
      Aug. 13, 1997  (CA)  2212933 --

Signed and Sealed this

Twenty-second Day of July, 2003

JAMES E. ROGAN
*Director of the United States Patent and Trademark Office*